US011721002B2

(12) United States Patent
Klapp et al.

(10) Patent No.: US 11,721,002 B2
(45) Date of Patent: **\*Aug. 8, 2023**

(54) IMAGING SYSTEM AND METHOD FOR IMAGING OBJECTS WITH REDUCED IMAGE BLUR

(71) Applicant: Ramot at Tel-Aviv University Ltd., Tel-Aviv (IL)

(72) Inventors: Iftach Klapp, Tel-Aviv (IL); David Mendlovic, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 249 days.

This patent is subject to a terminal disclaimer.

(21) Appl. No.: 17/177,319

(22) Filed: Feb. 17, 2021

(65) Prior Publication Data

US 2021/0166359 A1 Jun. 3, 2021

Related U.S. Application Data

(63) Continuation of application No. 16/386,927, filed on Apr. 17, 2019, now Pat. No. 10,949,954, which is a
(Continued)

(51) Int. Cl.
*G06T 5/00* (2006.01)
*G02B 26/06* (2006.01)
(Continued)

(52) U.S. Cl.
CPC .............. *G06T 5/003* (2013.01); *G02B 26/06* (2013.01); *G02B 27/0075* (2013.01);
(Continued)

(58) Field of Classification Search
CPC .......... G06T 5/003; G06T 2207/10004; G02B 26/06; G02B 27/0075; G02B 27/4266;
(Continued)

(56) References Cited

U.S. PATENT DOCUMENTS 5,757,424 A 5/1998 Frederick
6,842,297 B2 1/2005 Dowski, Jr.
(Continued)

FOREIGN PATENT DOCUMENTS

CN 101339350 1/2009
EP 1296213 3/2003
(Continued)

OTHER PUBLICATIONS

Communication Pursuant to Article 94(3) EPC dated Aug. 4, 2016 From the European Patent Office Re. Application No. 10714690.4. (6 Pages).
Communication Pursuant to Article 94(3) EPC dated Sep. 15, 2015 From the European Patent Office Re. Application No. 10714690.4. (6 Pages).
(Continued)

*Primary Examiner* — Twyler L Haskins
*Assistant Examiner* — Fayez A Bhuiyan

(57) ABSTRACT

An imaging device is presented for use in an imaging system capable of improving the image quality. The imaging device has one or more optical systems defining an effective aperture of the imaging device. The imaging device comprises a lens system having an algebraic representation matrix of a diagonalized form defining a first Condition Number, and a phase encoder utility adapted to effect a second Condition Number of an algebraic representation matrix of the imaging device, smaller than said first Condition Number of the lens system.

22 Claims, 36 Drawing Sheets

Related U.S. Application Data continuation of application No. 15/916,796, filed on Mar. 9, 2018, now Pat. No. 10,311,555, which is a continuation of application No. 15/184,592, filed on Jun. 16, 2016, now Pat. No. 9,953,402, which is a continuation of application No. 13/231,412, filed on Sep. 13, 2011, now Pat. No. 9,405,119, which is a continuation-in-part of application No. PCT/IL2010/000214, filed on Mar. 14, 2010.

(60) Provisional application No. 61/293,782, filed on Jan. 11, 2010, provisional application No. 61/167,194, filed on Apr. 7, 2009, provisional application No. 61/159,841, filed on Mar. 13, 2009.

(51) Int. Cl.

| | | |
|---|---|---|
| *G02B 27/46* | (2006.01) | |
| *H04N 23/60* | (2023.01) | |
| *G02B 27/00* | (2006.01) | |
| *G02B 27/42* | (2006.01) | |
| *H04N 23/55* | (2023.01) | |
| *H04N 23/951* | (2023.01) | |

(52) U.S. Cl.
CPC ......... *G02B 27/4266* (2013.01); *G02B 27/46* (2013.01); *H04N 23/60* (2023.01); *G06T 2207/10004* (2013.01); *H04N 23/55* (2023.01); *H04N 23/951* (2023.01)

(58) Field of Classification Search
CPC ...... G02B 27/46; H04N 5/232; H04N 5/2254; H04N 5/23232
See application file for complete search history.

(56) References Cited

U.S. PATENT DOCUMENTS

| | | | |
|---|---|---|---|
| 8,350,948 | B2 | 1/2013 | Miyauchi et al. |
| 9,405,119 | B2 * | 8/2016 | Klapp .................... G02B 26/06 |
| 2003/0038814 | A1 | 2/2003 | Blume |
| 2006/0045388 | A1 | 3/2006 | Zeineh et al. |
| 2007/0009148 | A1 | 1/2007 | Brasen et al. |
| 2007/0159535 | A1 | 7/2007 | Kumagi et al. |
| 2007/0252908 | A1 | 11/2007 | Kohlemainen |
| 2007/0280556 | A1 | 12/2007 | Mullick et al. |
| 2008/0013018 | A1 | 1/2008 | Jang et al. |
| 2008/0043114 | A1 | 2/2008 | Sung et al. |
| 2009/0262221 | A1 | 10/2009 | Findlay et al. |
| 2009/0310214 | A1 | 12/2009 | Brueck et al. |
| 2010/0165134 | A1 | 7/2010 | Dowaki, Jr. et al. |
| 2012/0062760 | A1 | 3/2012 | Klapp et al. |
| 2016/0350897 | A1 | 12/2016 | Klap et al. |
| 2018/0253832 | A1 | 9/2018 | Klapp et al. |
| 2019/0295226 | A1 | 9/2019 | Klapp et al. |

FOREIGN PATENT DOCUMENTS

| | | |
|---|---|---|
| EP | 1372013 | 12/2003 |
| WO | WO 00/12983 | 3/2000 |
| WO | WO 03/021333 | 3/2003 |
| WO | WO 2006/125975 | 11/2006 |
| WO | WO 2007/016318 | 2/2007 |
| WO | WO 2007/141788 | 12/2007 |
| WO | WO 2008/150285 | 12/2008 |
| WO | WO 2009/020918 | 2/2009 |
| WO | WO 2010/103527 | 9/2010 |

OTHER PUBLICATIONS

Communication Pursuant to Article 94(3) EPC dated Apr. 19, 2017 From the European Patent Office Re. Application No. 10714690.4. (6 Pages).

International Preliminary Report on Patentability dated Sep. 13, 2011 From the International Bureau of WIPO Re. Application No. PCT/IL2010/000214. (18 Pages).

International Search Report and the Written Opinion dated Sep. 20, 2010 From the International Searching Authority Re. Application No. PCT/IL2010/000214. (24 Pages).

Notification of Office Action and Search Report dated Apr. 3, 2013 From the State Intellectual Property Office of the People's Republic of China Re. Application No. 201080020539.3. (6 Pages).

Notification of Office Action and Search Report dated Dec. 9, 2013 From the State Intellectual Property Office of the People's Republic of China Re. Application No. 201080020539.3. (6 Pages).

Official Action dated Jan. 15, 2020 From the US Patent and Trademark Office Re. U.S. Appl. No. 16/386,927. (23 Pages).

Andrews et al. "Singular Value Decompositions and Digital Image Processing", IEEE Transactions on Acoustics, Speech, and Signal Processing, 24 (1): 26-53, Feb. 1976.

Bertero et al. "Introduction to Inverse Problems in Imaging", Institute of Physics Publishing, 350P., 1998.

Costello et al. "Efficient Restoration of Space—Variant Blurs from Physical Optics by Sectioning with Modified Wiener Filtering", Digital Signal Processing, 13(1): 1-22, Jan. 1, 2003.

Fish et al. "Scanning Singular-Value-Decomposition Method for Restoration of Images with Space-Variant Blur", Journal of the Optical Society of America A, 13(3): 464-469, Mar. 3, 1996.

Gerchberg et al. "A Practical Algorithm for the Determination of Phase from Image and Diffraction Plane Pictures", Optik, 35 (2): 237-246,.1972.

Gonsalves "Nonisoplanatic Imaging By Phase Diversity", Optics Letters, 19(7): 493-495, Apr. 1, 1994.

Gonsalves et al. "Phase Retrieval and Diversity in Adaptive Optics", Optical Engineering, 21(5): 829-832, 215829, Oct. 1, 1982.

Goodman "Introduction to Fourier Optics", Staford University Department of Electrical Engineering,: 105-127, 1968.

Klapp et al. "Improvement of Matrix Condition of Hybrid, Space Variant Optics by the Means of Parallel Optics Design", Optics Express, 17(14): 11673-11689, 2009.

Klapp et al. "Optical Design for Improving Matrix Condition", OSA Pubhshing, Signal Recovery and Synthesis: STuA7, Oct. 13-14, 2009.

Loefdahl "Multiframe Deconvolution with Space-Variant Point-Spread Functions by Use of Inverse Filtering and Fast Fourier Transform", Applied Optics, 46(21): 4686-4693, Jul. 20, 2007.

Paxman et al. "Joint Estimation of Object and Aberrations by Using Phase Diversity", Journal of the Optical Society of America A, 9(7): 1072-1085, Jul. 1992.

Paxman et al. "Phase-Diversity Data Sets and Processing Strategies", High Resolution Solar Physics: Theory, Observations, and Techniques ASP Conference Series, 183: 311-319, 1999.

Notice of Allowance dated Apr. 6, 2016 From the US Patent and Trademark Office Re. U.S. Appl. No. 13/231,412. (10 Pages).

Notice of Allowance dated Dec. 12, 2017 From the US Patent and Trademark Office Re. U.S. Appl. No. 15/184,592. (13 Pages).

Official Action dated Nov. 5, 2015 From the US Patent and Trademark Office Re. U.S. Appl. No. 13/231,412. (5 Pages).

Official Action dated May 16, 2017 From the US Patent and Trademark Office Re. U.S. Appl. No. 15/184,592. (20 Pages).

Official Action dated Jun. 29, 2018 From the US Patent and Trademark Office Re. U.S. Appl. No. 10/311,555. (20 Pages).

\* cited by examiner

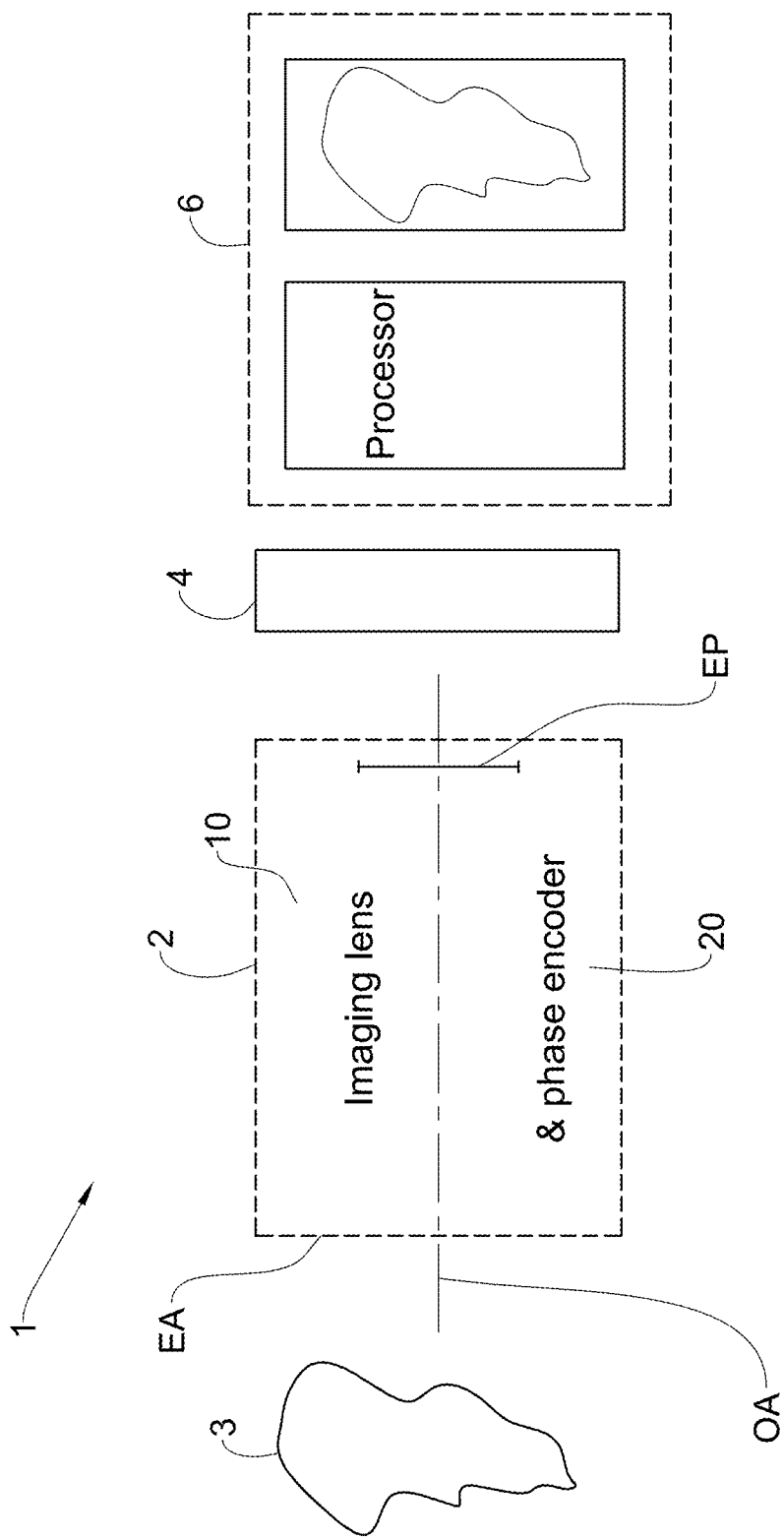

IMAGING SYSTEM AND METHOD FOR IMAGING OBJECTS WITH REDUCED IMAGE BLUR

RELATED APPLICATIONS

This application is a Continuation of U.S. patent application Ser. No. 16/386,927 filed on Apr. 17, 2019, which is a Continuation of U.S. patent application Ser. No. 15/916, 796 filed on Mar. 9, 2018, now U.S. Pat. No. 10,311,555, which is a Continuation of U.S. patent application Ser. No. 15/184,592 filed on Jun. 16, 2016, now U.S. Pat. No. 9,953,402, which is a Continuation of U.S. patent application Ser. No. 13/231,412 filed on Sep. 13, 2011, now U.S. Pat. No. 9,405,119, which is a Continuation In Part of PCT Patent Application No. PCT/IL2010/000214 having International Filing Date of Mar. 14, 2010, which claims the benefit of priority of U.S. Provisional patent application Nos. 61/293,782 filed on Jan. 11, 2010 and 61/167,194 filed on Apr. 7, 2009 and 61/159,841 filed on Mar. 13, 2009.

The contents of the above applications are all incorporated by reference as if fully set forth herein in their entirety.

FIELD OF THE INVENTION

This invention is generally in the field of imaging techniques and relates to an imaging device and system utilizing the same aimed to improve image quality by phase coding of light.

REFERENCES

The following references are used for facilitating understanding of the background of the present invention:
1. T. P. Costello and W. B. Mikhael, "Efficient restoration of space variant blurs from physical optics by sectioning with modified wiener filtering", Digital and image processing, 13, 1-22, (2003).
2. H. C. Andrews and C. L. Paterson, "Singular value Decomposition and digital image processing", IEEE. Trans. on ASSP. 24, 1, 26-53, (1976).
3. J. W. Goodman, Introduction to Fourier Optics (Mcgraw-Hill 1968).
4. M. Bertero and P. Boccacci, "Introduction to inverse problems in imaging", No. 86, 252, IOP, (1998).
5. R. W. Gerschberg and W. O. Saxton, A practical algorithm for the determination of phase from image diffraction plane picture, optic, 237-246, V35, N2, (1972).
6. R. Gonsalves, Phase retrieval and diversity in adaptive optics, Opt Eng, V21 829-832 (1982).
7. R. A. Gonsalves, et-al, Joint estimation of object and aberrations by using phase diversity J. Opt. Soc. Am. A, 1072-1085, V9 (1992).
8. R. A. Gonsalves, Nonisoplanatic imaging by phase diversity, Opt Lett. V19, 493-495, (1994).
9. M. G. Lofdahl, Multiframe deconvolution with space variant point spread function by use of inverse filtering and fast Fourier transform, V26 4686-4693, App Opt, (2007).
10. R. G. Paxman, J. H. Seldin, 'Phase-Diversity Data set and Processing Strategies, ASP Conf, V183, (1999).

BACKGROUND OF THE INVENTION

Image enhancement, expressed in improved image quality, is an ever-lasting quest in the construction of optical systems. Image quality may be represented by one or more characterizing parameters such as depth-of-focus, distortion, aberrations-related-blur, SNR or resolution, and the image improvement may be the result of an improvement in one or more of such parameters. Thus, for example, various optical components may be incorporated in an optical system with the aim of reducing aberrations. Various types of lens coating or other optical correctors (e.g. lenses) may be used with an imaging lens unit to reduce chromatic and/or spherical aberrations (coma or other blur sources) caused by the imaging lens unit.

In recent years, image processing techniques are also becoming a common tool used to enhance images, and significant improvement of images obtained from a given optical system may indeed be achieved by performing appropriate image post-processing on such images. The miniaturization of computerized processors and the subsequent proliferation of such processors in commercial commodities such as digital and video cameras, cellular phone cameras etc., have expedited the incorporation of computerized image enhancement utilities in such devices.

It is known to use an aperture coding (e.g. phase-coding) within the optical system and/or appropriate image processing, to improve the image quality. For example, U.S. Pat. No. 6,842,297 discloses Wavefront Coding Optics, which applies a phase profile to the wavefront of light from an object to be imaged, retain their insensitivity to focus related aberrations, while increasing the height of the resulting Modulation Transfer Functions (MTF's) and reducing the noise in the final image. US 2008/0131018 describes an image reconstruction technique utilizing algorithm applied on phase encoded image data to obtain an image in which the effects of phase perturbation are removed. This technique includes estimation of a degree of defocus in the obtained image, adjustment of the reconstruction algorithm to take into account the estimated degree of defocus, and application of the adjusted reconstruction algorithm to obtain a restored image.

GENERAL DESCRIPTION

There is a need in the art to facilitate imaging of an object to obtain improved image quality, e.g. signal-to-noise (SNR), resolution e.g. being free of or at least with significantly reduced blur and/or defocus effects. The present invention provides a novel imaging arrangement and an imaging system capable of improving the image quality.

The invention is associated with the inventors' understanding of the following: Defocus related blur is generally space invariant, namely the blur associated with the effect of defocus is substantially similar across the object plane. This means that the smear of an imaged point will be similar for different points in the image plane. However, a significant number of important blur sources are space variant. In other words, the blur associated with the image of different field points differs according to the location of the point with respect to the optical axis of the optical system. Such space variant blur sources may be for example coma, astigmatism, field curvature, distortion etc. Due to the different nature of the blur sources, methods of image enhancement that may be applied in cases of space invariant blur might not be suitable for cases of space variant blur. For example, in case of space variant blur, the well established methods of Fourier deconvolution cannot be used, and other image processing methods are needed. For cases where optical system aberrations are coma-like, an inversion method based on Mellin transform and one dimensional Fourier transform can generally be used. In the general case of space variant blur, under the limitation of boundary condition continuance (to prevent edge effects), an image can be divided into a mosaic of pseudo-space invariant zones [1]. If the mosaic method is not suitable, other methods should be considered.

The invention utilizes algebraic representation of an imaging system, suitable for space variant image restoration. An imaging optics having an algebraic representation can be described by a Point Spread Function (PSF) matrix. Hence, an object in the object plane and its image in the image plane can be represented by vector columns o and i, respectively, and the optics itself can be represented by a matrix H, the columns of which are the PSF for each field point. In this representation, the discrete image i may be obtained by the multiplication of the vector o by matrix H:

$$i = H \cdot o \quad (1)$$

Thus, a blur-free reconstruction of the object might theoretically be obtained by multiplying the image vector i by the inverse of the optics matrix, $H^{-1}$:

$$i^{restored} = H^{-1} \cdot i \quad (2)$$

However, image enhancement through the above image post-processing technique faces limitations when applied to conventional optical systems. For example, noise generated or collected by the optical system and added to the image may hinder the matrix inversion process. Additionally, the numerical processes involved in the image enhancement, for example, when matrix inversion is employed, might often increase the noise in the final image due to ill matrix condition.

Alternatively or additionally, such mathematical tool as Singular Value Decomposition (SVD) can be applied for image enhancement [2]. More specifically, when a representing matrix H of the optical system is not invertible or is ill-conditioned, SVD allows providing an approximate inverse to the matrix by truncating those matrix parts which are associated with the matrix low singular values. Inversion can also be executed by regularization or by least square method. However, it should be emphasized that all the above methods are sensitive to the matrix condition, as is explained in detail further below.

The invention utilizes affecting the algebraic representation matrix of an optical system (its imaging arrangement including one or more lenses or lens regions) to improve the matrix condition, and thereby to allow a more accurate image restoration by post-processing. The effect on the algebraic representation matrix to be achieved within the optical system is aimed at rendering the algebraic representation matrix rank-full (and improving the condition) and hence invertible, and additionally or alternatively, less susceptive to errors under matrix inversion in the post-processing procedure.

It should be understood that generally when an algebraic representation matrix of an optical system (as well as any other linear system) is rank-full, the matrix usually has a diagonal form in which all numbers on the main diagonal are different than zero, and the matrix is invertible. When an algebraic representation matrix of an optical system is rank-deficient, a diagonal form of the matrix may generally have at least one or a few zeros on the main diagonal, and the matrix is therefore not invertible. In either case, i.e. operating with an optical system having rank-full or rank-deficient algebraic representation matrix, the present invention affects algebraic representation matrix to facilitate its inversion by improving its condition.

Thus, in its general aspect, the present invention provides a monitoring system for monitoring operation of a linear system, being a mechanical and/or optical. The monitoring system comprises a main measurement system characterize by an algebraic representation matrix H, an auxiliary measurement system characterized by an auxiliary system matrix O, and a control unit. The main and auxiliary measurement systems are configured and operable for performing a finite series of n measurements from n locations of said linear mechanical system. The control unit is configured and operable to process data indicative of said measurements performed by the auxiliary system according to predetermined decomposition transformation matrixes and to sum main system measured data with the processed auxiliary data, thereby obtaining measured data corresponding to an improved conditioned parallel measurement system More specifically, considering for example an imaging arrangement, according to some embodiments of the invention, it provides for using phase encoder applied to a light field passing through an optical system (lens system). The lens system has a certain algebraic representation matrix of a diagonalized form defining a first Condition Number. The phase encoder is configured to effect a second Condition Number of an algebraic representation matrix of the imaging arrangement (lens system and phase encoder), where the second Condition Number is smaller than the first Condition Number.

In some embodiments, the phase encoder comprises a first pattern which is located in a first region, aligned, along an optical axis of the lens system, with a part of the effective aperture of the imaging arrangement, leaving a remaining part of the effective aperture free of the first pattern. The geometry of the first region and configuration of the first pattern are selected to define a predetermined first phase correction function induced by the first pattern onto the light field passing therethrough to achieve said effect of Condition Number. The phase encoder may be configured for additionally encoding the amplitude of light passing therethrough (e.g. the encoder has an additional amplitude pattern, i.e. a transmission profile).

The geometry of the first region and configuration of the first pattern are preferably selected such that the first phase correction function corresponding to the phase encoder satisfies a predetermined condition with respect to a phase correction function induced by the remaining part of the effective aperture (e.g. by the lens). Preferably, the predetermined condition is such that the first phase correction function value, along the first region, is not smaller than or does not exceed the phase correction function induced by the remaining part of the effective aperture.

It should be understood that the phase correction function P(x,y) which is induced by the phase encoder for improving the matrix condition according to this invention, can have various shapes and symmetries. It should further be understood that a region where the phase correction function P(x,y) varies (continuously or step-wise), corresponds to the patterned region of the phase encoder.

Referring to the patterned region of the phase encoder, the following should be noted: In some embodiments, the patterned region can be restricted to a rim (periphery) of the effective aperture of the optical system. In some other embodiments it could be located away from the rim of the effective aperture or in its center. In some further embodiments, it could have full rotational symmetry surrounding or being enclosed by a lensing region, or can have only discrete rotational symmetry. In yet further embodiments, the patterned region and the corresponding phase correction function P(x,y) can have reflection symmetry. Likewise, according to yet further embodiments of this invention, phase correction function P(x,y) can have yet further shapes and symmetries, for accomplishing the above mentioned improvement of the matrix condition.

According to some embodiments of the invention, it provides for using "regular" optical systems (i.e. systems with no phase coding), being integral within the same optical unit or not, for imaging the same object (concurrently or not) with different numerical apertures of light collection. Then, image processing is applied to the so-captured images. The image processing utilizes duplicating and shifting of the image, corresponding to the first numerical aperture of light collection, with respect to the other image, corresponding to the other (second) numerical aperture of light collection, and then further processing the so-obtained multiple image data. The images are combined into one image corresponding to that obtainable with an optical system with the improved condition matrix representation.

It should be understood, that the invention may be associated with a single optical system, successively functioning as a main system and an auxiliary system. This is the so-called "multiple-exposure" (e.g. "double-exposure") technique.

The invention, in its either aspect, allows using in optical system an imaging lens having a large Numerical Aperture (NA). Such an optical system will work in weak luminance but would suffer from space variant blur due to large aberrations. For example, by employing the invention, operation of the optical system having an imaging lens with high NA of 0.35 can be improved to have the image quality of a system using an imaging lens with NA of 0.29.

Thus, according to one broad aspect of the invention, there is provided an imaging arrangement (device) having an effective aperture and comprising: a lens system having an algebraic representation matrix of a diagonalized form defining a first Condition Number, and a phase encoder utility adapted to effect a second Condition Number of an algebraic representation matrix of the imaging device, smaller than said first Condition Number of the lens system.

In some embodiments, the phase encoder comprises a first pattern which is located in a first region aligned, along an optical axis of the lens system, with a part of said effective aperture, leaving a remaining part of the effective aperture free of said first pattern. The geometry of said first region and configuration of said first pattern therein are selected to define a predetermined first phase correction function induced by said first pattern into light passing therethrough, Preferably, the geometry of the first region and configuration of the first pattern are selected such that the first phase correction function satisfies a predetermined condition with respect to a phase correction function induced by the remaining part of the effective aperture. The predetermined condition may be such that the first phase correction function value, along the first region, is not smaller than or does not exceed the phase correction function induced by said remaining part of the effective aperture.

In some embodiments, the algebraic representation matrix is a Point Spread Function (PSF) matrix. The diagonalized form of the algebraic representation matrix is a Singular Value Decomposition (SVD), or may be a Fourier Decomposition or other diagonalized form.

The first region having said first pattern may be arranged around said optical axis, e.g. having a ring-like geometry.

The first pattern may be a continuous pattern along the first region, or may be in the form of a plurality of patterned segments arranged in a spaced-apart relationship along said first region. The patterned segments of the first pattern may comprise at least one lens segment, or an array of lens segments.

The first phase correction function may be rotationally symmetric around the optical axis; or may vary along the first region being kept either larger or smaller than that of the phase correction function within said remaining part of the effective aperture.

The first region may be located within a periphery of the effective aperture, while the remaining part is located within a central region of the effective aperture. Alternatively, the first region may be located within a central region of the effective aperture surrounded by said remaining part.

The first region may be located substantially at an exit pupil of the lens system. The first region may be located upstream or downstream of the lens system along said optical axis; or within the lens system being upstream or downstream of the main plane thereof.

The phase encoder may be integral with a lens of the lens system. The first pattern may be in the form of an array of spaced-apart regions of a material of a refractive index different from that of the lens. The first pattern may be in the form of a profile of a varying surface of a lens of the lens system.

According to another broad aspect of the invention, there is provided an imaging system comprising the above-described imaging arrangement, a detection unit, and a control system. The latter is configured and operable to process and analyze data indicative of images detected by the detection unit by applying to the data inversion of a predetermined PSF matrix corresponding to the algebraic representation matrix of an optical system having space-variant aberrations.

According to yet further aspect of the invention, there is provided an imaging system comprising:
an imaging device comprising a basic lens system and a phase encoder and defining an effective aperture, the basic lens system having an algebraic representation matrix of a diagonalized form defining a first Condition Number, the phase encoder being configured to effect a second Condition Number of an algebraic representation matrix of the imaging device, the phase encoder comprising a first pattern which is located in a first region aligned, along an optical axis of the lens system, with a part of said effective aperture, leaving a remaining part of the effective aperture free of said first pattern, geometry of said first region and configuration of said first pattern therein being selected to define a predetermined first phase correction function induced by said first pattern onto light passing therethrough, the second Condition Number of the imaging device being thereby smaller than said first Condition Number of the lens system;
an image detection unit, and
a control system configured and operable to process and analyze data indicative of images detected by said detection unit to restore an image of an object with significantly reduced image blur.

The invention also provides an imaging system comprising:
an optical system comprising first and second lens systems with the common field of view, wherein a first lens system has a first optical axis and a first Numerical Aperture; and a second lens system has a second optical axis parallel to and spaced-apart from said first optical axis and a second Numerical Aperture smaller than said first Numerical Aperture, an imaging detection unit for detecting light collected by the first and second lens systems and generating image data indicative thereof; and a control system for receiving and processing said image data, the processing comprising duplicating and shifting a second image, corresponding to the light collected by the second lens system, with respect to a first image, corresponding to light collected by the first lens system, and producing a reconstructed image data.

The invention also provides an image processing method comprising: receiving image data, said image data comprising a first data portion corresponding to a first image of a region of interest with a certain field of view and a Numerical Aperture of light collection and a second data portion corresponding to a second image of said region of interest with said certain field of view and a Numerical Aperture of light collection; and processing the image data by duplicating and shifting the second image with respect to the first image and producing a reconstructed image data. The Numerical Apertures corresponding to the first and second images may or may not be the same.

In its further aspect, the invention provides a method for reducing image blur in an optical system, the method comprising:

obtaining an algebraic representation matrix of an optical system;

diagonalizing said algebraic representation matrix, thus obtaining a first diagonal matrix S;

selecting n eigenvalues from a total of N eigenvalues of said diagonal matrix S, which are located in n positions, respectively, along a diagonal of said diagonal matrix S.

selecting a second diagonal matrix ΔS having substantially the same size as said first diagonal matrix S, said second diagonal matrix ΔS having n numbers on its diagonal in positions corresponding to said n respective positions in the first diagonal matrix S, and having all other numbers equal zero.

applying an inverse operation of said diagonalization on the matrix sum of first diagonal matrix S and second diagonal matrix ΔS, thus obtaining a third matrix O.

applying a correction function on light passing through the optical system, such that an algebraic representation matrix of the optical system affected by said correction function, approximates matrix O.

BRIEF DESCRIPTION OF THE SEVERAL VIEWS OF THE DRAWING(S)

In order to understand the invention and to see how it may be carried out in practice, embodiments will now be described, by way of non-limiting example only, with reference to the accompanying drawings, in which:

FIG. 1 is a schematic illustration of an imaging system suitable for implementing the present invention;

Figure 4A:
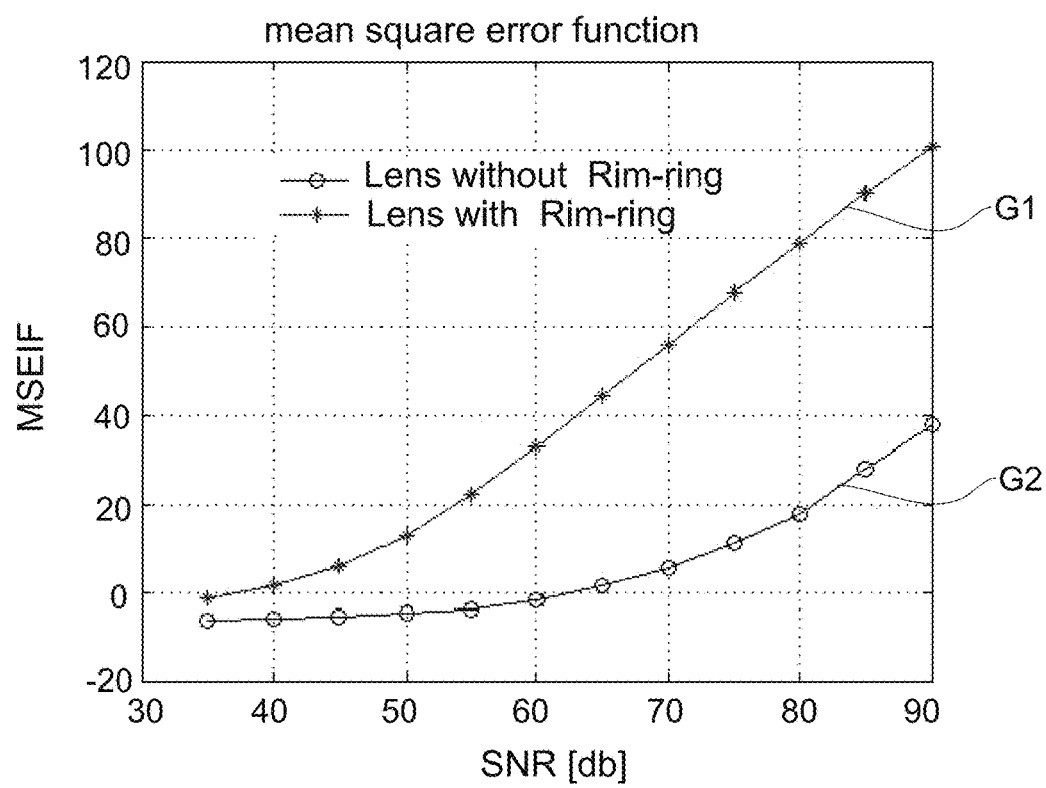
Figure 4B:
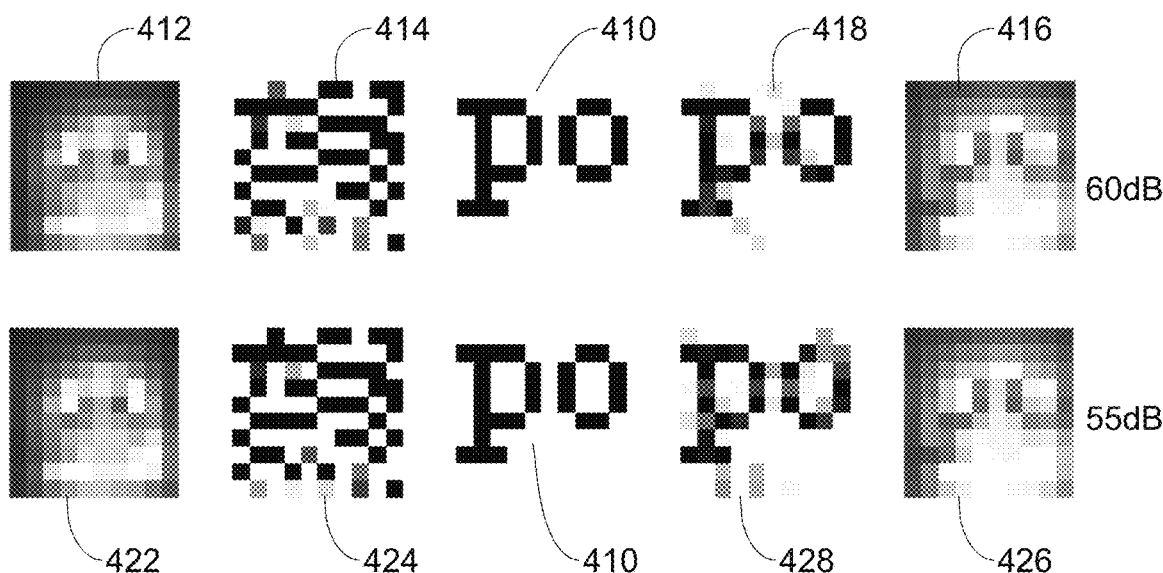
Figure 4C:
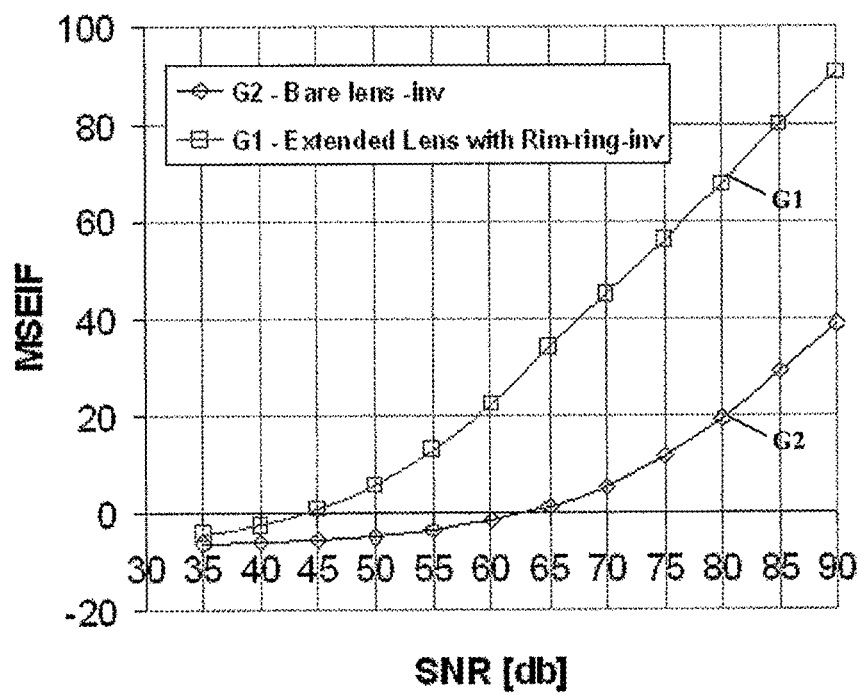
Figure 4D:
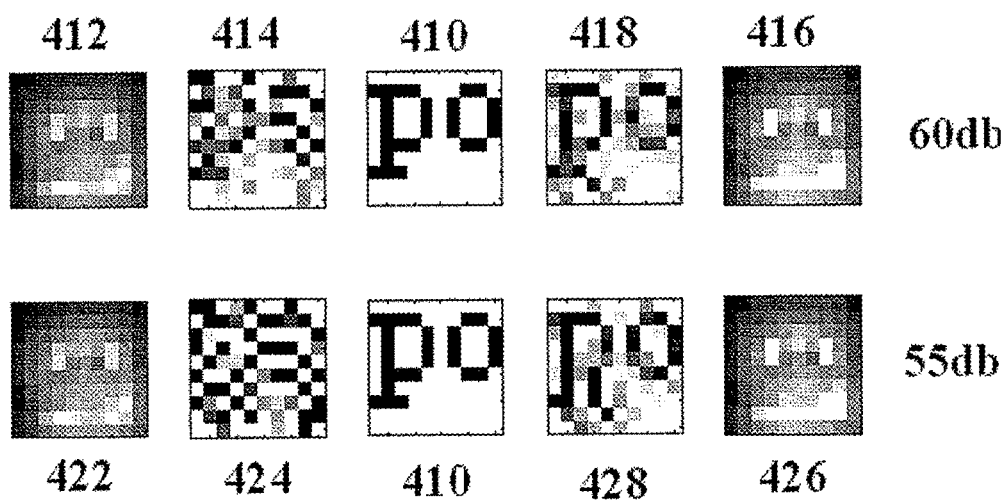
Figure 5A:
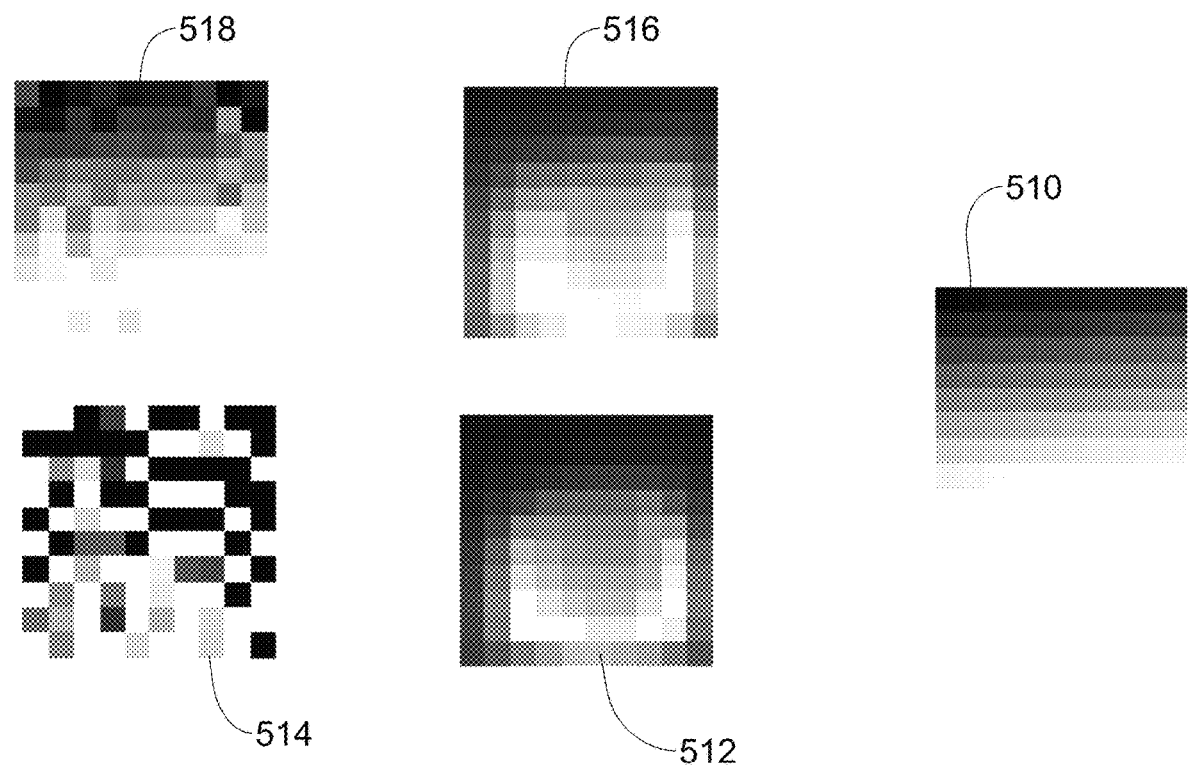
Figure 5B:
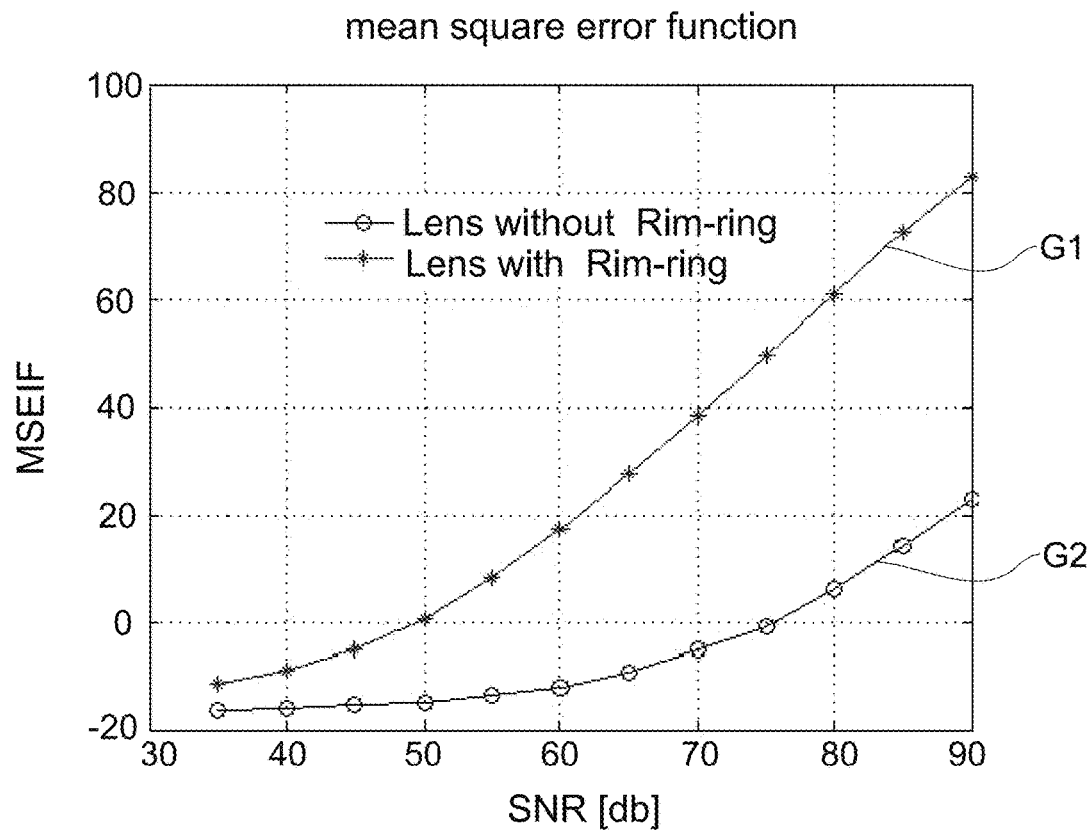
Figure 5C:
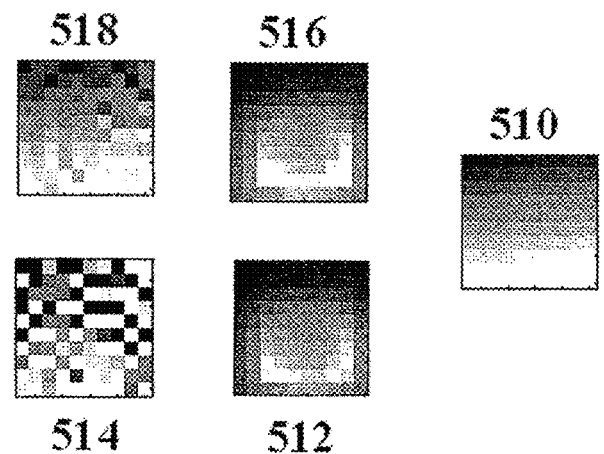
Figure 5D:
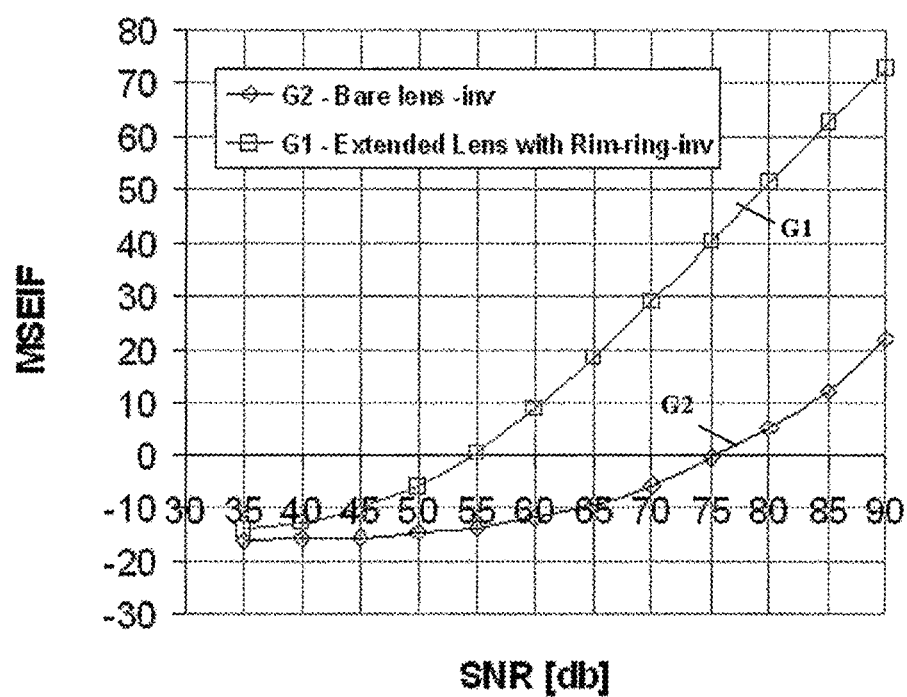
Figure 6A:
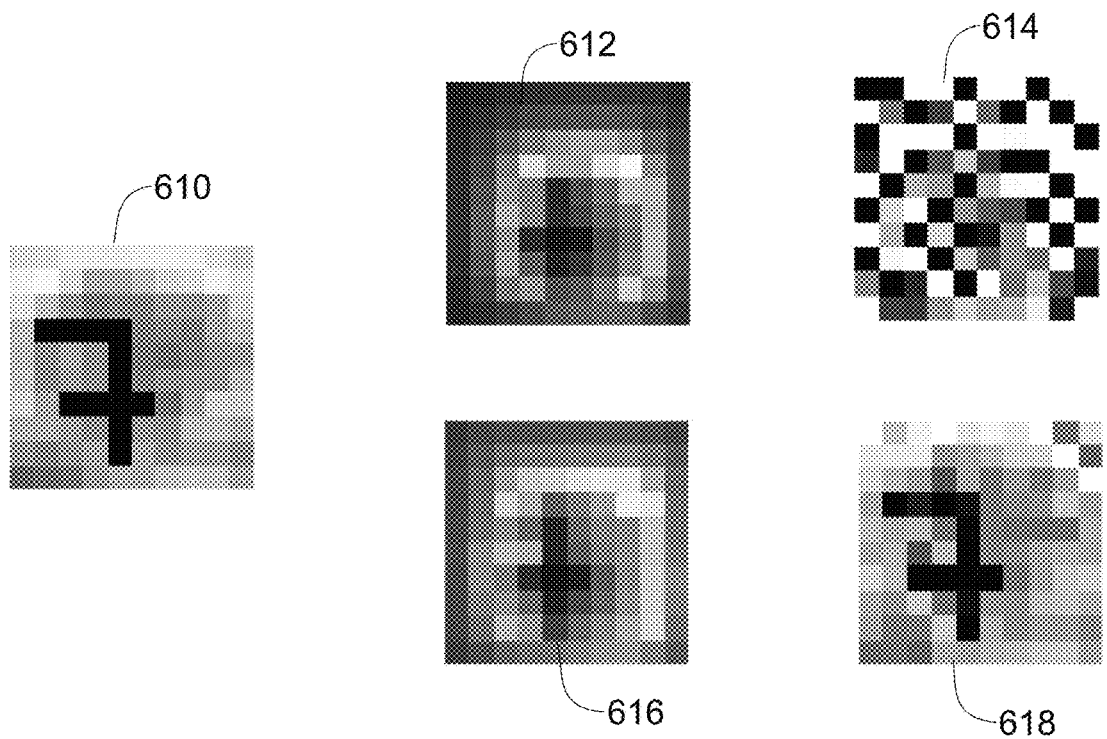
Figure 6B:
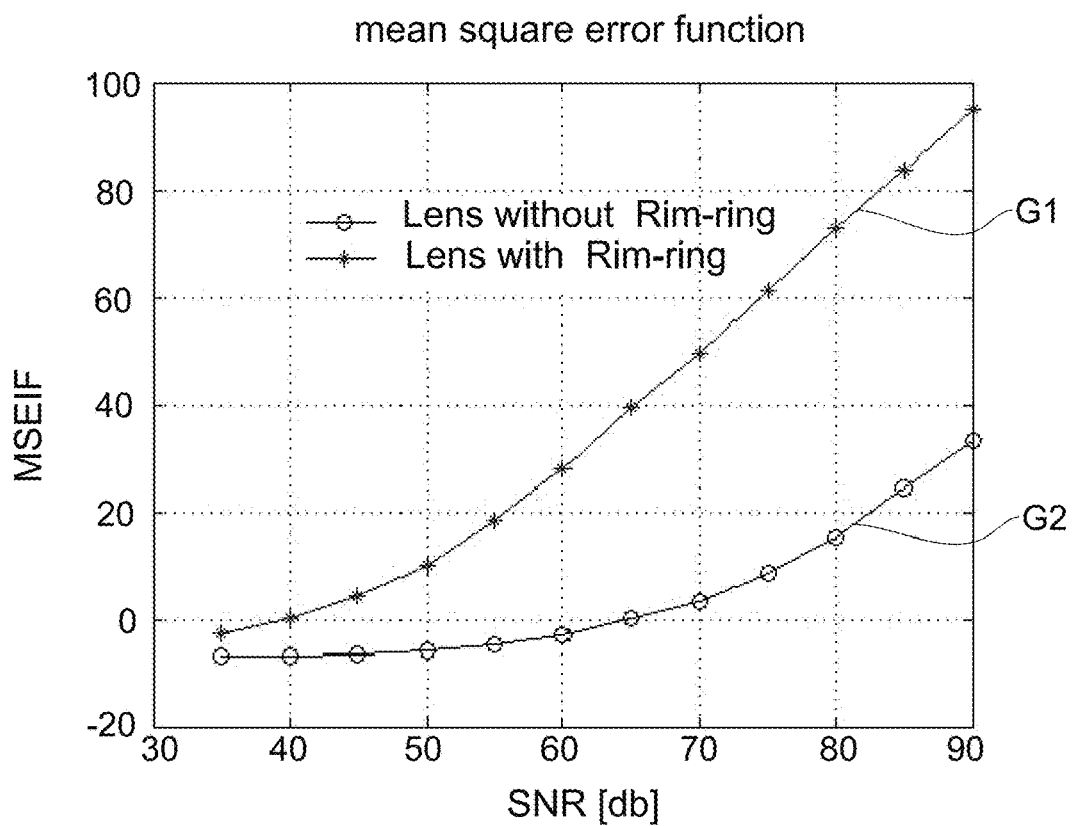
Figure 6C:
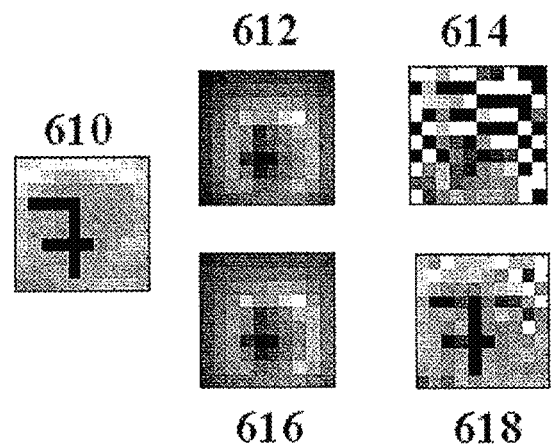
Figure 6D:
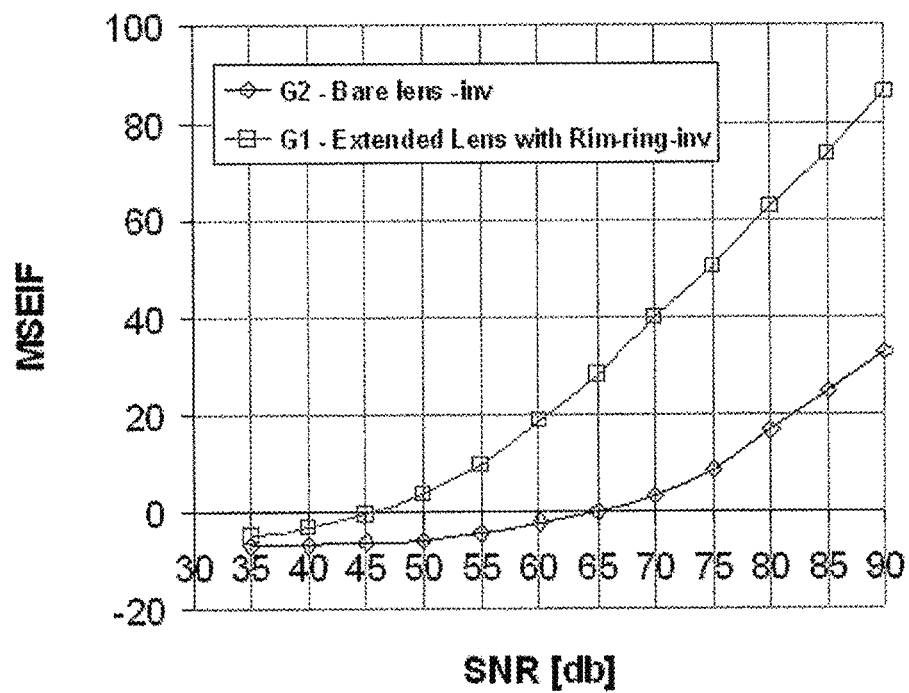
Figure 7A:
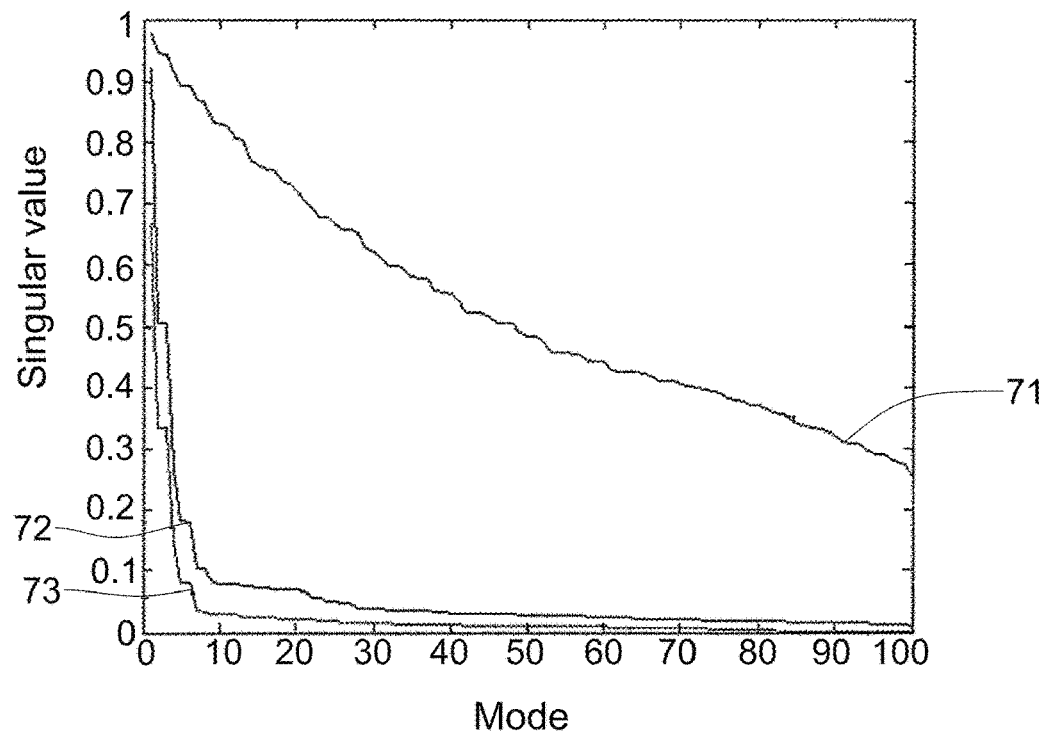
Figure 7B:
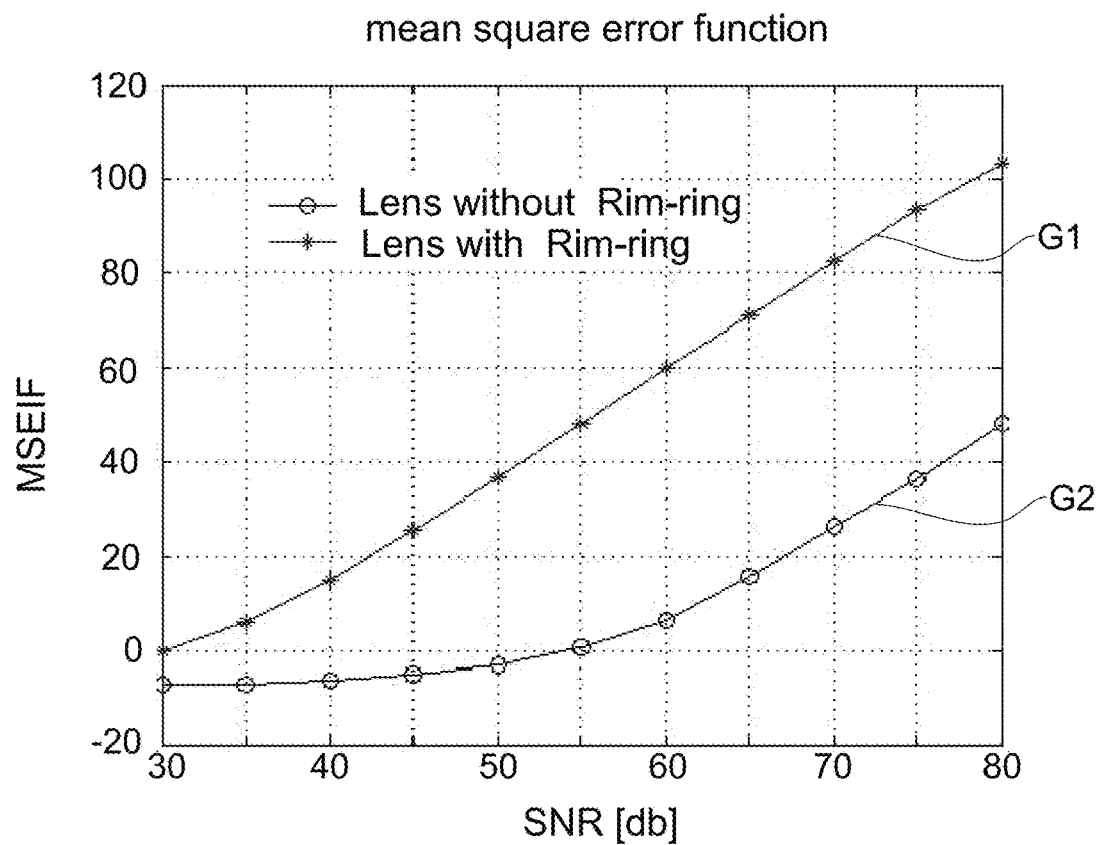
Figure 7C:
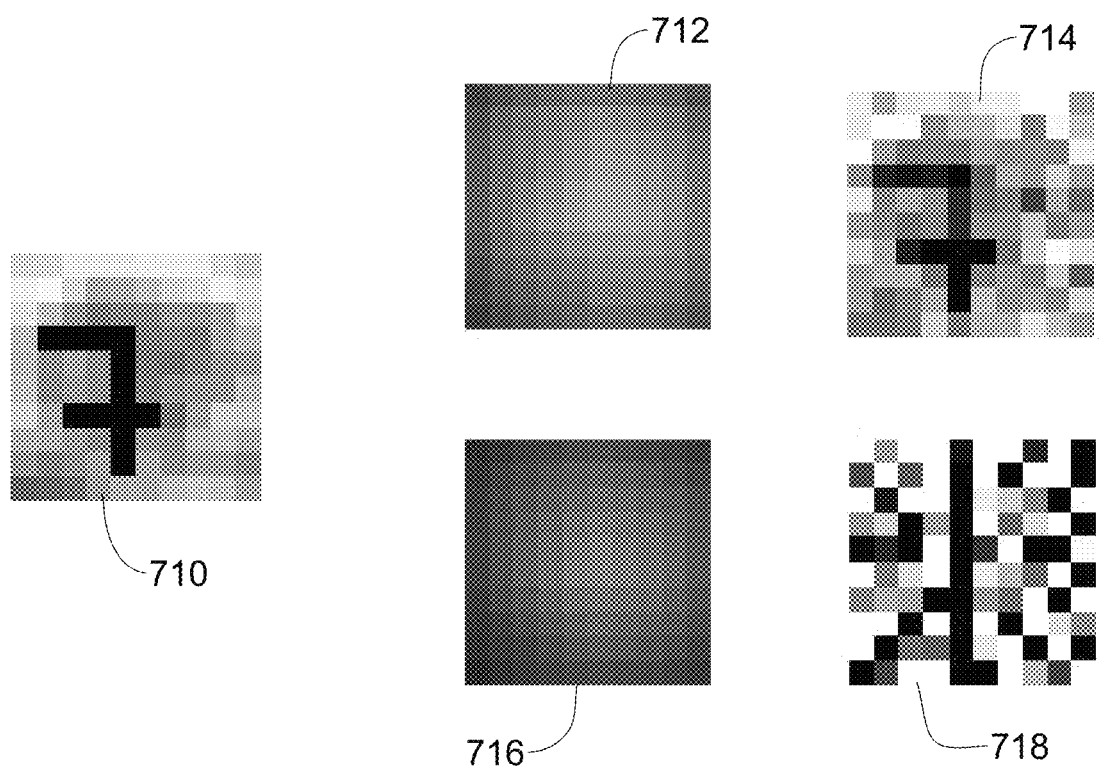
Figure 8:
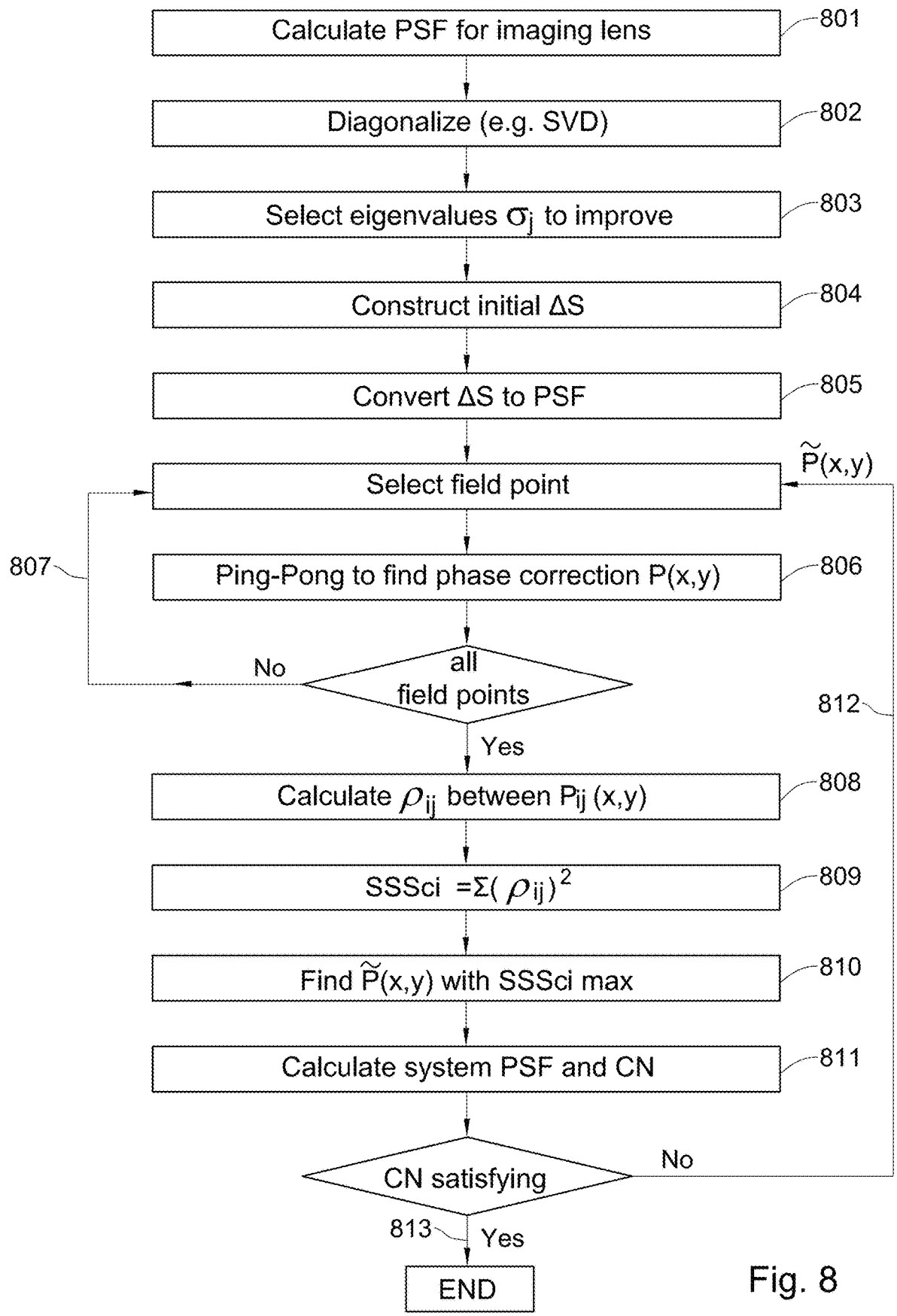
Figure 9A:
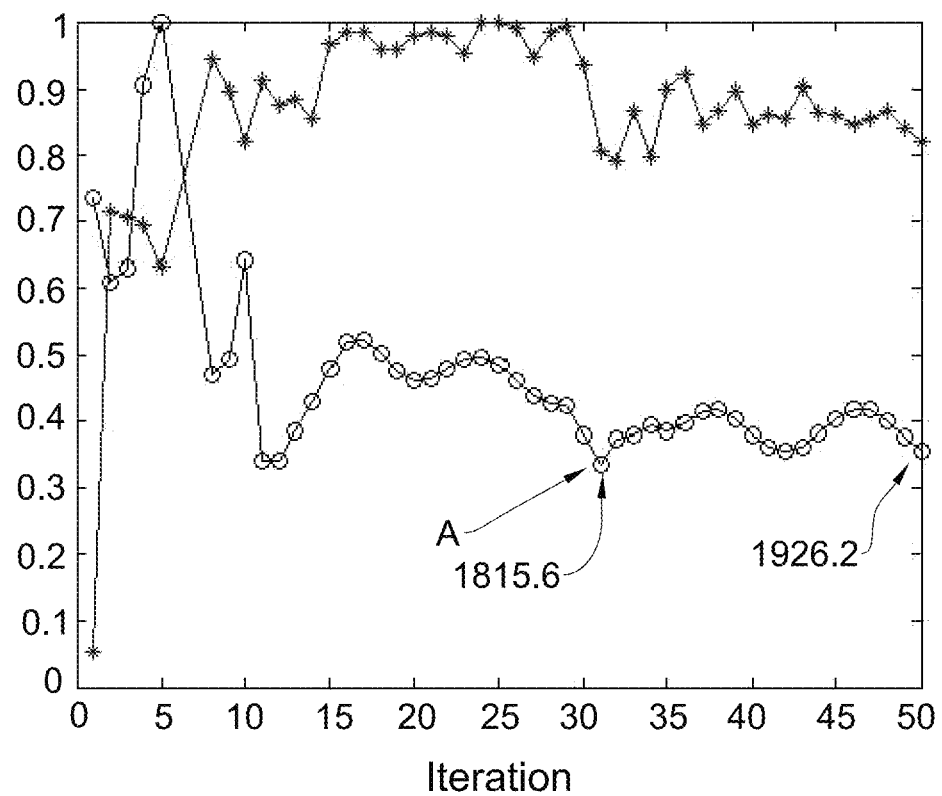
Figure 9B:
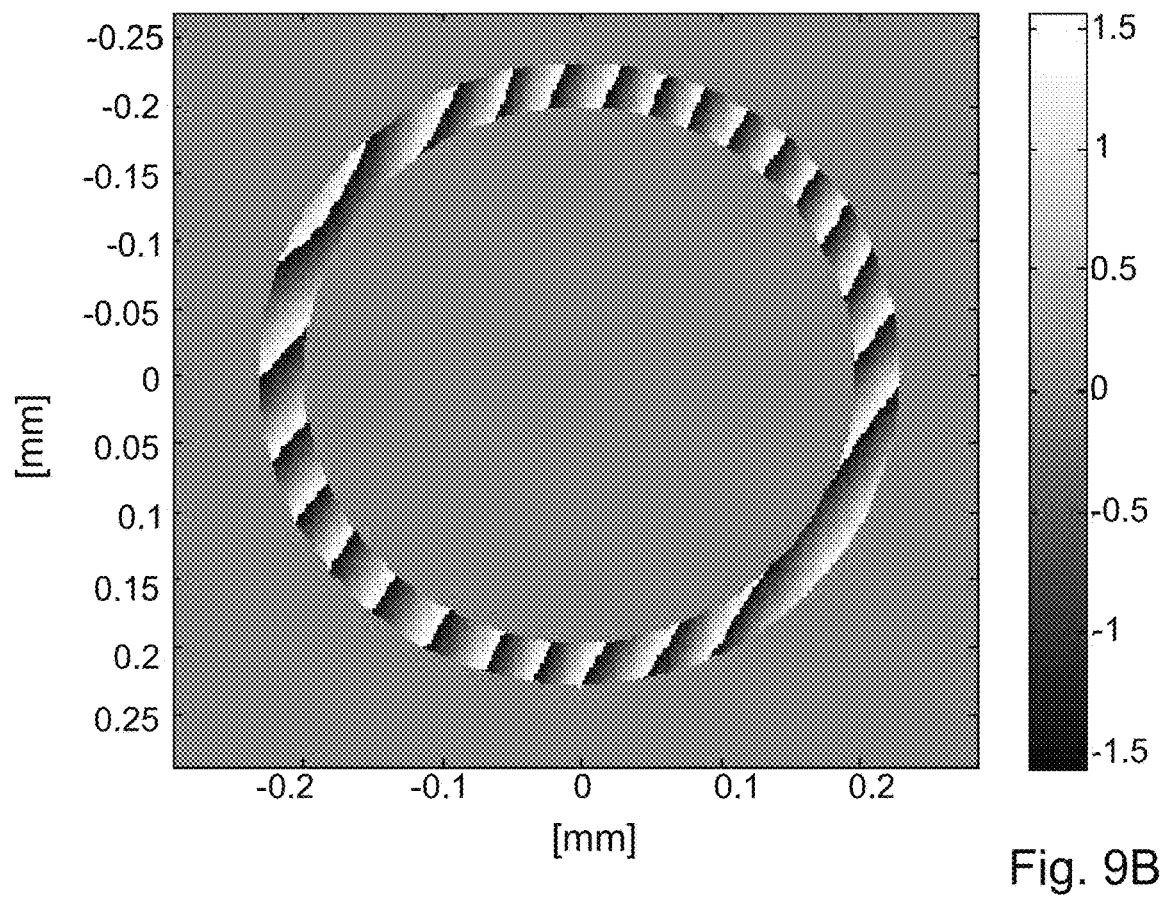
Figure 9C:
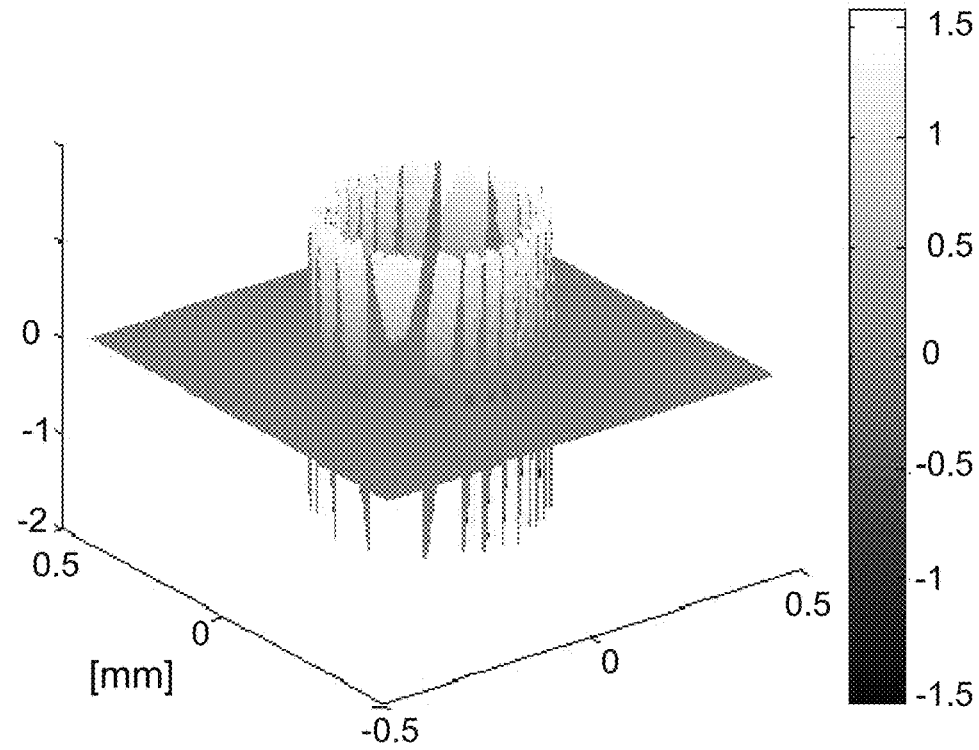
Figure 9D:
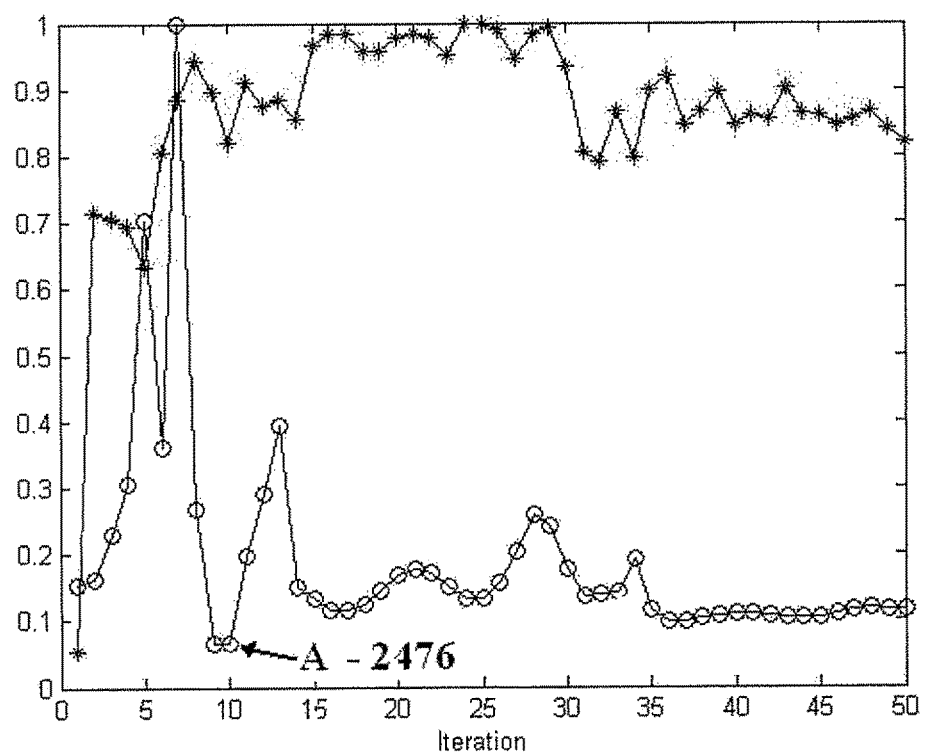
Figure 9E:
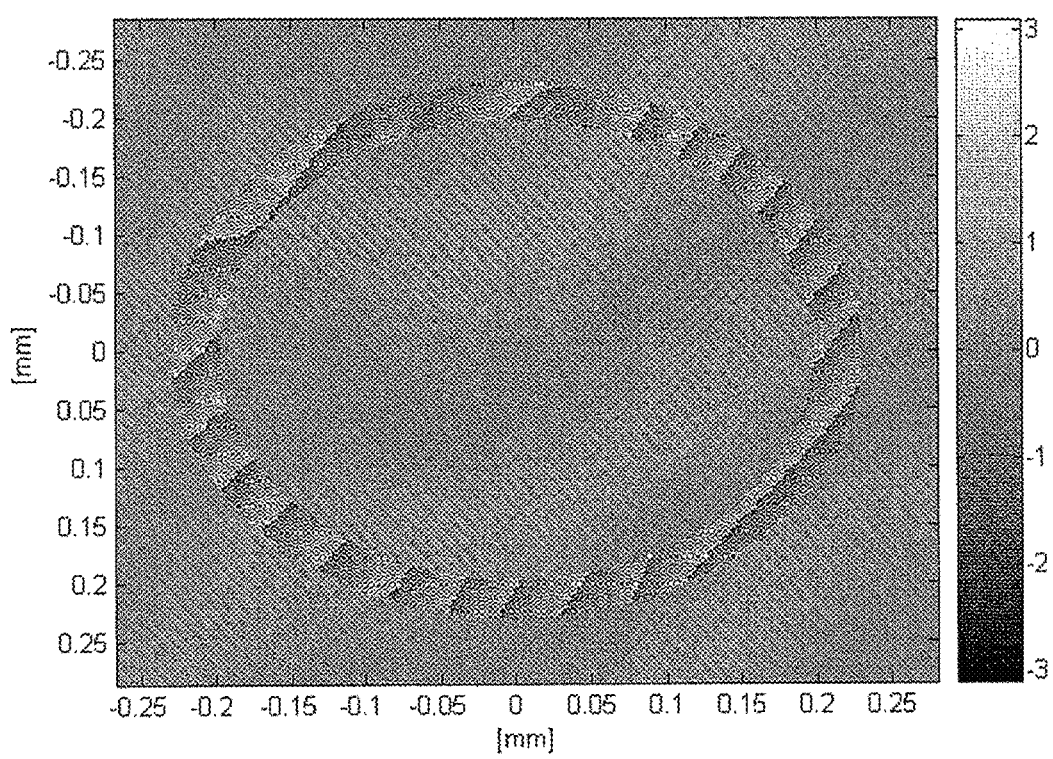
Figure 9F:
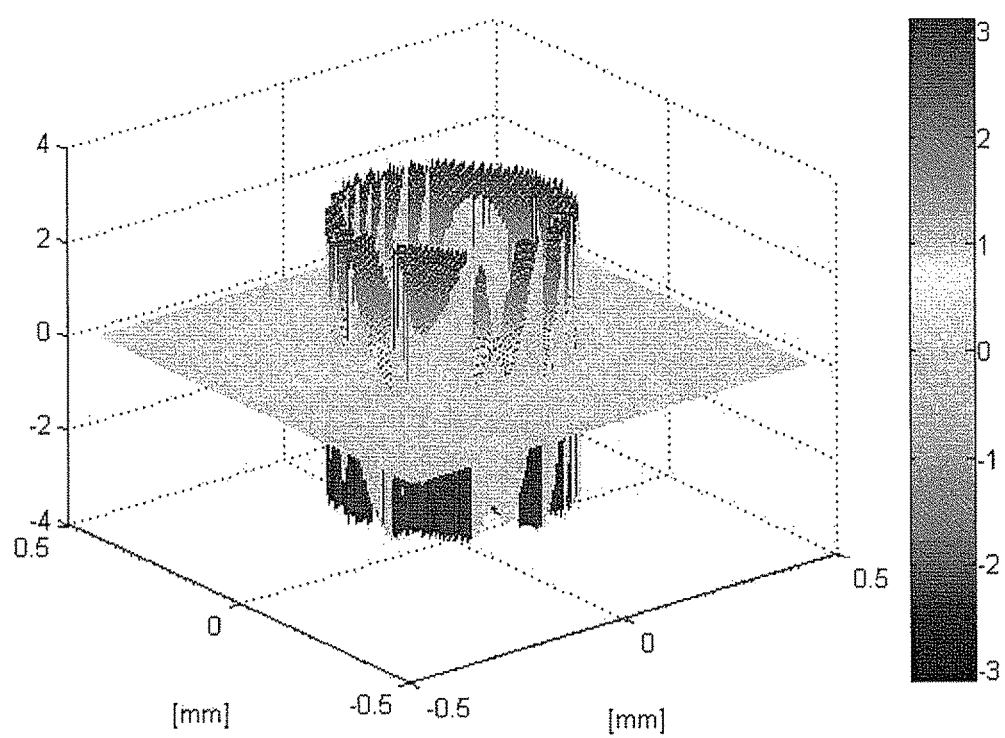
Figure 10A:
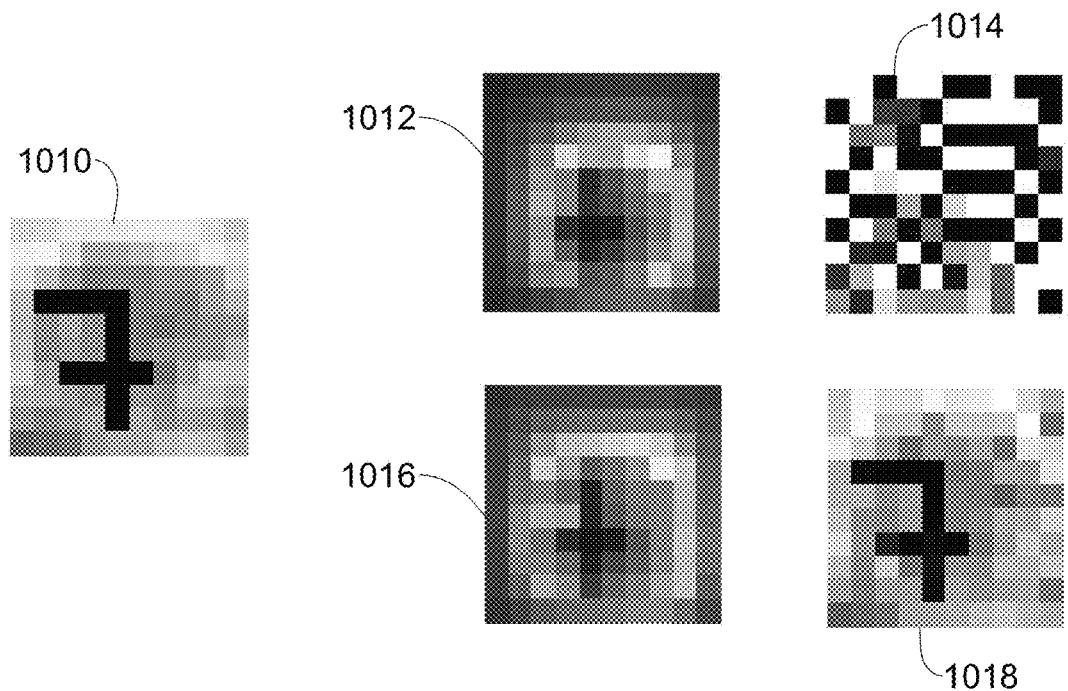
Figure 10B:
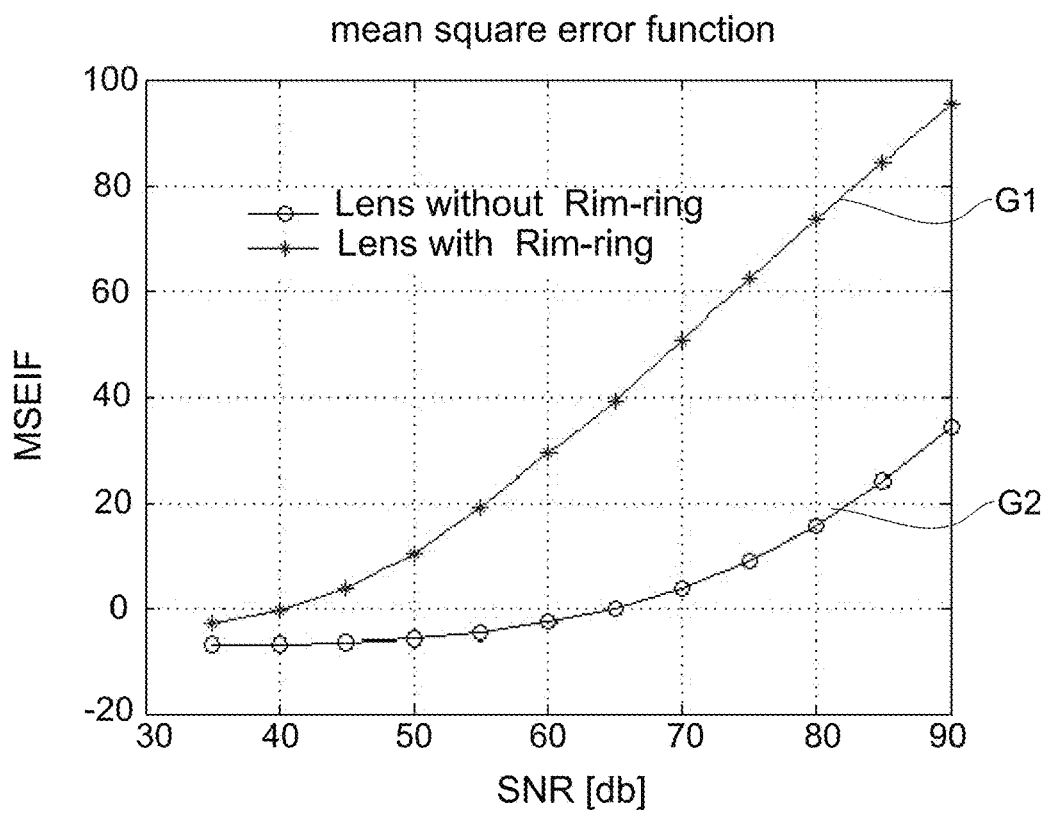
Figure 10C:
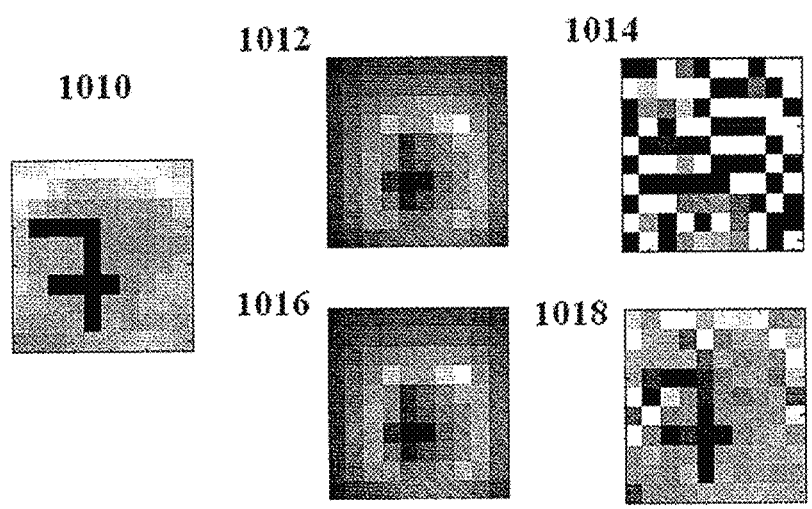
Figure 11A:
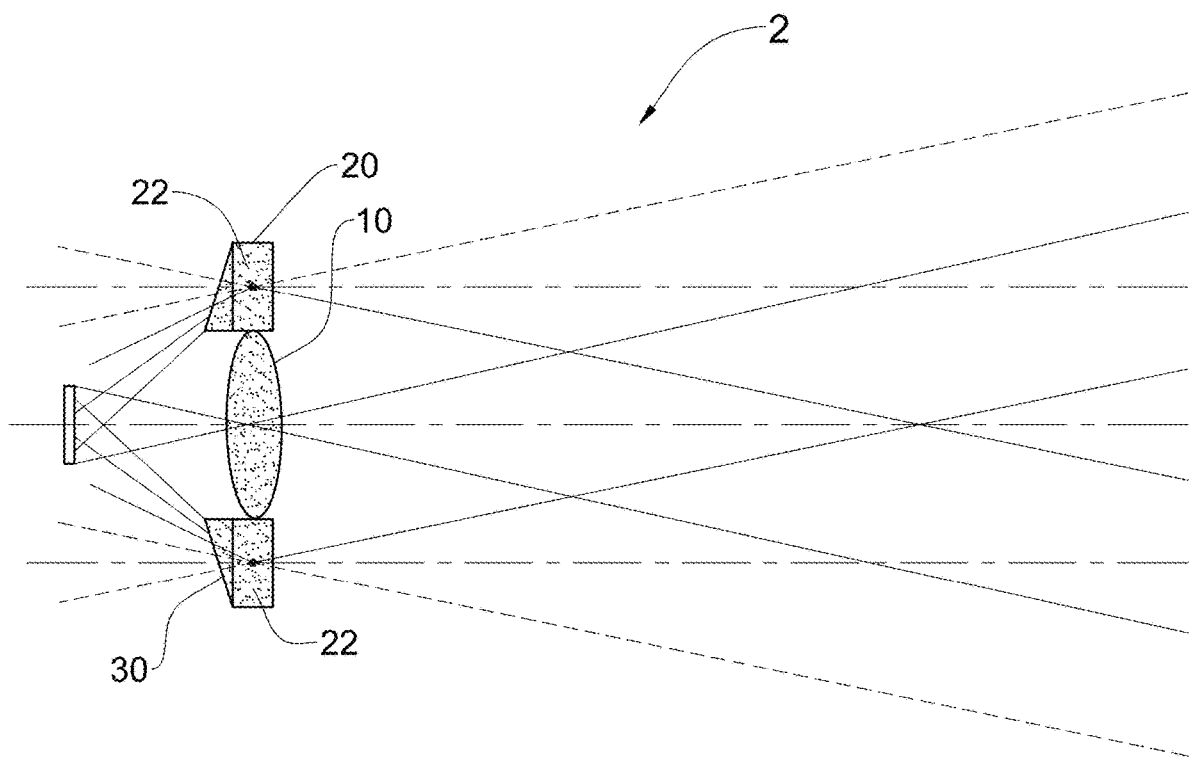
Figure 11B:
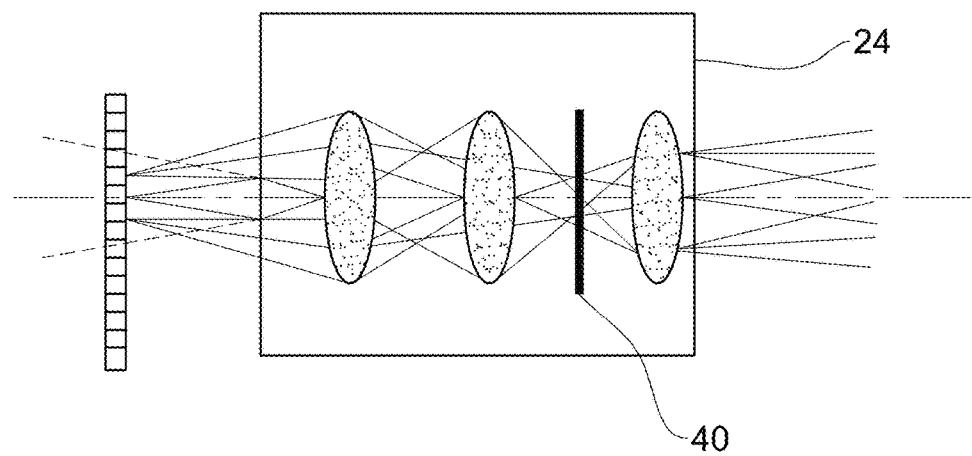
Figure 12:
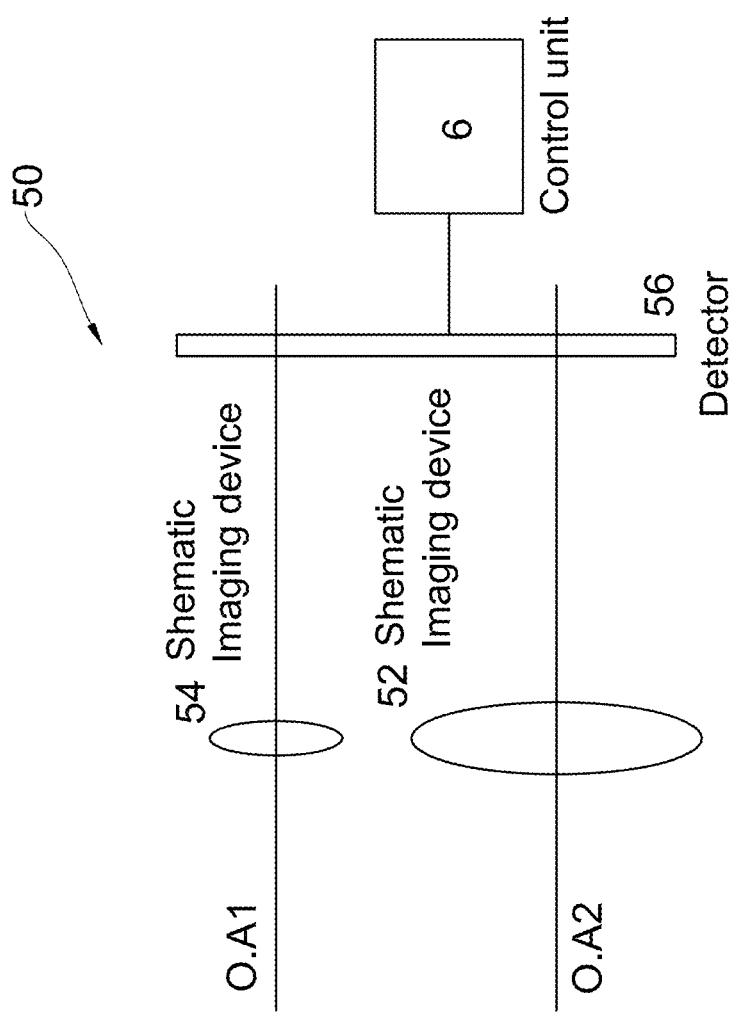
Figure 13A:
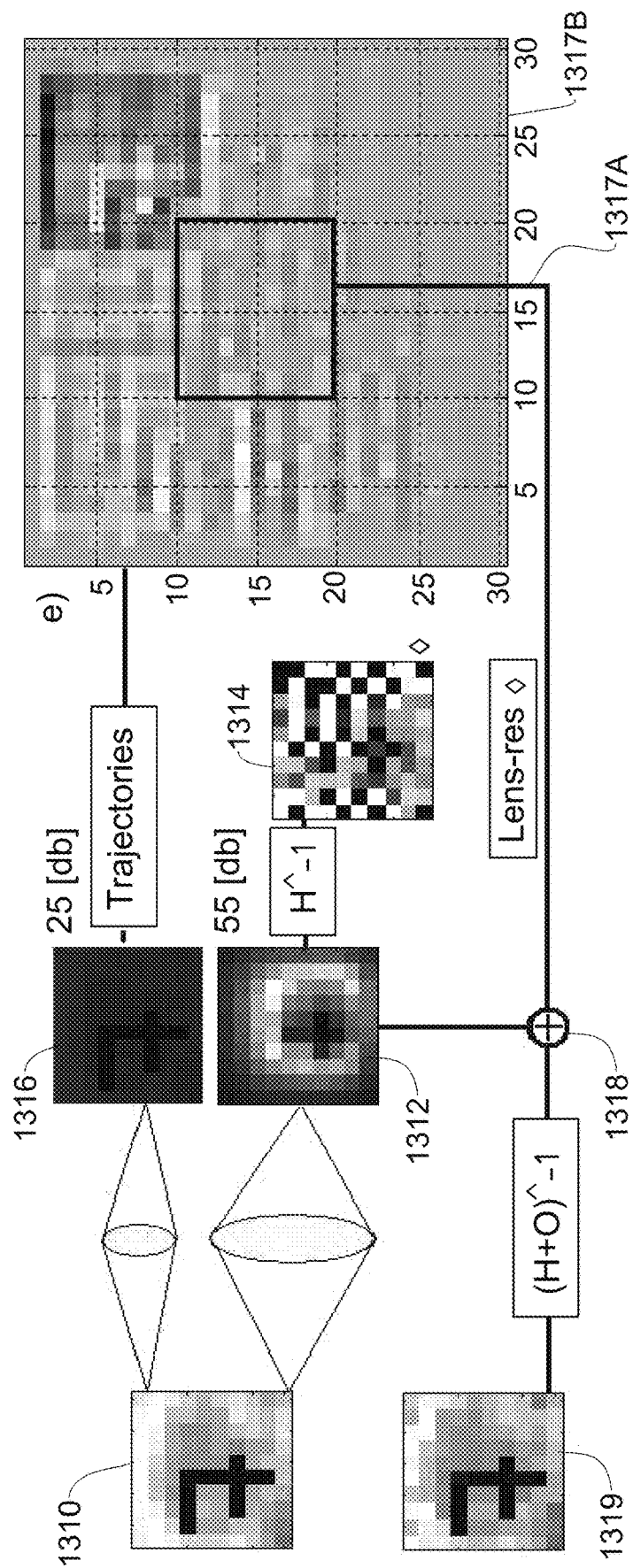
Figure 13B:
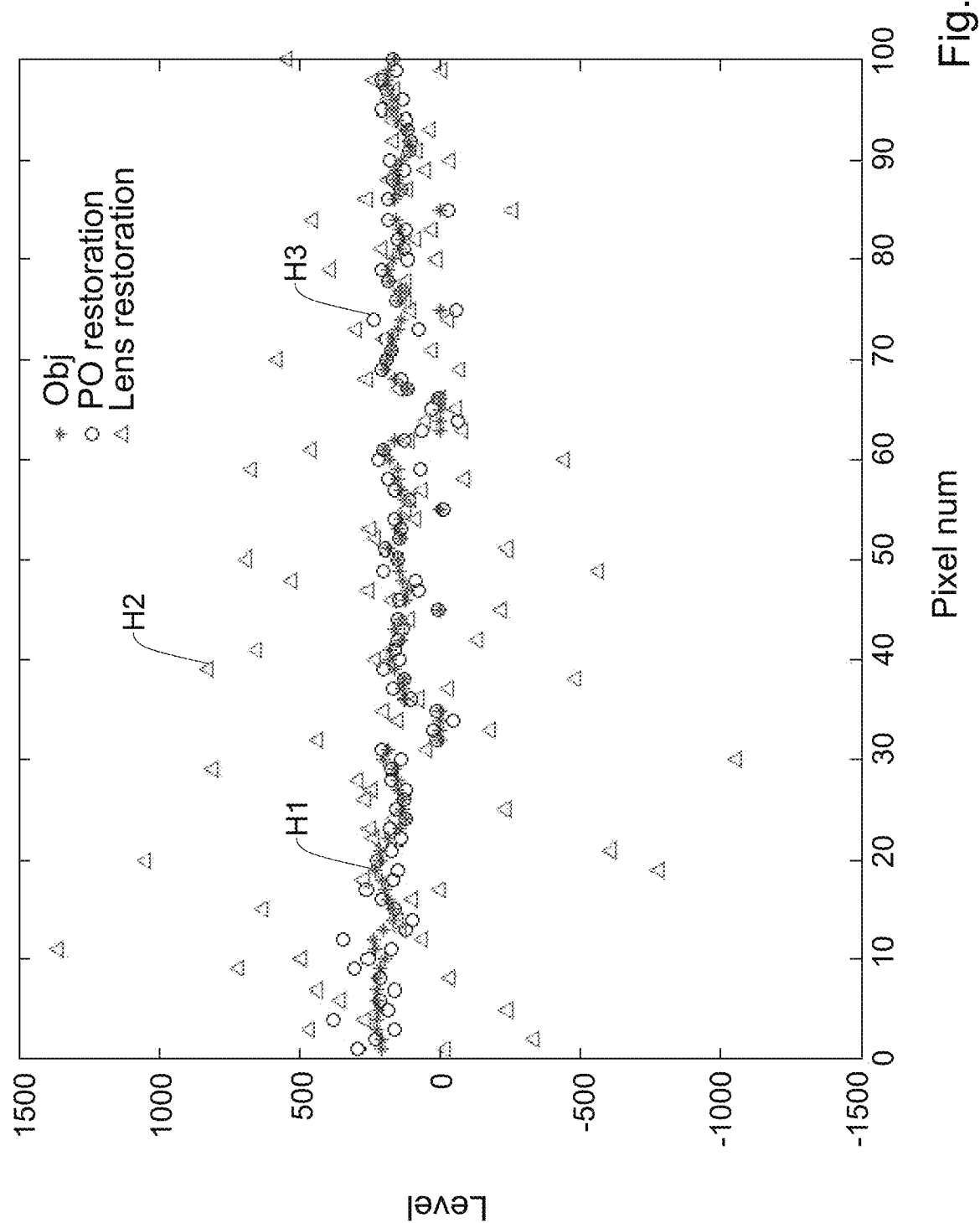
Figure 13C:
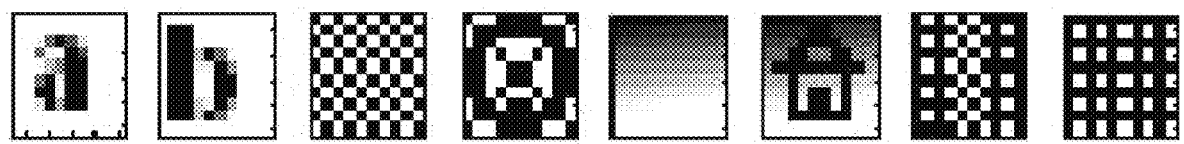
Figure 13D:
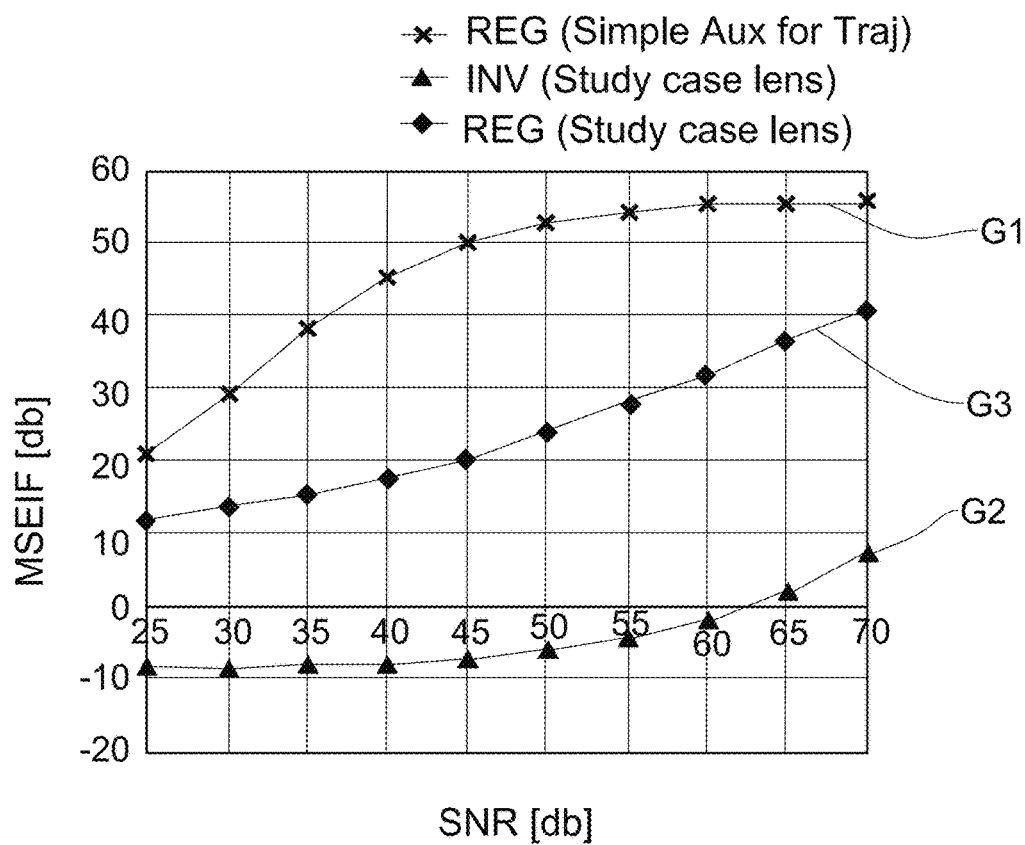
Figure 13E:
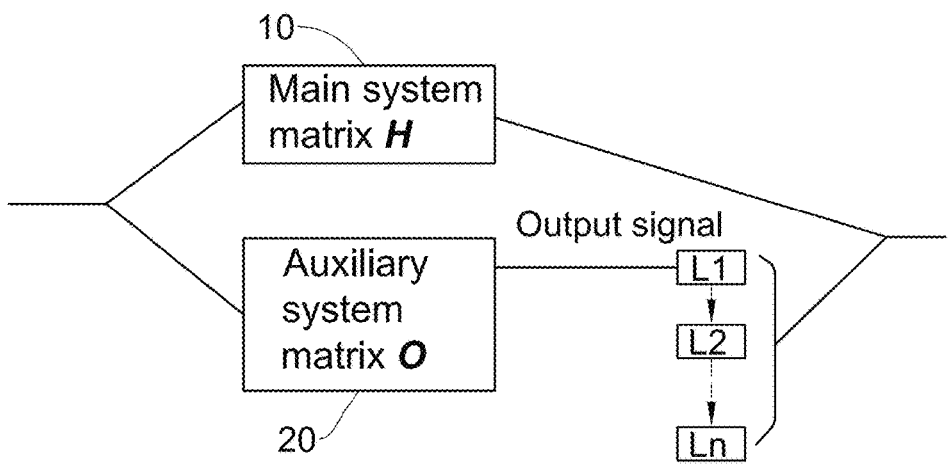
Figure 14:
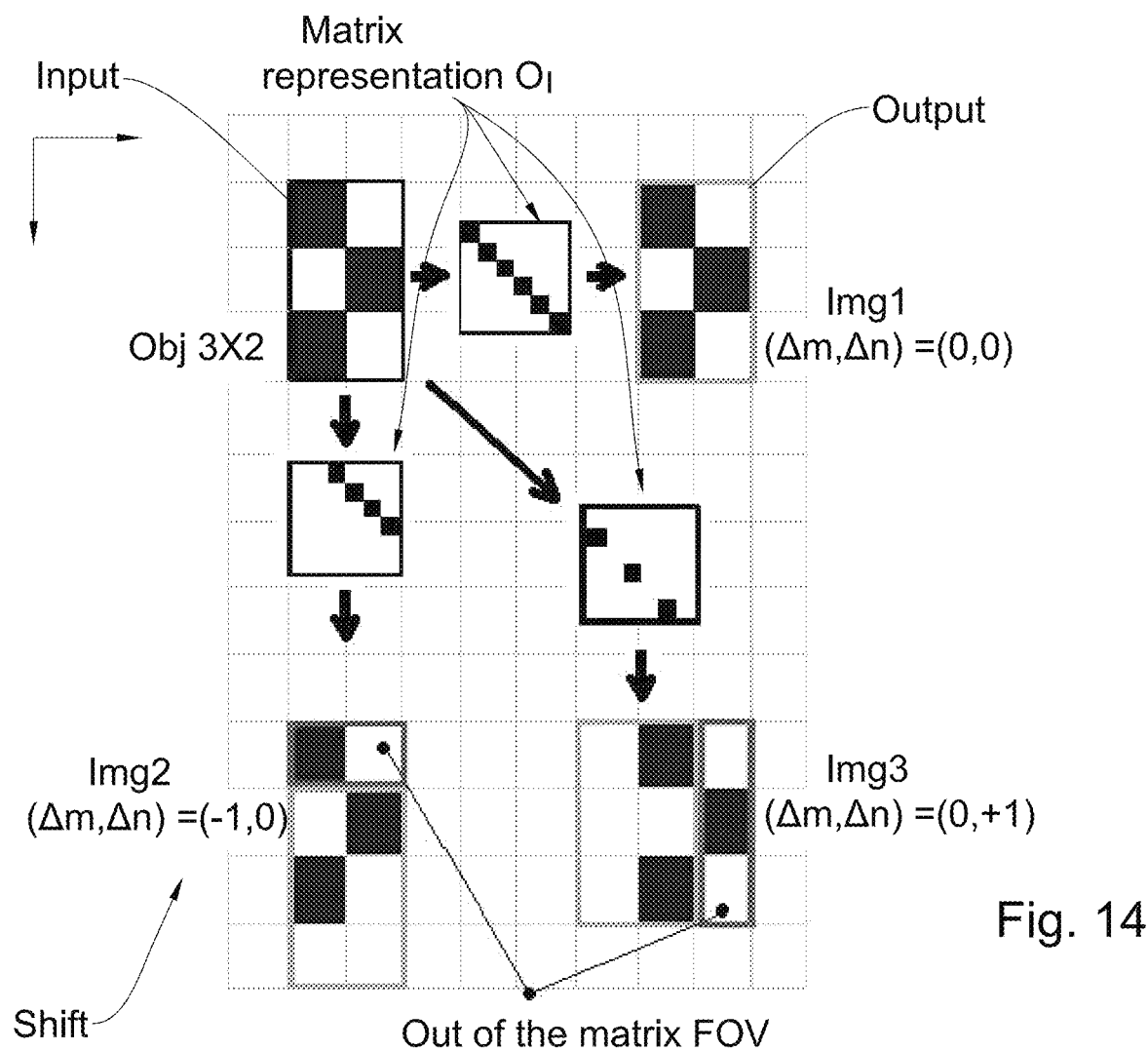
Figure 15B:
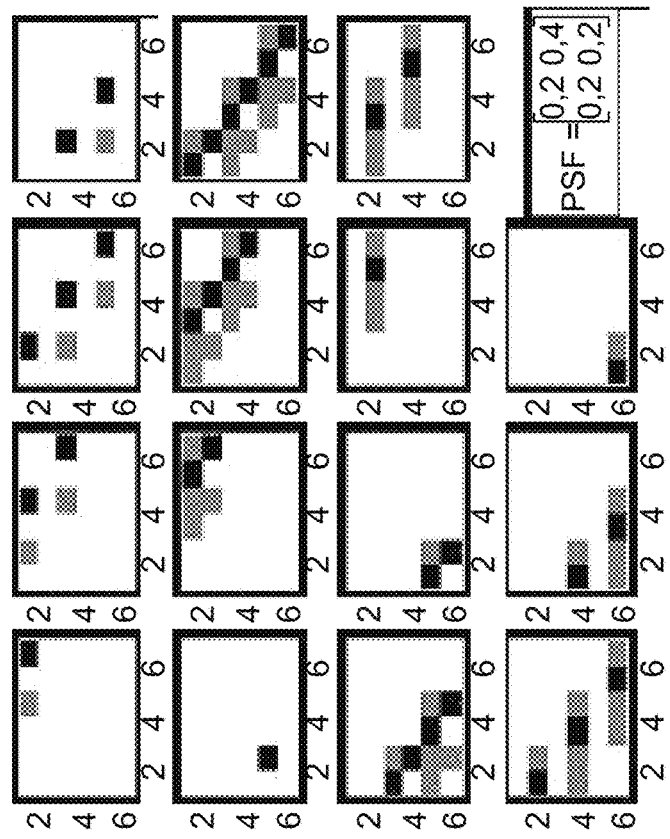
Figure 15A:
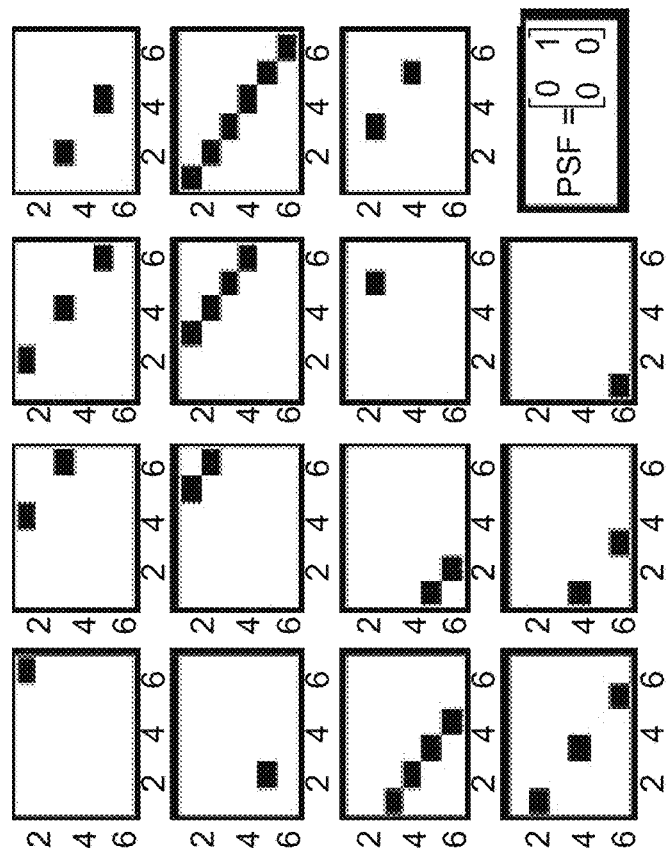
Figure 16A:
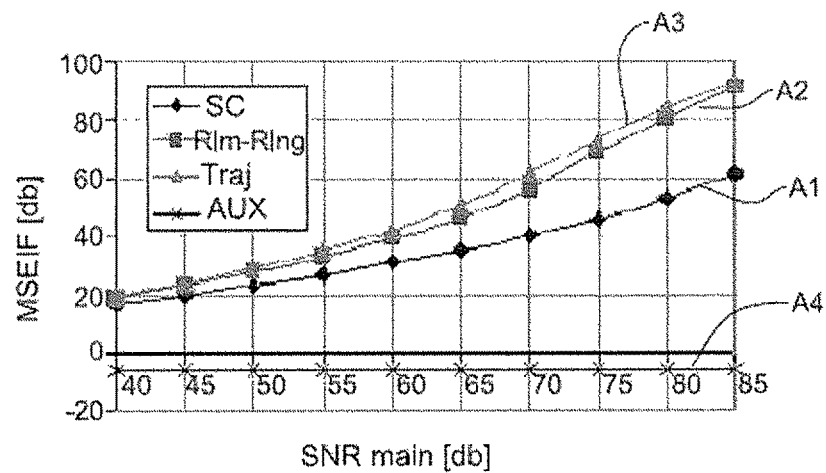
Figure 16B:
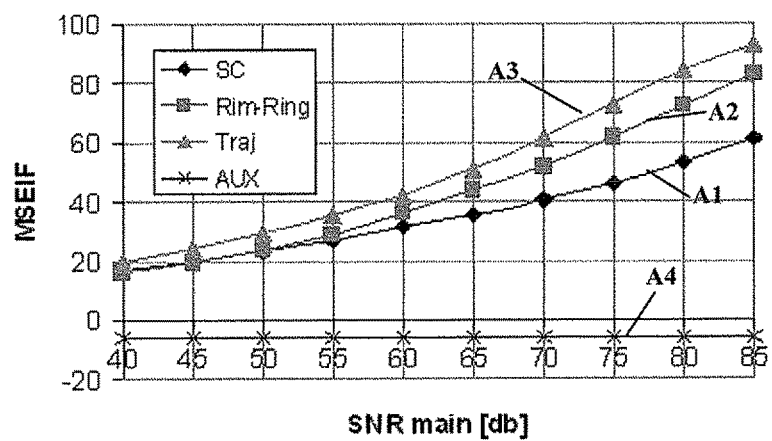
Figure 17A:
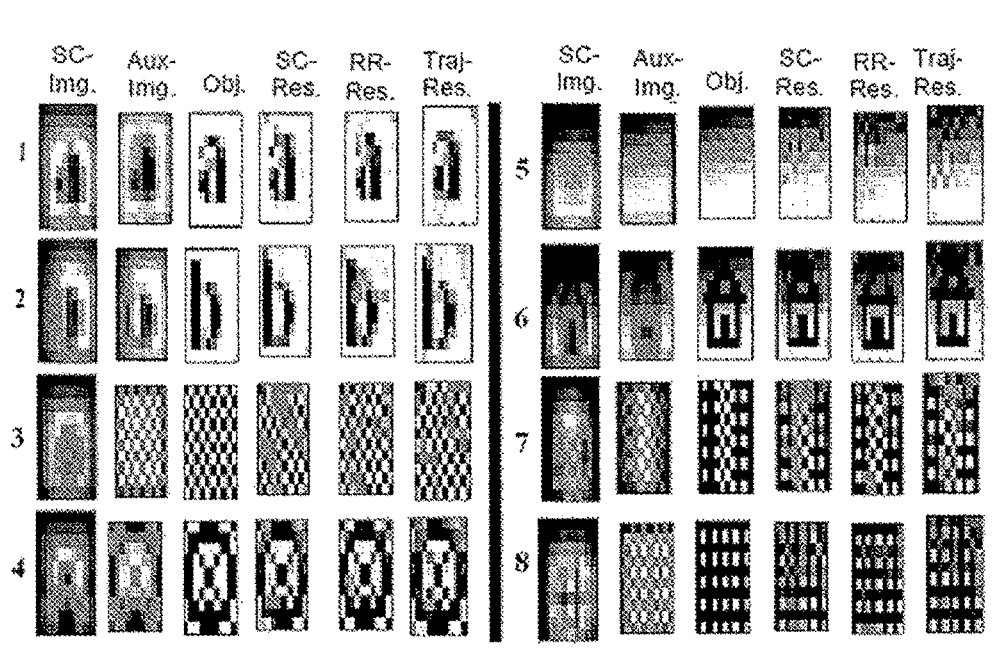
Figure 17B:
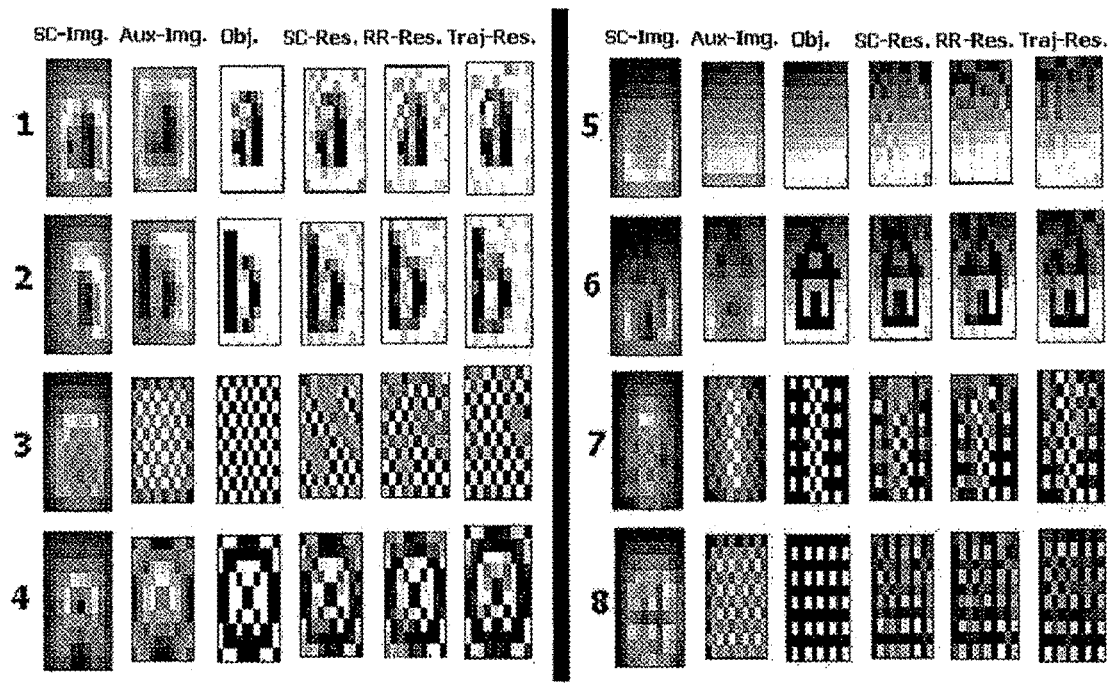
Figure 18:
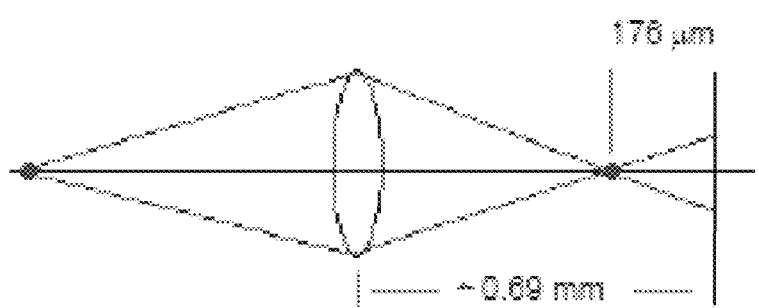
Figure 19:
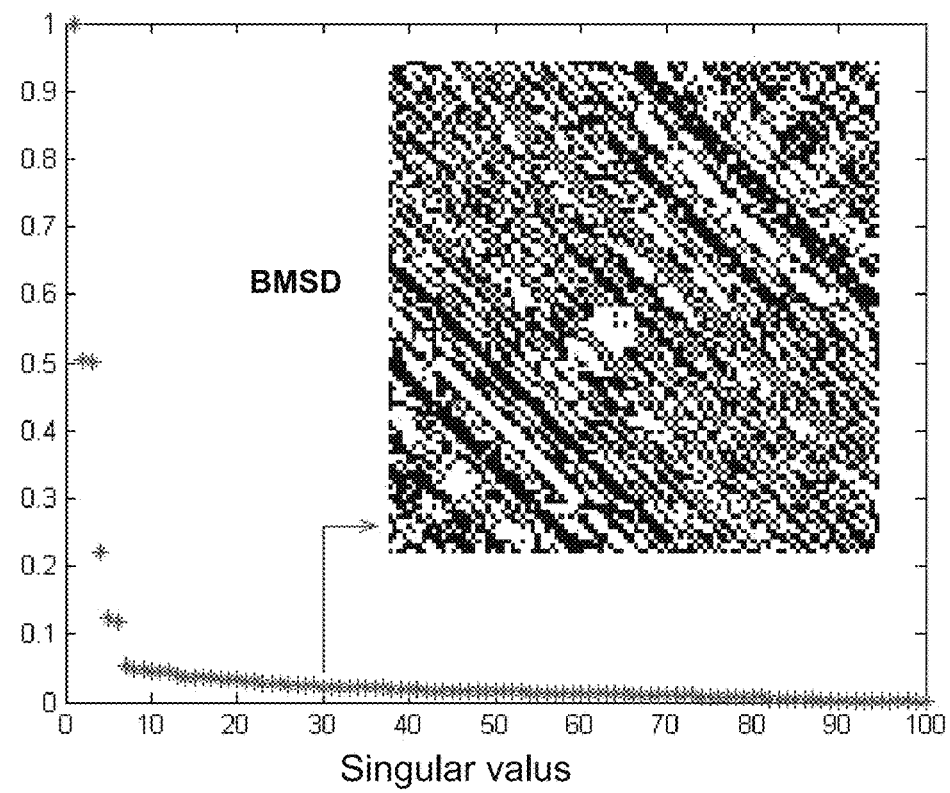
Figure 20:
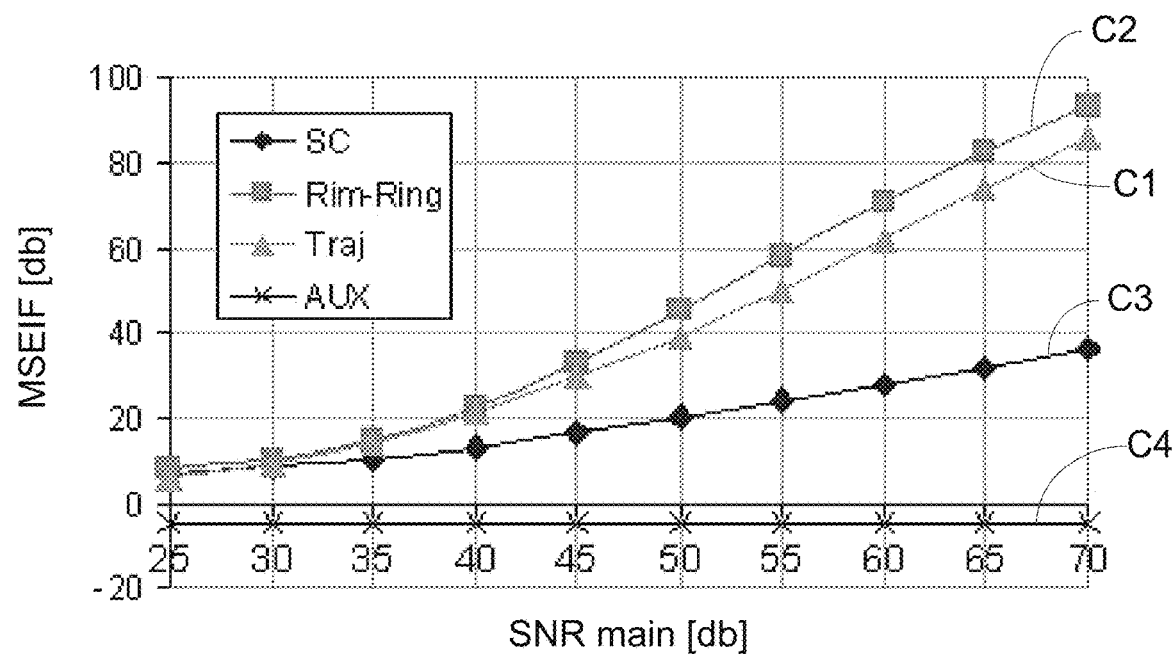
Figure 21:
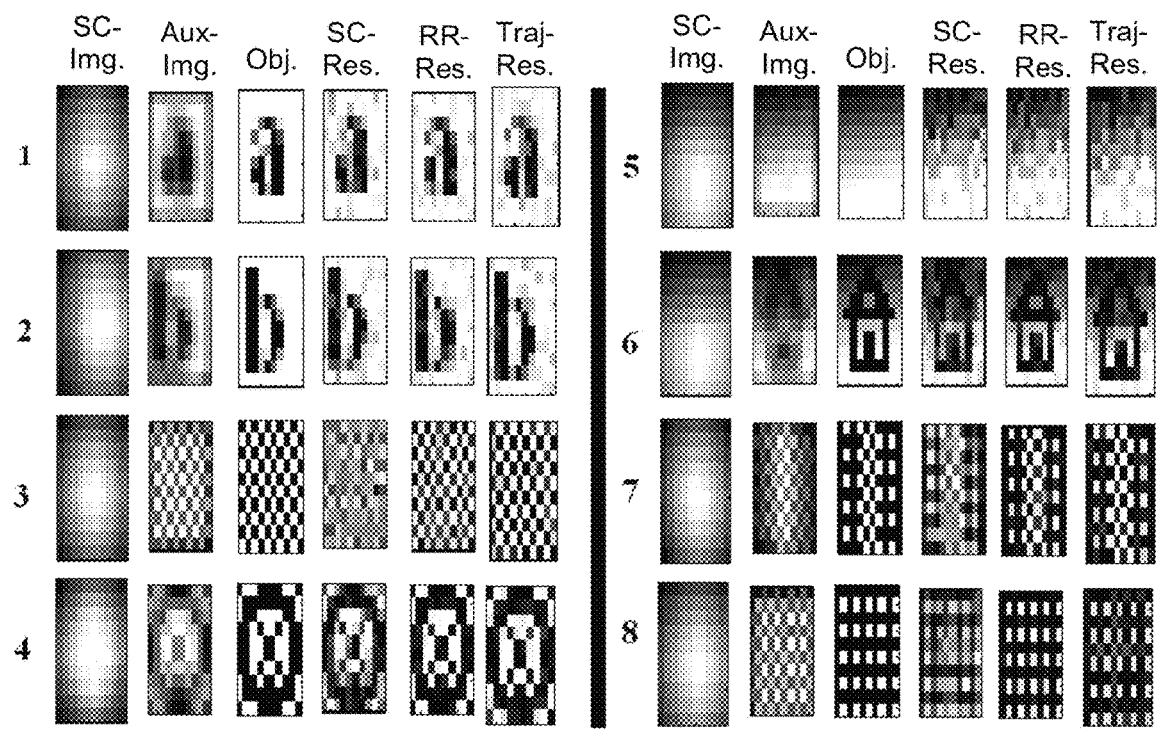
Figure 22:
Figure 23:
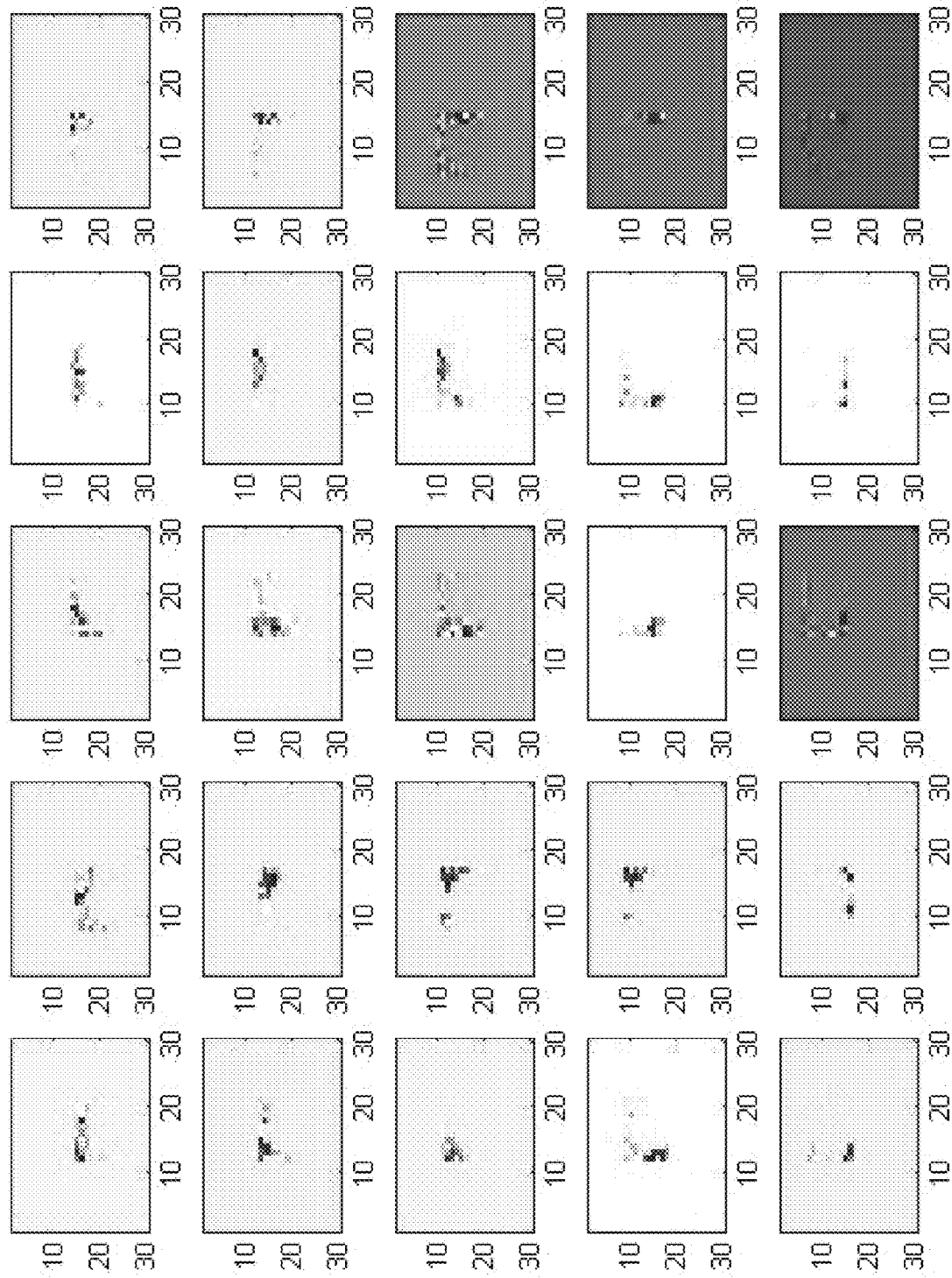

FIGS. 4A to 4D compare Mean Square Error Improvement Factor (FIGS. 4A and 4C) and performance (FIGS. 4B and 4D) in the imaging system of the present invention with the conventional one (with no phase encoder), FIGS. 4A and 4C show graphs comparing the Mean Square Error Improvement Factor (MSEIF) as a function of Signal to Noise Ratio (SNR) in two optical systems, the imaging system of the present invention with the conventional one, and FIGS. 4B and 4D show examples comparing the performance of the imaging system of the present invention with the conventional one;

FIGS. 5A to 5D show other examples of the comparison between the performance of the invented and conventional imaging systems, FIGS. 5A and 5C show imaging performance of the invented and conventional imaging systems, and FIGS. 5B and 5D show graphs corresponding to examples comparing the Mean Square Error Improvement Factor (MSEIF) as a function of Signal to Noise Ratio (SNR) in the imaging system of the present invention with that of the conventional system (with no phase encoder);

FIGS. 6A to 6D show exemplary images obtained with the invented and conventional imaging techniques (FIGS. 6A and 6C) and their corresponding MSEIF graphs (FIGS. 6b and 6D) FIGS. 6B and 6D show the corresponding graphs comparing the MSEIF as a function of SNR in the imaging system of the present invention with that of the conventional system (with no phase encoder);

FIG. 7A is graph showing an example comparing the normalized singular values of Singular Value Decompositions of the PSF matrices of three optical systems: conventional imaging system with no encoder but with the in-focus configuration, the same system with its out-of-focus configuration, and the system of the invention for correcting the focusing of the conventional system;

FIG. 7B is a graph comparing the MSEIF as a function of SNR in the two optical systems—the conventional out-of-focus and the same in its improved version implementing the invention;

FIG. 7C shows the corresponding imaging performance of said two systems;

FIG. 8 is an example of a flow diagram of a method of the present invention for phase-encoding the light involved in the imaging by inducing a phase correction;

FIGS. 9A to 9F illustrate progress of the system condition number and corresponding phase correction functions, FIGS. 9A and 9D show graphs exemplifying the progressing of the system condition number as a function of calculation iteration of phase encoding function, and FIGS. 9B-9C and 9E-9F exemplify phase correction functions induced by phase encoders corresponding to the examples of FIGS. 9A and 9D;

FIGS. 10A to 10D show imaging results and MSEIF graphs for conventional imaging system and the system of the invention, each of FIGS. 10A and 10C show imaging results of two systems, one being the conventional system and the other being the invented system implemented using the principles illustrated in FIGS. 8-9C, and FIGS. 10B and 10D show graphs comparing the MSEIF as a function of SNR in the two optical systems corresponding to FIGS. 10A and 10C;

FIGS. 11A and 11B shows yet further example of an imaging device including a lens and a phase encoder, where the phase encoding pattern has an array of spaced-apart lenses;

FIG. 12 is a schematic illustration of an example of an imaging technique according to another aspect of the invention;

FIG. 13A compares images obtainable with the conventional technique and that of FIG. 12;

FIG. 13B is a graph comparing pixels grey level of three images: ideal picture of the object (object itself) and images of FIG. 13A;

FIG. 13C exemplifies an object ensemble used in the simulations;

FIG. 13D compares the restoration average MSEIF ensemble results as a function of the main system SNR for the "study case" restoration "as is" (i.e. imaging device having the main lens system only, with no auxiliary lens) and the "trajectories" or "shifted lenses" technique utilizing a simple auxiliary lens;

FIG. 13E exemplifies how the principles of the present invention can generally be used in any linear system, optical or not;

FIG. 14 shows a relation between the image shift and the trajectories matrix in a 6×6 matrix;

FIGS. 15A and 15B show the "transformation" based approach for the 6×6 PSF matrix for 3×2 FOV, where FIG. 15A presents the pixel confined case ("perfect" auxiliary lens), and FIG. 15B presents the "blurred transformation" with a blurred auxiliary lens assuming a 2×2 kernel (presented in the bottom right);

FIGS. 16A and 16B show restoration average MSEIF ensemble results, presenting the average MSEIF in the following systems: the system having the "main lens" without additional optics; the system with the "Rim-ring" parallel optics design, the system with the parallel optics using the "Blurred Trajectories", all being restored by the regularization method;

FIGS. 17A and 17B exemplify typical images and restorations by regularization, all in main SNR=45 [db], for the following: the study case image (SC-Img.) without parallel optics; auxiliary lens image (Aux-Img), the object (Obj.), the study case restoration by regularization (SC-Res.), the Rim-ring restoration (RR-Res.), and the Blur Trajectories restoration (Traj-Res.);

FIG. 18 illustrates the main lens design used in simulations, where the main lens is subject to nominal Seidel aberrations and to a 176 μm defocus;

FIG. 19 shows the "main" system singular values graph and the chosen (target) BMSD matrix used in the simulations;

FIG. 20 presents a comparison between the mean MSEIF results of regularization method for three systems: the "Blurred Trajectories" (Traj), the "Rim-ring" with quadratic phase coefficient, and the "study case" (SC) without additional optical design;

FIG. 21 exemplifies typical "object", "main" system images, "auxiliary" system image, "Blurred Trajectories" restoration, "study case" restoration without additional optical design (as is), and "Rim-ring" restoration, all in SNR=45 [db];

FIG. 22 shows the system target BMSD composed from the last 50 eigen matrixes;

FIG. 23 illustrates the calculation of the average filter, In figure every forth PSF(x,y,i) is presented after appropriately shifted.

Figure 24:
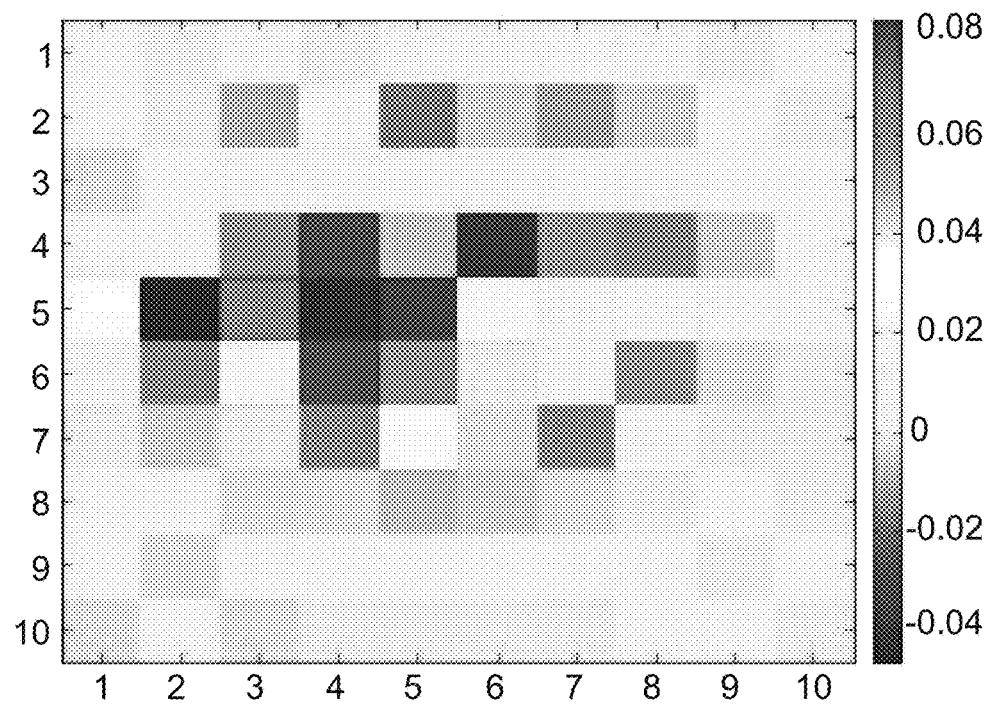
Figure 25:
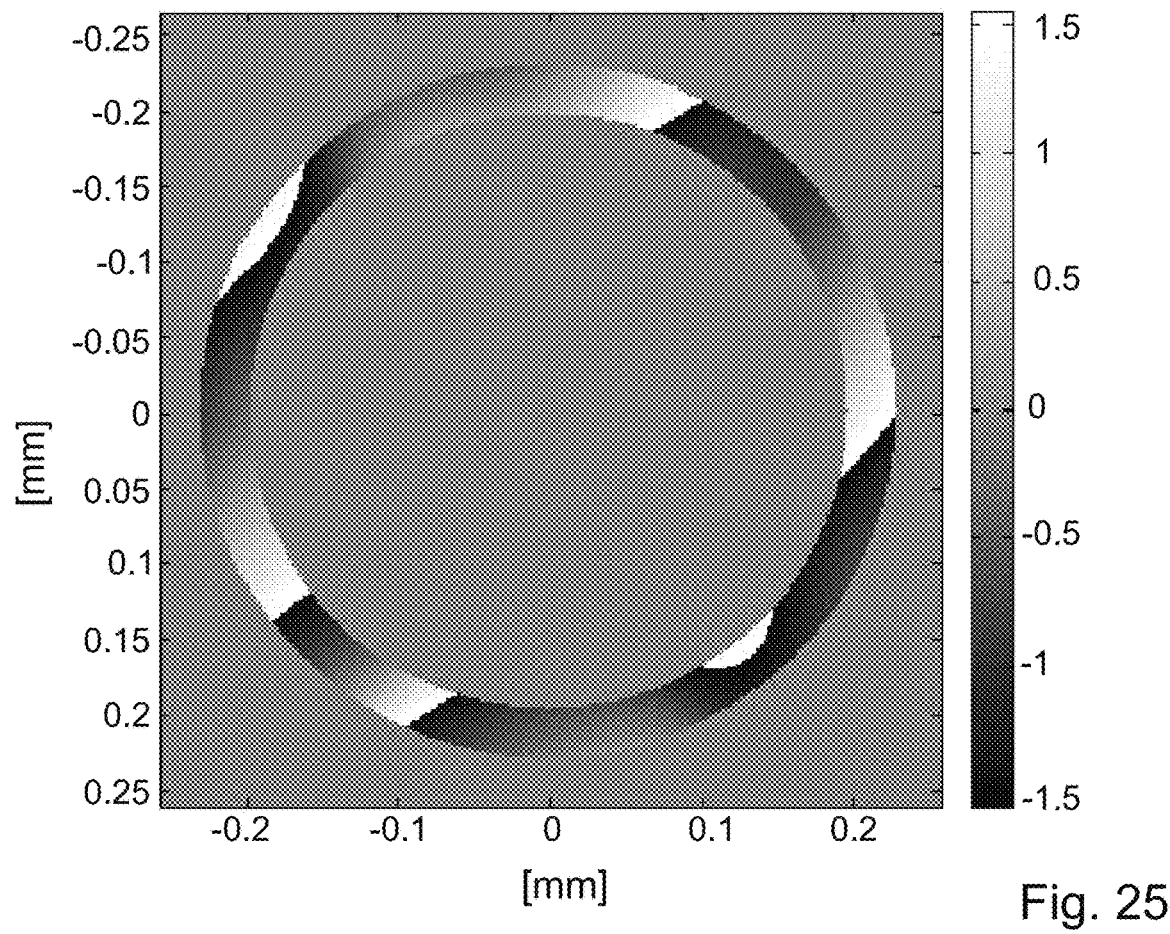
Figure 26A:
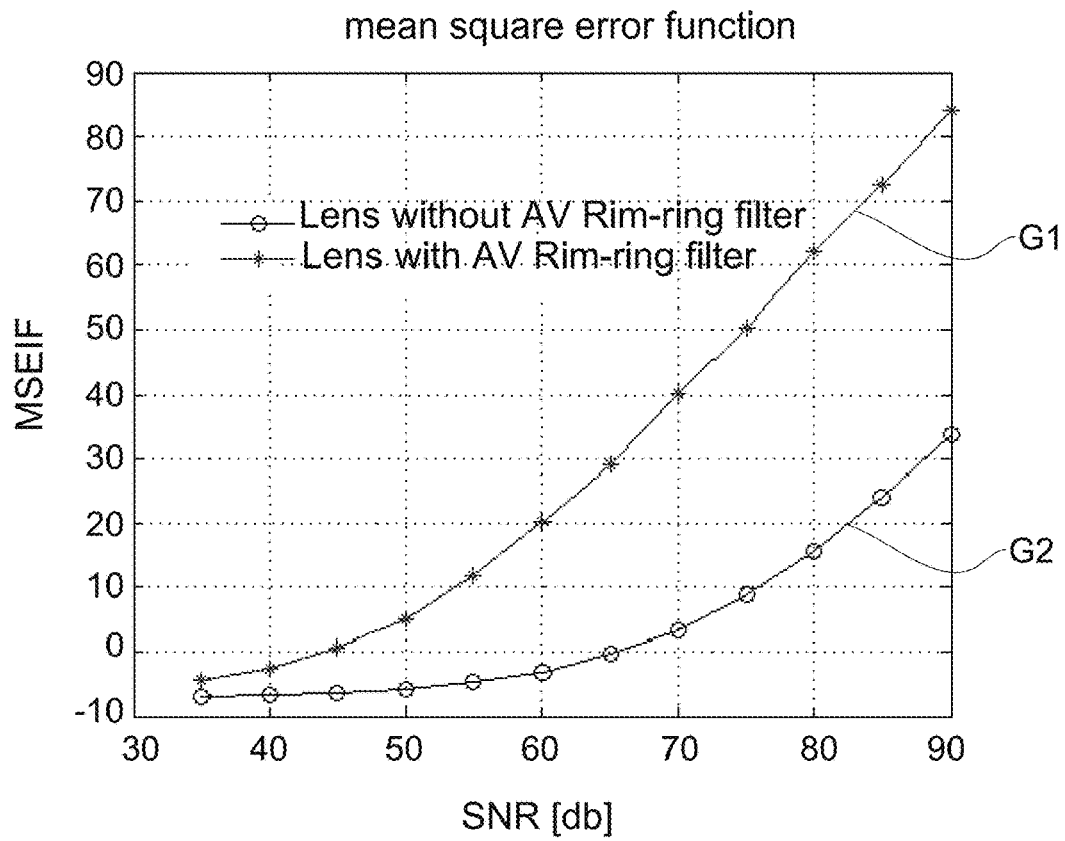
Figure 26B:
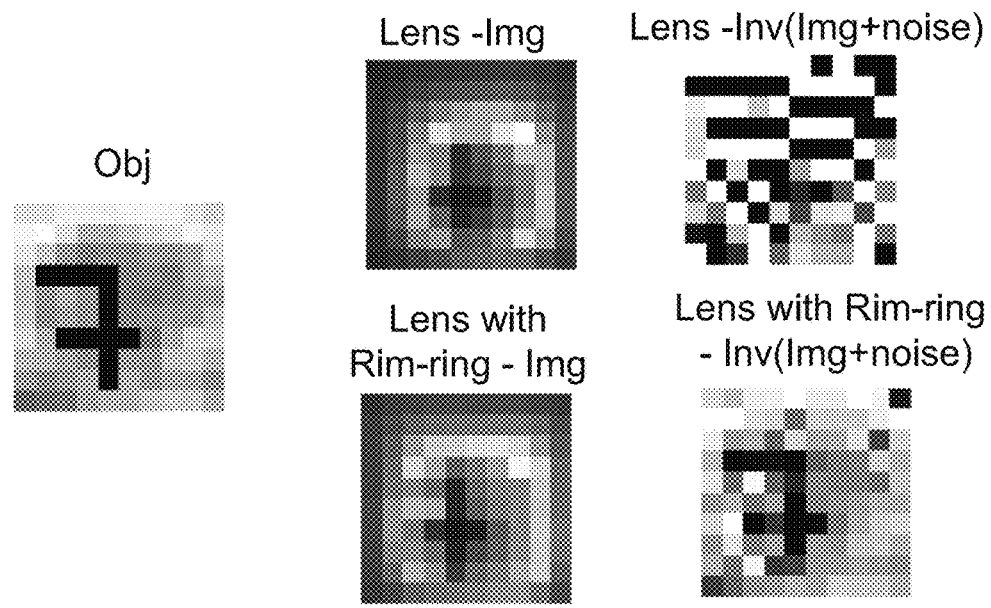
Figure 26C:
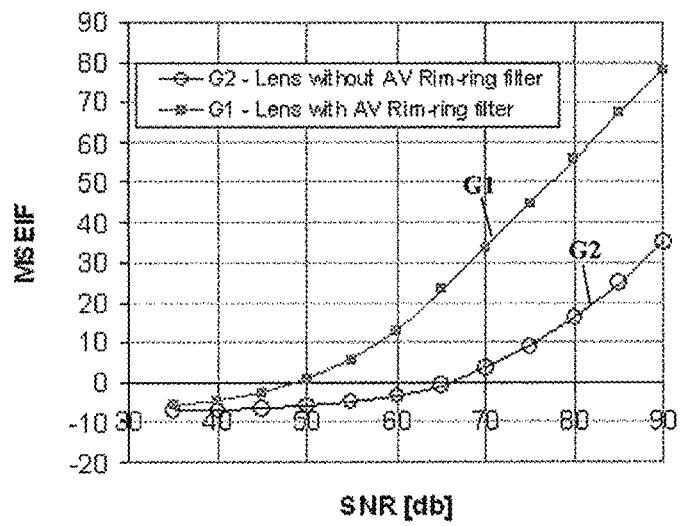
Figure 26D:
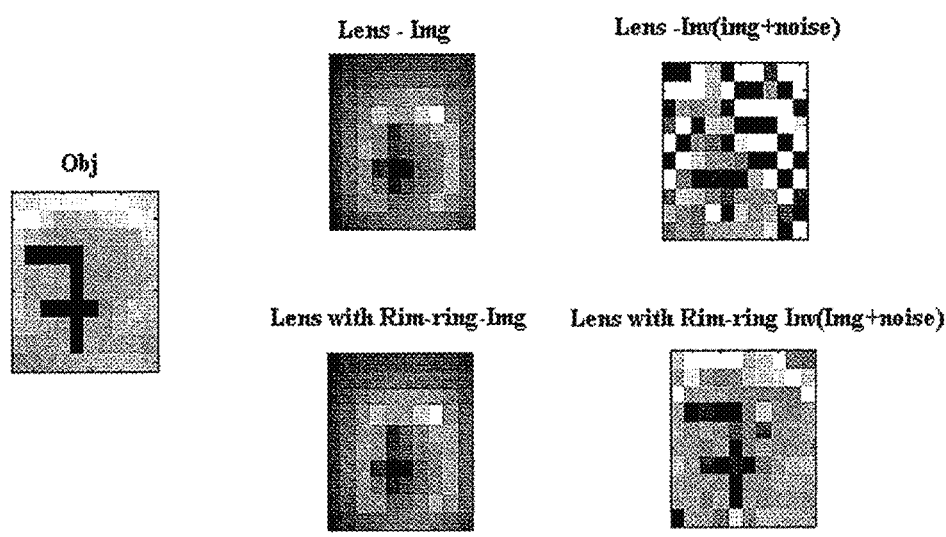

FIG. 24 shows the application of the average value (target PSF) of the ensemble presented in FIG. 23;

FIG. 25 shows the phase profile for the rim ring implementation for improving condition number in the example of FIGS. 22-24;

FIGS. 26A to 26D show MSEIF profiles and corresponding image restoration results, FIGS. 26a and 26C show MSEIF profiles for the imaging device where the main lens system is and is not equipped with an Average PP Rim-ring filter, and FIGS. 26B and 26D show image restoration by matrix inversion for lens with and without Average PP Rim-ring filter in SNR=60 [db].

DETAILED DESCRIPTION OF EMBODIMENTS

Referring to FIG. 1, there is schematically illustrated an imaging system, generally designated 1, suitable to be used for carrying out the invention. Imaging system 1 includes an imaging arrangement (device) 2 for collecting light from an object plane 3 and producing a corresponding image in an image plane; a detection unit 4 located in the image plane for collecting light from imaging device 2 and generating image data indicative thereof; and a control unit 6 for processing the image data.

Imaging device 2 includes a lens system 10 (one or more lenses) defining an optical axis OA of light propagation; and a corrector utility 20 applying a correction function on light passing through the imaging device, which in the present example is constituted by phase encoder 20 for applying a phase correction function, the configuration of which will be described further below. Imaging device 2 is configured and operable according to the invention for reducing image blur created by the lens system. It should be understood that a lens may be any optical element having a lensing effect suitable for use in imaging, e.g. a lensing mirror.

The lens system and phase encoder are arranged together to define an effective aperture EA of the imaging device 2. The lens system 10 is at time referred to herein below as a main system or main lens or main optics or first system. The main system has an algebraic representation matrix of a diagonalized form defining a first Condition Number. The phase encoder 20 is at time referred to herein below as an auxiliary system or second system or auxiliary lens or auxiliary considered together with a respective portion of the main lens). The phase encoder 20 is configured to produce a second Condition Number of an algebraic representation matrix of the imaging device 2, smaller than the first Condition Number of the main lens matrix.

As will be exemplified further below, the phase encoder 20 may be configured as a mask defining a first pattern located in a first region, which is aligned (along the optical axis of the lens system) with a part of the effective aperture, leaving a remaining part of the effective aperture free of the first pattern. The geometry of the first region and configuration of the first pattern therein are such as to define a predetermined first phase correction function induced by the first pattern onto light passing therethrough.

Control unit 6 typically includes a computer system including inter alia a processor utility, data input/output utilities, data presentation utility (display), etc. The phase encoder 20 and control unit 6 operate together to produce a high-quality image. The imaging device 2 equipped with the phase encoder 20 appropriately distorts (codes) the wavefront of light collected from the object, and data corresponding to such distorted image is then digitally processed by the control unit to restore a distortion-free image, with improved quality.

An algebraic representation of an imaging device with no phase encoder (i.e. an imaging lens system) can be described by a matrix H, the columns of which are the PSF for each field point in vector representation. Accordingly, said imaging device may be represented by matrix H consisting of L×L elements where L=m×n, for the n×m pixel representation of the image.

One way to diagonalize the matrix H is to apply to it a Singular Value Decomposition (SVD). According to this method, the singular values of H are square-roots of the eigenvalues of the matrix H·H$^t$, where H$^t$ is the so-called transposed matrix of H. According to this method, H may be represented as [2]:

$$H = U \cdot S \cdot V^t \quad (3)$$

where matrices U and V are found by solving the following eigenvalue problems:

$$H \cdot H^t = U \cdot \Delta \cdot U^t \quad (4)$$

$$H^t \cdot H = V \cdot \Delta \cdot V^t \quad (5)$$

$$U_{L \times L} = [u_1, u_2, \ldots, u_L] \quad (6)$$

$$V_{L \times L} = [v_1, v_2, \ldots, v_L] \quad (7)$$

($u_i$ and $v_i$ are the vector columns of U and V, respectively). A singular value matrix S can then be obtained from matrix $\Delta$, $S = \Delta^{1/2}$.

It should be noted that there are usually many ways, in addition to SVD, to diagonalize matrix H. The present invention may be employed in conjunction with any diagonalization procedure of the representing matrix H which results in a diagonal matrix S, and the principles of the invention are not limited to the example described herein.

Returning to SVD-based approach, the positive square roots of the eigenvalues of $\Delta$ are the eigenvalues $\sigma_i$ in S and are termed also the singular values in H. The order of the rows of S is such that $\sigma_i$ are ordered from high to low:

$$S_{L \times L} = \begin{bmatrix} \sigma_1 & 0 & 0 & 0 \\ 0 & \sigma_2 & 0 & 0 \\ 0 & 0 & \ddots & \vdots \\ 0 & 0 & \ldots & \sigma_L \end{bmatrix}, |\sigma_L \leq \ldots \leq \sigma_2 \leq \sigma_1 \quad (8)$$

One of the figures of merit for the matrix H is a Condition Number $k_{(H)}$, defined by a ratio as in (9) and (10) below:

$$k_{(H)} = \frac{\langle \sigma_m \rangle}{\langle \sigma_n \rangle} | \sigma_n \leq \sigma_m, \forall m, n. \quad (9)$$

Here, $\langle \ \rangle$ denotes a moment of any order of weighted averaging, $\langle \sigma_m \rangle$ is such an averaging on a group of the selected high singular values and $\langle \sigma_n \rangle$ is such an averaging on a group of selected low singular values. One example of a condition number is thus the ratio of the highest to lowest singular values of H:

$$k_{(H)} = \sigma_1 / \sigma_L \quad (10)$$

It should be understood that when the matrix S is a result of a general diagonalization procedure of the matrix H (rather than SVD), then $\sigma_m$ and $\sigma_n$ denote the absolute values of the eigenvalues of S.

Considering the SVD-based approach, all the eigenvalues of S are real, and are smaller than or equal to one and non-negative, hence $k_{(S)}$ is always greater than or equal to one. Generally, the higher the Condition Number the lower (or worse) the condition of the matrix, and the worse the system immunity to additive noise with respect to the matrix inversion. And if, for example, H is not invertible (namely at least one of its singular values is zero), then k is infinite. In an absolutely noise-free system, the image inversion is always possible even in very ill conditioned (high condition number) system; however introduction of noise to ill condition system will corrupt the image inversion restoration results. Thus, improving the matrix condition improves the system immunity to noise and allows performing image restoration in the presence of noise. Performing image inversion in matrix notation provides blur reduction in the image. Hence, improving the matrix condition can be an effective indication of improving image quality by image reconstruction in actual optical systems.

Turning back to FIG. 1, the imaging device 2 of the present invention presents an "improved" device comprising a lens system and a phase encoder which improves the condition of the entire imaging device (as compared to that of the lens system only, and no phase encoder) by making a Condition Number of the entire imaging device smaller than that of the lens system. According to some examples, the phase encoder can be configured to increase the smallest singular values of the representative matrix H of the lens system, thereby decreasing the Condition Number of the matrix of the entire imaging device (defined by the lens system and the phase encoder).

As indicated above, the lens system may include a single lens, or one or more lenses and possibly one or more other optical elements. It should be understood that a phase encoder is constituted by appropriate one or more phase-affecting transition regions associated with the lens system, so as to introduce a pre-determined phase correction to the imaging device to improve the condition of the corresponding matrix. In other words, the phase encoder may affect the phase of light incident thereon as compared to that outside the phase encoder (e.g. within the lens aperture), and possibly also differently affect the phase of light portions passing through different regions within the phase encoder. As a result, the entire imaging device creates a certain phase profile in light passing therethrough.

Thus, for example, a phase encoder may be a stand-alone element (e.g. mask physically separated from the lens) located upstream or downstream of the lens system, or located in between the elements of the lens system (this being possible as long as the light portions associated with the lens and the phase encoder are spatially separated). In another example, the phase encoder may be configured as a phase-affecting element attached to the lens of the lens system (e.g. a phase-affecting patterned structure optically glued to the lens); or may be a phase-modifying element incorporated within the lens (generally within one or more elements of the lens system). For example, the imaging lens may be formed with a particular phase-pattern engraved on the lens surface, in the form of a surface relief (profile) and/or materials of different refractive indices. Yet other possible examples of the phase encoding element may include a mirrors structure in a reflecting mode of operation, a holographic phase encoding element, etc.

Figure 2A:
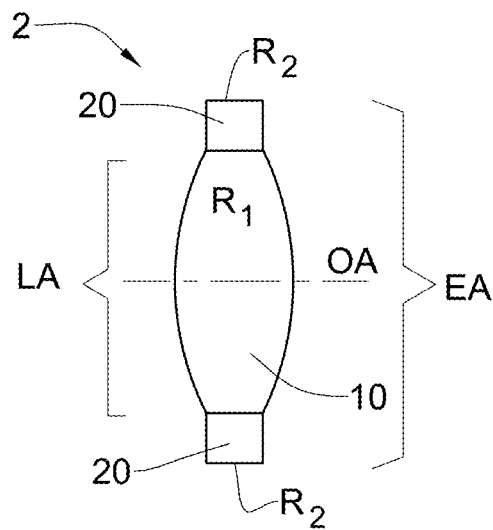
FIGS. 2A and 2B show two examples respectively of an imaging device of the invention including an imaging lens and a phase encoder.
Figure 2B:
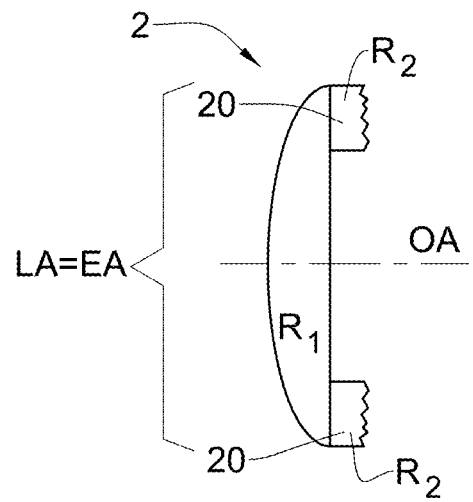

Reference is made to FIGS. 2A and 2B illustrating two specific but not limiting examples of the configuration of imaging device 2 of the present invention. To facilitate understanding, the same reference numbers will be used for identifying components that are common for all the examples of the invention. In both examples, the imaging device includes an imaging lens 10 (constituting a lens system) having an aperture LA, and a phase encoder 20, defining together an effective aperture EA. Also, in both examples the encoder is implemented substantially symmetrical with respect to the optical axis OA of the lens 10, although it should be understood that the invention is not limited to this implementation, as will be described more specifically further below. In these specific examples the phase encoder 20 occupies the periphery of the effective aperture EA of the imaging device. while the lens 10 is located in the central region thereof. It should however be understood that the invention is not limited to such configuration.

In the example of FIG. 2A, phase encoder 20 surrounds the lens 10, being in the form of a ring-like structure surrounding the lens 10. Generally speaking, this figure exemplifies the situation when the phase encoder 20 does not overlap the lens 10 along the optical axis OA. The phase encoder 20 includes one or more materials with a refractive index (or indices) different from that of the lens 10. Thus, the effective aperture EA of the imaging device 2 includes a first phase pattern within a part $R_2$ of the effective aperture occupied by the encoder 20, and a remaining part $R_1$ of the effective aperture, in which lensing effect is applied to light, is free of the first pattern (while may or may not be formed with a second phase pattern).

In the example of FIG. 2B, phase encoder 20 is also in the form of a ring-like element but overlapping with a part of the lens 10 within its periphery region. Thus, in this example, the effective aperture EA of the imaging device 2 is actually represented by (equal to) the lens aperture. Also, in this example the phase encoder 20 is implemented with a surface relief (profile) and may or may not be made of material(s) different from that of the lens. Here, similar to the above-described example, the phase encoder defines a first pattern within region $R_2$ of the effective aperture, leaving a remaining part $R_1$ of the effective aperture free of this pattern (and possible having another second pattern).

The geometry of region $R_2$ and configuration of the first pattern therein are selected such that the first phase correction function satisfies a predetermined condition with respect to a phase correction function induced by the lens region $R_1$ (generally, a remaining part of the effective aperture). In some examples, this predetermined condition is such that the value of the first phase correction function, all along the corresponding region $R_2$, is not smaller than the phase correction function corresponding to region $R_1$; and in some examples is such that the value of the first correction function in region $R_2$ does not exceed the other phase correction function corresponding to region $R_1$.

As will be shown further below, the geometry of said part of the effective aperture carrying the first pattern, as well as the configuration of the first pattern itself, define a phase correction function induced by the first pattern onto light passing therethrough. As for the second pattern that may be provided within an optical path overlapping with the remaining part of the effective aperture where the lens effect is applied, such a phase pattern may be aimed mainly at achieving another effect, e.g. extending the depth of focus. The use of phase-masks in the optical path overlapping with the lensing region is generally known and therefore need not be described in details.

The following is an example of how to select the appropriate configuration for the phase encoder, namely the geometry (shape and dimensions) and the features of the pattern to be used in a specific imaging system.

A phase encoder may be designed to be incorporated in a lens system to modify (typically, increase) a selected subgroup of the singular values of H, $\sigma_j$ of the lens system matrix. For the sake of clarity and simplicity of the description, $\sigma_j$ denotes herein the whole group of singular values of matrix H, where i takes all the numbers from 1 to L, L being the size of H. Further, σj denotes said subgroup of singular values to be modified, and usually to be increased. Also, the positions of the selected singular values $\sigma_j$ in the matrix S will be denoted simply "positions j" avoiding the need for more complex formal mathematical notations.

A diagonal matrix ΔS, in the size of S, may therefore be generated, having positive numbers in the selected positions j (corresponding to the positions of the singular values of H which are to be modified). It therefore follows that the matrix sum of S and ΔS can yield an invertible matrix with improved condition. In other words, if S1 is the said sum $$S1 = S + \Delta S \quad (11)$$

then the matrix H1 is:

$$H1 = U \cdot S1 \cdot V^t = U \cdot (S + \Delta S) \cdot V^t = U \cdot S \cdot V^t + U \cdot \Delta S \cdot V^t = H + U \cdot \Delta S \cdot V^t = H + O \quad (12)$$

approximates a PSF matrix of the entire imaging device (lens and encoder), formed by the lens system represented by matrix H and the phase encoder represented by the additional part which is determined as follows $$O = U \cdot \Delta S \cdot V^t. \quad (13)$$

In various embodiments, the two systems H and O are generally different, however observe the same object and their image is mixed. Therefore, these embodiments are referred to herein generally as parallel optics.

It should be understood that a construction of an actual phase encoder (mask) may be subject to additional constraints, on top of those expressed in the formula (13) for O, as is further detailed below. Hence an actual phase encoder may be algebraically represented by a matrix approximately equal to O but not necessarily identical to it.

The invented approach for designing the phase encoder utilizes selecting the desired approximation for the phase encoder matrix resulting in the image quality improvement. It should therefore be understood that O matrix referred to hereinbelow as being that of the phase encoder relates also to the desired approximation thereof.

Both the lens system and the phase encoder represented by matrices H and O "see" the same object and bore-sight to the same image plane. However, the lensing effect and the phase encoding effect are applied to different portion of light incident onto the effective aperture, thus presenting a parallel-type optical processing. This effect can be taken into consideration by dividing a lens area into two parts (or more in general). The division can be done for example by dividing an extended lens to a "lens zone" in the center and a "phase mask" in the lens rim zone (periphery), termed herein "Rim-ring zone". The linear nature of diffraction allows such a separation, which is a division of the integration into two zones. The integration boundaries for the "lens zone" are like those of inner circular pupil function, while the integration boundaries for the "Rim-ring zone" are like those of annular pupil function. In simulation, those are continuous pupil functions with two different zones for two different phases.

It should be noted that under this approach the effective aperture can be divided into as many zones (parts of different patterns) as needed. These zones can have arbitrary shapes and transmission values to appropriately affect the phase of light (and possibly also amplitude) passing through these zones.

Following the above discussion, the matrices H and O generate incoherent impulse response for each field point, the coherent response will be of the form as follows (see for example [3]):

$$\tilde{h}(x_{img}, y_{img}) = \iint \hat{P}(\lambda S_{img}\tilde{x}, \lambda_{img}\tilde{y}) \cdot \exp(-j2\pi(x_{img}\tilde{x}, y_{img}\tilde{y})) \, d\tilde{x}d\tilde{y} \quad (14)$$

$$(\tilde{x} = xp/\lambda \cdot S_{img}, \tilde{y} = yp/\lambda \cdot S_{img}) \quad (15)$$

where $(x_{img}, y_{img})$ are the image point coordinate, $S_{img}$ is the image distance. The explicit form of the pupil function is:

$$\hat{P}(\lambda S_{img}\tilde{x}, \lambda S_{img}\tilde{y}) = P(\lambda S_{img}\tilde{x}, \lambda S_{img}\tilde{y}) \cdot \exp(jKW(\lambda S_{img}\tilde{x}, \lambda S_{img}\tilde{y})) \quad (16)$$

Here, PO is the amplitude which is effected by local transmittance, and KW( ) is the phase effected by both lens aberration and phased elements (the latter affecting the "rim-ring zone" only). The system impulse response is a super-position of the two "optics" responses, which is then also a function of its power which reflects both in the cross-action area (A) and in the transparency (T):

$$\tilde{h}_{tot}(x_{img}, y_{img}) = \tilde{h}_{lens}(x_{img}, y_{img}, A_{lens}, T_{lens}) + \tilde{h}_{rim\text{-}ring}(x_{img}, y_{img}, A_{rim\text{-}ring}, T_{rim\text{-}ring}) \quad (17)$$

However, in regular photography, the optical system describes imaging in incoherent illumination. Hence the matrix columns are the system PSF. Thus:

$$\begin{aligned} PSF(x_{img}, y_{img}) &= |\tilde{h}_{tot}(x_{img}, y_{img})|^2 = \\ &= |\tilde{h}_{lens}|^2 + |\tilde{h}_{rim\text{-}ring}|^2 + \\ &\quad \tilde{h}_{lens}^* \tilde{h}_{rim\text{-}ring} + \tilde{h}_{lens} \tilde{h}_{rim\text{-}ring}^* \approx \\ &\approx |\tilde{h}_{lens}|^2 + |\tilde{h}_{rim\text{-}ring}|^2. \end{aligned} \quad (18)$$

In that case, there are potential cross-products between the "lens" and the "rim-ring" and therefore their contributions are not entirely parallel as in field response. Theoretically, the cross products damage the parallelism assumption. However, the nature of the problem is that the "rim-ring" PSF and "lens" PSF work in different zones of the FOV. Thus, the cross-products' power is relatively low so the parallelism assumption is generally reasonable.

Thus, according to some embodiments of the invention, a phase encoder that induces a desired phase correction and thereby improves the condition of the matrix S (reduces the Condition Number), may be configured in accord with the eigenvalues $\sigma_j$ defined above and the resulting $\Delta S$. An initial condition for the construction of the phase encoder can be set as follows: For each singular value $\sigma_i$, there exists an eigen matrix $M_i$ defined by the outer product of the appropriate column vectors u and v as defined in (6) and (7):

$$M_{L \times L}{}^i = u_i \cdot v_i^t. \quad (19)$$

Thus, the PSF matrix of the required phase encoder can be composed as a linear combination of the eigen matrices associated with the singular values $\sigma_j$—referred to as matrices $M_j$—where the actual coefficients in the linear combination are the new, modified singular values. A direct sum of the matrices $M_j$ corresponding to the singular values $\sigma_j$ (corresponding to the desired O) as is defined in (20) below, is termed herein Binary Matrix Spot Diagram (BMSD):

$$BMSD = \sum_j M_j. \quad (20)$$

The BMSD is thus used as an initial condition for the construction of the phase encoder O.

It should be noted that since the phase encoder is a physical entity, its algebraic representation must contain only real PSF for each field point. Further, in order to actually effect a change in the condition of the entire lens system represented by matrix H, the phase encoder should be selected such that the modified system matrix H1 (that of the lens system and encoder) is invertible.

As a result of these constraints, construction of a phase encoder from the matrix O usually involves some necessary approximations. Since on the one hand the phase mask is common for all field points, and on the other hand said linear combination of the eigen-matrices $M_j$ is space variant, to yield a common best pupil function some compromise between best pupil function of each field point must be made.

Figure 3A:
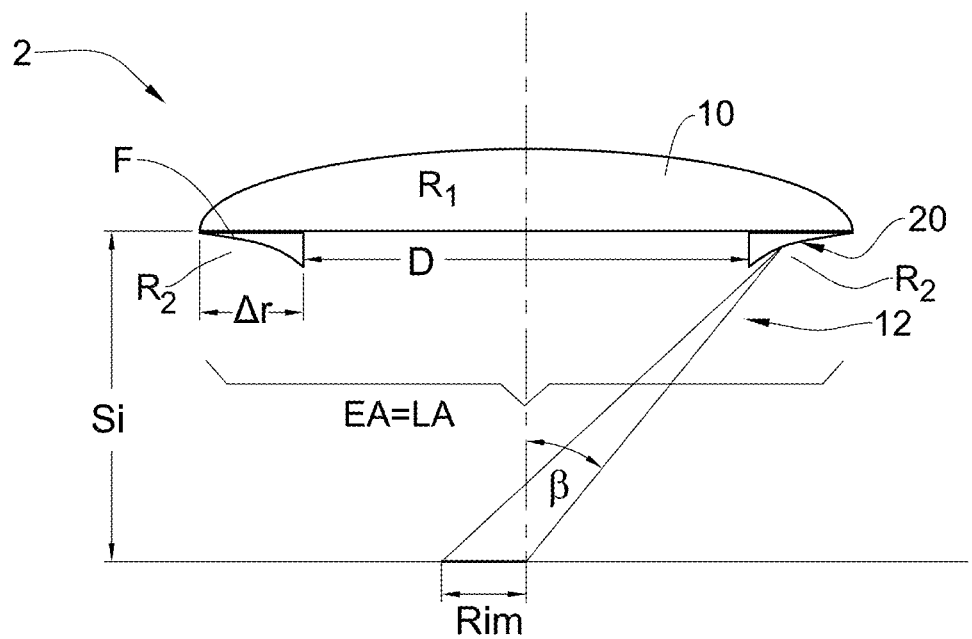
FIG. 3A shows more specifically an example of the imaging device where the phase encoder is located on the rim ring of the device surrounding the lens.

Reference is made to FIG. 3A which shows an imaging device 2 according to an embodiment of the present invention. According to this embodiment, imaging device 2 includes an imaging lens 10, and phase encoder 20 on the rim (periphery) of the lens 10. The phase encoder 20 has a rotational symmetry around the lens optical axis. Further, the phase encoder 20 is characterized by two geometrical parameters: a radius (width) $\Delta r$ and a shape function (surface profile) F. The imaging device is further characterized by a ratio between the transmission $T_{lens}$ of the lens 10 and that $T_{rim\text{-}ring}$ of the encoding element 20, $T_{lens}/T_{rim\text{-}ring}$. The geometrical parameters $\Delta r$ and F, and the relative transmission factor $T_{lens}/T_{ring}$ are thus calculated as described below in accordance with the singular values $\sigma_j$ and the matrix $\Delta S$ so as to obtain a required improvement of the imaging lens 10.

The overall power $Power_{ring}$ that reaches the image plane from the phase encoder relative to the power $Power_{lens}$ that reaches from the lens is determined by the area of the encoder (that of part $R_2$ of the effective aperture) relative to the area of the lens part $R_1$, and by the relative transmission factors. Assuming that the ring transmission $T_{ring}$ equals 1, $$PR = \frac{Power_{ring}}{Power_{lens}} \underset{D \gg \Delta r}{\approx} \frac{2 \cdot \Delta r}{T_{lens}^2 \cdot D/2} \quad (21)$$

and therefore $$\Delta r = \frac{1}{4} \cdot T_{lens}^2 \cdot D \cdot PR \quad (22)$$

Referring back to FIG. 3A, $\beta$ is the angle of intersection between a ray 12 from the middle of the rim-ring zone $R_2$ and the optical axis in the image plane:

$$\tan(\beta) = \frac{0.5 \cdot (D + \Delta r)}{Si} \quad (23)$$

where D is the dimension (e.g. diameter) of the lens region

It also follows from FIG. 3A that:

$$R = Si/\cos(\beta) \quad (24)$$

The ray aberration Rim, acting as the blur radius, is related to the wavefront derivative. For the maximal ray aberration one obtains:

$$-\frac{R}{n} \cdot \left. \frac{\partial W(xp_{rim}, yp_{rim})}{\partial r} \right|_{max} = Rim \cdot \cos(\beta) \quad (25)$$

where W is the wavefront (the wavefront being related to the wave phase through phase=K*W were K is the wave number), ($xp_{rim}$,$yp_{rim}$) are the coordinates of the ring 20, and n is a refraction index of the surroundings of the device in the optical path of light propagation through the imaging system. It follows that:

$$-\frac{\partial W(xp_{rim}, yp_{rim})}{\partial r}\bigg|_{max} = \frac{Rim \cdot \cos(\beta)}{R} = \frac{Rim \cdot \cos^2(\beta)}{Si}. \quad (26)$$

Assuming quadratic form of the shape function F, the phase can be expressed as:

$$W(xp_{rim}, yp_{rim}) = F_0 \frac{(xp_{rim}^2 + yp_{rim}^2)}{\Delta r^2} = F_0 \frac{\Delta r^2}{\Delta r_{max}^2}, \quad (27)$$

where F0 is a constant. Differentiating (27) obtains the ray aberration:

$$-\frac{\partial W(xp_{rim}, yp_{rim})}{\partial r} = 2 \cdot F_0 \cdot \frac{\Delta r}{\Delta r_{max}^2}, \quad (28)$$

and applying the maximum value obtains:

$$-\frac{\partial W(xp_{rim}, yp_{rim})}{\partial r}\bigg|_{max} = 2 \cdot F_0 \cdot \frac{\Delta r_{max}}{\Delta r_{max}^2}. \quad (29)$$

From combining (26) and (29) the relation between the geometrical parameter $F_0$ and the blur radius is obtained:

$$\frac{2 \cdot F_0}{\Delta r_{max}} = \frac{Rim \cdot \cos^2(\beta)}{Si} \quad (30)$$

$$F_0 = \frac{Rim \cdot \Delta r \cdot \cos^2(\beta)}{2 \cdot Si} \Leftrightarrow Rim = \frac{2 \cdot F_0 \cdot Si}{\Delta r_{max} \cdot \cos^2(\beta)} \quad (31)$$

For example, the remaining part $R_1$ of the effective aperture associated with the imaging lens 10 may have a diameter D of 0.4 mm, and a distance Si (roughly equal to the focal length f) from the imaging device to the image plane is Si=0.69 mm. The imaging lens 10 is further characterized by relatively high aberrations, having the Siedel sums S1=0.0123, S2=0.0130, S3=0.0199, S4=2.922·10$^{-4}$ and S5=3.335·10$^{-5}$. The exit pupil of the lens system is in the lens plane. The imaging system utilizing such imaging device 2 is further associated with a square FOV having 10×10 pixels and a width of 0.113 mm. The optical characteristics of the imaging system can be calculated using an optical simulation tool, and PSF matrix corresponding to the imaging system is also calculated. Further, a singular value decomposition (SVD) of the PSF matrix is obtained.

Figure 3B:
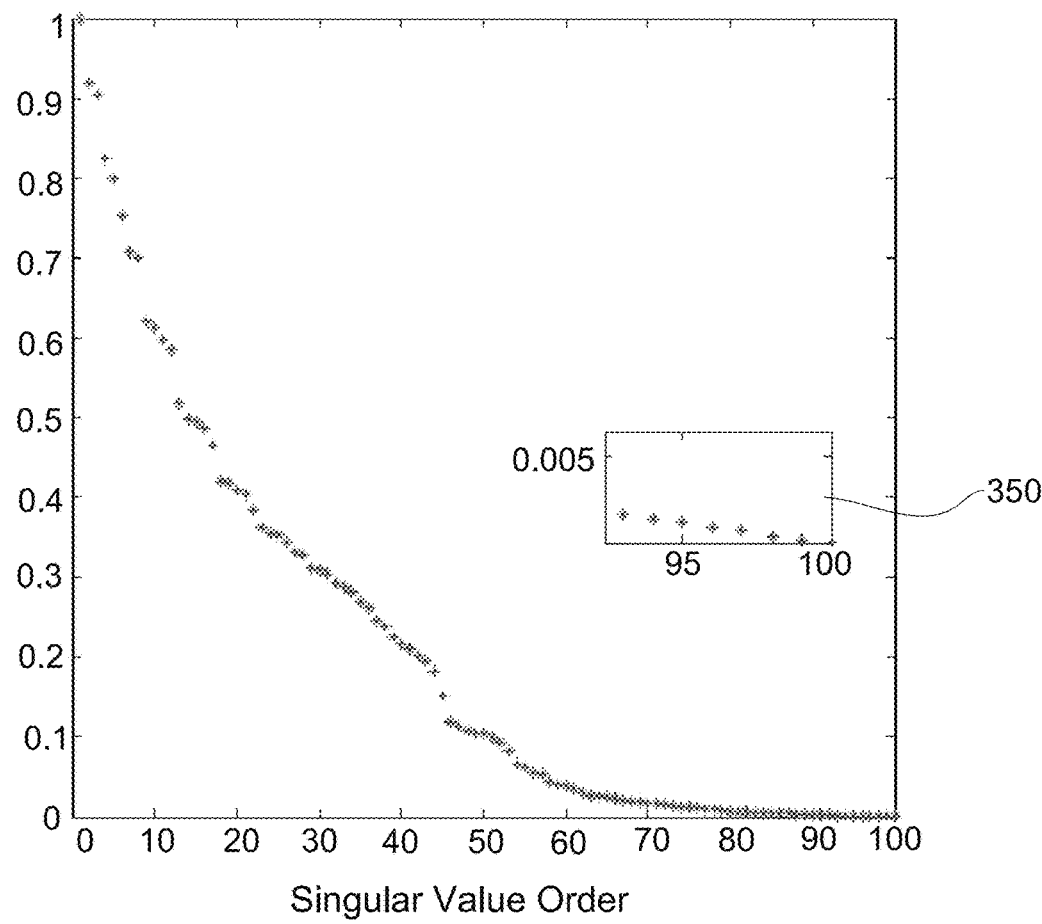
FIG. 3B is a graph showing the normalized singular values of a Singular Value Decomposition of an imaging lens' PSF matrix, arrange according to their values in a decreasing order.

FIG. 3B shows 100 singular values of the obtained SVD matrix, and the insert 350 shows in detail the smallest singular values. Accordingly, the Condition Number of the imaging lens system 10 is calculated to be k(S)=$\sigma_1$/$\sigma_{100}$=87,640.

Next, in order to improve the system condition by reducing the condition number of the imaging device used in the system, the system's weak (low value) singular values are to be enlarged. Thus, a group of weak singular values $\sigma_j$ is selected to be modified. In this example the six lowest singular values $\sigma_{95}$, . . . , $\sigma_{100}$ are selected to be modified for the improvement of the lens system 10 performance. Accordingly, the eigen matrices $M_{95}$, . . . , $M_{100}$ as defined in (19) and their sum BMSD as defined in (20) are considered for the construction of the phase mask, as is further described below.

Figure 3C:
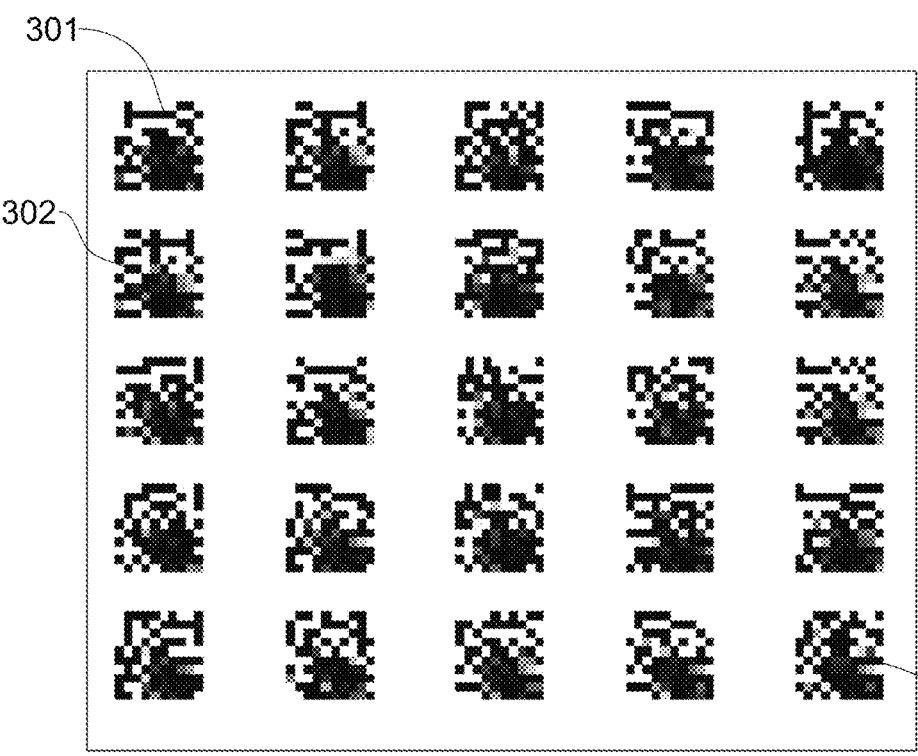
FIG. 3C shows a visual representation of Point Spread Function of a BMSD, arranged according to the corresponding field points in 25 representative field points.

FIG. 3C shows the PSF shape of the BMSD after translating it back into a 2D image. For convenience, only every fourth column is shown, thus twenty-five images 301, 302, . . . , 325 are presented. The major observation from the images 301-325 is that the point spread characterizing the BMSD is shifted on the average by 4.5 pixels, with a standard deviation of 2 pixels, and is further distributed over the FOV with a width (one standard deviation) of 3.1 pixels in x direction and 2.0 pixels in y direction. This sets the required blur radius Rim as is further described below.

Referring back to FIG. 3A, the parameters $\Delta r$ and $T_{rim-ring}$ affect the relative power arriving to the image from the phase encoder 20, and the parameter $F_0$ is set in accord with $\Delta r$ and with the required blur radius Rim, according to (31) above. The blur radius which is required from the phase encoding element 20 is selected to be roughly equal to the FOV size namely Rim=0.113 mm. In order to set the values of these parameters an optimization process is performed, as is described below.

A preliminary set of parameters values is selected for the phase encoding element 20, and a new PSF matrix is found for the imaging device 2. From the new PSF matrix a new SVD matrix is calculated and a new condition number is obtained from the new SVD matrix. This completes a first iteration of the optimization process.

A second iteration starts with a selection of a second set of parameters values for $\Delta r$, $F_0$ and $T_{ring}$. A new condition number is re-calculated from the new SVD matrix obtained in the second iteration, and is compared to the new condition number obtained in the first iteration. This iterative process is repeated until a minimum, or, alternatively, a satisfactory low level, of the new condition number is achieved.

The resulting parameters values of the phase encoding element 20 of the imaging device 2 in this example, under an assumption that the aberration coefficients of the system are the same with or without the rim, are $\Delta r$=0.03 mm, $F_0$=2.235 um and $T_{ring}$=0.9. The new condition number associated with the imaging device 2 is found to be 2291, representing an improvement by a factor of about thirty-eight with respect to the condition number of the lens 10.

In another example the resulting parameters of the phase encoding element 20 are $\Delta r$=0.03 mm, $F_0$=1.56 um and $T_{ring}$=0.9. This example includes an aberration model where the aberrations coefficients grow due to the extension of system diameter associated with the rim. The resulting condition number was found to be 3187. This condition number represents an improvement by factor of about twenty-eight with respect to the condition number of the lens 10.

The image enhancement expressed in the improved image quality obtained by the entire imaging device 2 compared to the lens 10 can be quantitatively described by a Mean Square Error Improvement Factor (MSEIF) [5] defined in (32):

$$MSEIF = 20 \cdot \log_e \left( \frac{\|i^{image} - i^{Object}\|_2}{\|i^{restored} - i^{Object}\|_2} \right) \quad (32)$$

wherein i is the vector column representation (L×1) of matrix in the size (N×M) corresponding to the number of pixels (N×M) of the image FOV, and comprising the grey-scale level of the pixels.

Thus, $i^{object}$ represents an ideal image of the object, $i^{Image}$ corresponds to an image obtained from the optical system before restoration (for proper comparison that was taken from the uncorrected optical system), and $i^{Restored}$ corresponds to an image obtained after restoration. The operation $\|x\|_2$ stands for the norm of the resulting vector x. An important limit is when the nominator and denominator norm are equal (corresponding to MSEIF=0 db). At that point the restored image $i^{Restored}$ and the image before restoration $i^{Image}$ have equal similarity to the object, i.e. there is no use in restoration. MSEIF having a negative value indicates the case when the image restoration is worse than the image. The restored image in this example is provided by a simple matrix inversion according to (2) namely $i^{Restored}=H1^{-1} \cdot i^{Image}$ where the i's denote the vector columns of the respective images and H1 is the PSF matrix of the imaging device 2, as defined in (12).

In the description given below, comparisons of image quality obtainable from conventional imaging systems (with no phase encoder based imaging device) and that of the invention are presented by simulations.

Reference is made to FIGS. 4A to 4D exemplifying the improvement in Signal to Noise Ratio (SNR) and in images obtained using a standard imaging system and an imaging system configured according to the present invention with the above described two aberrations models. FIGS. 4A and 4C show Mean Square Error Improvement Factor (EMSIF) and FIGS. 4B and 4D show images obtained with corresponding imaging systems.

FIGS. 4A and 4C show graphically the Mean Square Error Improvement Factor (EMSIF) as a function of Signal to Noise Ratio (SNR) in two optical systems. In both figures graphs G1 correspond to those of the imaging system of the present invention and graphs G2—to the conventional imaging system (with no phase encoder). The graphs G2 and G1 show the MSEIF of imaging lens and imaging device of the invention for varying levels of Signal-to-Noise Ratio (SNR). It is shown that for any SNR level, the MSEIF of the imaging device of the invention is superior to that of the conventional imaging system, and that the imaging device of the invention crosses the 0 db limit in SNR levels which are typically 20-37 db lower than that of the conventional optics, namely, it presents higher immunity to noise.

FIGS. 4B and 4D show images obtained with the imaging systems described above by graphs G1 and G2 in FIGS. 4A and 4C respectively, at two different SNR levels. In both figures, images referenced by reference number 410 correspond to the ideal image of an object; 412—to the object's image obtained by the conventional system (graph G2) at SNR=60 db; and 414—to the same image 412 after restoration according to eq. (2). Further, "416" corresponds to the object's image obtained from the imaging system of the invention (graph G1) under the same SNR of 60 db, and 418—to the same image after restoration. Likewise, images 422 and 424 are obtained from the conventional system at SNR level of 55 db, before and after restoration, respectively, and images 426 and 428 are obtained from the invented imaging system, under similar conditions, before and after restoration, respectively. These images demonstrate that under the same SNR-level conditions the improved imaging device of the invention combined with a restoration process (which will be described more specifically further below) can obtain better images, than those obtainable using conventional imaging and processing techniques.

Reference is now made to FIGS. 5A to 5D, which show another examples of the image enhancement provided by the imaging system of the invention as compared to the conventional ones. FIGS. 5A and 5C show exemplary images obtained from such two imaging systems at an SNR of 65 db, where in both figures image 510 corresponds to an ideal image of the object, image 512 was obtained from the conventional imaging device and image 514 is the result of restoration (according to eq. (2)) of image 512 data, image 516 is an image of the object obtained from the invented imaging device, and image 518 is the result of appropriate restoration of this image data. It is clearly visible that while 512 has remote resemblance to the object 510, restoration (image 514) only degrades the result. In contrast, the image 518 obtained from the invented system after restoration shows the best resemblance to the object 510.

FIGS. 5B and 5D show a further illustration of the comparison between the conventional and invented systems. More specifically, the MSEIF of these two systems as a function of the SNR is shown. As shown, for a given level of MSEIF, invented technique can tolerate a higher level of noise of about 20 db to 25 db.

FIGS. 6A to 6D show yet further examples of comparison between the conventional and invented techniques. FIGS. 6A and 6C show exemplary images obtained from the two optical systems at an SNR of 60 db, where images 610 represent ideal images of the object, 612 are images obtained from the conventional system (graph G2 in FIGS. 6B and 6D), and 614 are the images 612 after restoration (according to eq. (2)), 616 are images of the object obtained from the invented system (graph G1 in FIG. 6B), and 618 are the image results after restoration. It is clearly visible that the invented system creates an image which resembles the object, while the conventional system does not, with or without the reconstruction step.

As also shown in FIGS. 6B and 6D, for a given level of MSEIF, the invented system can tolerate a higher level of noise of about 25 db.

Referring to FIGS. 7A to 7C, yet another example of comparison results is provided. In this example, the conventional imaging system is characterized by relatively low space variant aberrations, having the Seidel sums $S1=0.0123$, $S2=2.59*10^{-4}$, $S3=3.97*10^{-4}$, $S4=2.922*10^{-4}$ and $S5=3.335*10^{-5}$. Further, the systems (conventional and invented ones) are configured to have de-focus of 0.176 mm. Thus, this example illustrates the improvement obtained by the phase coding imaging device of the invention in a case of a dominant space-invariant blur, in the form of de-focus.

More specifically, FIG. 7A shows three graphs, 71, 72 and 73, of the singular values of the systems, where graph 71 corresponds to the singular values of the conventional imaging system in an in-focus configuration, having a condition number of 3.9; graph 73 shows the singular values of the same system in the de-focus arrangement thereof, with a condition number of 6413; and graph 72 shows the eigenvalues of the imaging device of the present invention 2 in the de-focused position, having a condition number of about 97. Thus the improvement in the condition number in the invented system with respect to the conventional one is about 66. It should be understood that here the conventional system is considered that having an imaging device formed by the single imaging lens, and the invented system is that in which the imaging device has the same imaging lens and a phase encoder.

FIG. 7B compares the MSEIF of the systems as a function of the SNR (graph G1 corresponds to the invented system and graph G2—to the conventional system), and shows that for a given level of MSEIF, invented system can tolerate a higher level of noise of about 37 db, with respect to the conventional system.

FIG. 7C shows exemplary images obtained from the conventional and invented systems at an SNR of 45 db. Here, 710 is an ideal image of the object, 712 is an image obtained from the conventional system, and 714 is the image 712 after restoration (according to eq. (2)); 716 is an image of the object obtained from the invented system, and 718 is the image result after restoration. It is clearly visible that the invented technique provides an image which resembles the object, while the conventional technique does not, with or without the reconstruction step.

Referring to FIG. 8, there is illustrated, by way of a flow diagram, an example of a method of designing (constructing) a phase encoder according to the invention. According to this example, the phase change P(x,y) induced by the phase encoder is determined in every point (x,y) on the phase encoding element plane.

A PSF matrix H of the imaging lens arrangement (i.e. in the absence of the phase encoder) is obtained (step 801), from experimental measurements using specific imaging lens arrangement (e.g. of certain lens diameter, curvatures, material, thickness, refraction index, as well as object and image distances), or simulating the same for this imaging lens arrangement, or supplied by manufacturer. Then, an SVD form S, V, U of the matrix H is calculated (step 802). A group of weak singular values of H, $\sigma_j$, is selected (step 803) and a new matrix $\Delta S$ with improved singular values is constructed (step 804).

In the PSF matrix $\Delta H$ (corresponding to the matrix $\Delta S$ according to (12)), each column represents the PSF of a different field point. Hence, the columns are converted to 2D PSF image and a representative PSF is chosen (step 805). Next, the phase at the exit pupil of the system (of the imaging lens device is calculated (step 806) for a selected number of field points. In order to obtain a physical result for the calculated phase, for each field point using Fourier transform and inverse Fourier transform relation between image plane and exit pupil plane a "Ping-Pong" iterative process [5] is carried out (step 806) until convergence of the phase function at the system pupil exit is obtained. This process is repeated (step 807) for all the selected field points (m,n) until a set of phase functions, $P_{m,n}(x,y)$ (one associated with each field point) is obtained. Generally, these phase functions differ from one another, thus there cannot actually be a real phase encoder capable of inducing all of them. Therefore, selecting or generating one representative phase function from the group of phase functions, is required.

According to some embodiments, a cross-correlation matrix $\rho_{m,n}$ is thus calculated (step 808) between all phase functions, and the phase function $\hat{P}(x, y)$ characterized by having the best accumulated cross-correlation $$\sum_{m \ne n}^{N} (\rho_{m,n})^2$$

to all other phase functions is selected (step 810).

Considering the entire imaging device (lens arrangement and phase encoder) inducing a phase correction $\hat{P}(x, y)$ at the exit pupil of the device, the PSF matrix is calculated again, and the associated condition number is obtained (step 811).

This completes a single iterative step of the phase mask construction. If the condition number is not satisfactory (step 812), the above described sequence of operations is repeated (step 812). The common correction phase $\hat{P}(x, y)$ is taken as the initial condition of the iterative process for all selected field points, repeating steps (806)-(812). The iterative process thus repeats until a satisfactory improvement in the condition number of the PSF matrix of the improved imaging device (optimal phase encoder) is obtained (step 813).

Reference is made to FIG. 9A to 9F, exemplifying the use of the method described above with reference to FIG. 8 for constructing a phase encoder to be used with an imaging lens and arranged with respect to the lens similar to examples of either one of FIG. 2A or FIG. 2B, namely the phase encoder located within the periphery region $R_2$ of the effective aperture surrounding the lens region $R_1$. The remaining part $R_1$ of the effective aperture associated with the imaging lens 10 has a diameter D of 0.4 mm; and a distance Si from the imaging device (from its exit pupil) to the image plane is Si=0.69 mm. The imaging lens 10 is characterized by the Siedel sums S1=0.0123, S2=0.0130, S3=0.0199, S4=2.922*10$^{-4}$ and S5=3.335*10$^{-5}$. The imaging system has a square FOV having 10×10 pixels and a width of 0.113 mm.

FIGS. 9A and 9D show two examples of the progress of the condition number being an image restoration parameter (on an arbitrary scale) of the imaging device formed by lens and phase encoder, as a function of the iteration number through the iterative process. The best condition number (the lowest) was found to be about 1815 in point A on the graph in FIG. 9A based on an aberration model assuming the same aberration coefficients for both the systems with and without the rim, and about 2476 in point A of the graph in FIG. 9D based on the aberration model assuming that aberrations coefficients grow due to the extension of system diameter which associate with the rim. This corresponds to an improvement by a factor of about 48 or 35.4 with respect to the condition number of the imaging lens for FIGS. 9A and 9D respectively. FIGS. 9B to 9C and FIGS. 9E to 9F show the corresponding phase correction function induced by the phase coder: FIGS. 9B and 9E show topographical maps of the phase correction on the periphery zone $R_2$; and FIGS. 9C and 9F show the same phase correction in a 3D histograms.

Reference is now made to FIGS. 10A to 10D, which show two examples of the image enhancement provided by the imaging device of the present invention as compared to the conventional device. FIGS. 10A and 10C show exemplary images obtained by two systems, one being the conventional system and the other being the invented system implemented using the principles illustrated in FIGS. 9B-9C; both at an SNR of 60 db.

Figure 10D:
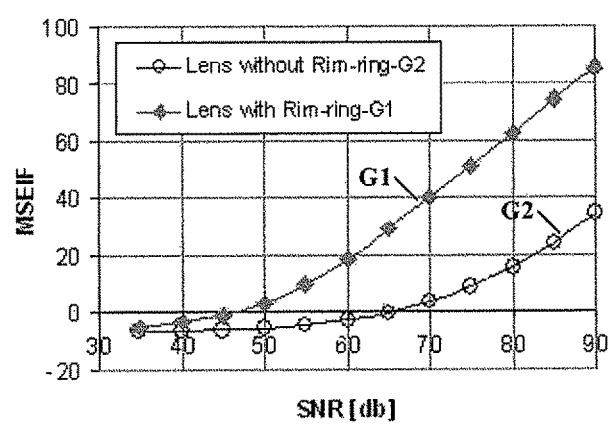

Each of FIGS. 10B and 10D show two graphs $G_2$ and $G_1$ comparing the Mean Square Error Improvement Factor (EMSIF) as a function of Signal to Noise Ratio (SNR) in the two optical systems corresponding to FIGS. 10A and 10C respectively.

In FIGS. 10A and 10C, 1010 are ideal images of the object, 1012 are images obtained from the conventional system and 1014 are images 1012 after restoration (according to eq. (2)); 1016 are images of the object obtained from the system of the invention, and 1018 are the result after restoration. Images 1012 and 1016 have poor resemblance to the object 1010. The restored images 1014 obtained from the conventional system degrades the result. In contrast, images 1018 obtained from system of the present invention shows the best resemblance to the object 1010.

As shown in FIGS. 10B and 10D, for a given level of MSEIF, the invented system can tolerate a higher level of noise of about 25 db or about 20 db (for the examples of FIGS. 10B and 10D respectively), as compared to the conventional system.

It should generally be noted that the reconstruction step of the image is not limited to the process of inverting matrix H1 as is described in the examples above. According to some other embodiments of the invention, image reconstruction can be done by any known method that is intended to remove the phase encoding introduced by the phase encoder to the image while being created by the imaging device, thereby removing also at least some of the image blur. For example, the image reconstruction method can be provided by least square. According to the least square method, the reconstructed image $i^{restored}$ is obtained by minimizing the norm E in (33):

$$E=\|H1 \cdot i^{restored} - i^{Image}\|_2 \qquad (33)$$

where $i^{Image}$ is the image column vector associated with the PSF matrix H1 (namely, the image obtained from the imaging device before reconstruction).

According to another example, the so-called regularization method, the image $i^{restored}$ may be obtained by minimizing E in (34):

$$E=\|H1 \cdot i^{restored} - i\|_2 + \alpha\|I \cdot i^{restored}\|_2 \qquad (34)$$

where $\alpha$ is a constant (usually $0<\alpha<1$) and I is the unity matrix. Such regularization $$i^{restored}=(H1^t \cdot H1+\alpha \cdot I)^{-1} \cdot H1 \cdot i \qquad (35)$$

where I is the identity matrix, $\alpha$ is the regularization factor. For simulations bellow, it was assumed that $\alpha=1/SNR$. This method will be exemplified more specifically further below.

The following is the description of another example of the technique of the invention. An imaging system captures images with a specific FOV. The BMSD matrix can be approximately decomposed by series of transmission or trajectories matrices which are associated with shifting of the captured image relative to the imaging FOV, i.e. some of the image will get out of the FOV thus the transformation matrix between the object space and image space will be changed. This technique is at time referred to herein below as shifted lenses technique or shifted images technique or transformation technique or trajectories technique.

Assuming a pixel confined imaging system is used, its transformation (PSF) matrix from object space to image space is a unit matrix. Following the lexicographic order of the vectors, the mapping of the object coordinates ($l_{in}$) to the image coordinates ($l_{out}$) is:

$$(l_{in}) \rightarrow (l_{out})=(m=1) \cdot N_n + n \rightarrow (m-1) \cdot N_n + n \qquad (36)$$

By determining a PSF matrix, the field of view (FOV) of the system is defined. Assuming, a finite image is captured, if the image is shifted by ($\Delta m, \Delta n$) relative to the fixed FOV origin, the mapping of the object coordinates ($l_{in}$) to the image coordinates ($l_{out}$) will change to:

$$(l_{in}) \rightarrow (l_{out})=(m=1) \cdot N_n + n \rightarrow (m+\Delta m-1) \cdot N_n + n + \Delta n \qquad (37)$$

With a series of shifts, a series of transfer matrices is created, each of which "draws" a different "Trajectory" over the 2D L×L empty matrix.

Referring to FIG. 14, there is shown a relation between the image shift and the trajectories matrix in a 6×6 matrix. It is shown that when the FOV is fixed, there is a duality between the image shift and the Input/Output matrix representation. For each shift, another transfer matrix designated as $O_l$ is obtained.

To realize an auxiliary system with the required auxiliary PSF matrix O, the FOV is defined as the H matrix FOV and decompose O by a series of weighted shifted "transformation" matrix as follows:

$$BMSD \approx O = \Sigma_{i=1}^{M} W_l \cdot O_l = \Sigma_{i=1}^{N} \hat{O}_l \qquad (38)$$

For each "transformation", there is a different weight constant ($W_l$). The weight is defined by solving the following average equation:

$$W_l = \frac{1}{N_l} \sum_{i=1}^{L} \sum_{j=1}^{L} BMSD(i, j) \circ O_l(i, j; \Delta m, \Delta n) \qquad (39)$$

where $N_l$ is the number of instances in the specific "Trajectory", BMSD (see eq. (20) above) is the target PSF matrix for the auxiliary system O, $\circ$ is the projection operator which serves to project the BMSD over $O_l$. Generalizing equations (38) and (39), the sum of all transformation matrices $O_l$ can be used to approximate the BMSD (see eq. (20) above) of the lens 10. By minimizing the square difference E in (40), an approximation to the BMSD can be optimized.

$$E = \left(BMSD - \sum_l W_l O_l\right)^2 \rightarrow \min. \qquad (40)$$

Finally the overall system response is:

$$H1 = H + \sum_l W_l O_l. \qquad (41)$$

Reference is now made to FIGS. 11A and 11B together, showing yet further example of an imaging device 2 of the present invention. The imaging device 2 includes an imaging lens 10, and a phase encoder 20. In this example, the phase encoder 20 has a pattern (constituting a first pattern) in the form of an array of spaced-apart lenses 22 (the so-called "shifted lenses"). As also shown in the figure, the phase encoder may optionally include folding elements 30, capable of affecting the phase of light thus redirecting light beams. These may for example be prisms, beam splitters (not shown) etc. It should be understood that shifted lens 22 can be implemented by more than one lens, for example being an assembly of three lenses 24, as is exemplified in FIG. 11B. The imaging device 2 may potentially further include field stops 40 for defining the FOV of the lenses 22, the field stops being incorporated for example as part of the lens assembly 24, as is shown in FIG. 11B.

It should also be noted that although the "shifted lenses" embodiment is exemplified above in the effective aperture configuration of FIG. 2A, the same concept can be implemented in the configuration of FIG. 2B.

As further shown in FIGS. 11A and 11B, according to this embodiment, the shifted lenses 22 have their optical axes parallel to the optical axis of the imaging lens 10 and they form a plurality of images of the object ("shifted images") on the image plane of the optical system. These shifted images contribute to strengthening the weak parts of the PSF matrix of the imaging lens 10. Each shifted lens 22 can be represented by a PSF matrix $O_l$ (k=1, . . . , N, N being the number of shifted lenses) in the coordinate system of the imaging lens 10. For example, selecting the number of shifted images (corresponding to the number of shifted lenses) and the amount of shift (distance between the shifted lenses) may be used to improve the approximation. Additionally or alternatively, selecting proper transmission factors, represented by weight constants $W_l$, can further improve the approximation.

According to yet further embodiment of the present invention, the "shifted images" approach for improving matrix condition of an imaging device can be implemented by an image processing algorithm used with an imaging technique (not necessarily utilizing a phase encoder as a physical element). Such imaging technique utilizes creation of two images with different Numerical Apertures of light collection and different levels of blur. The system may include two separate imaging devices referred to above as the main system and the auxiliary system. The main and auxiliary systems observe the same field of view, which for example might be similar to the image capture used in phase diversity systems. The principles of phase diversity technique are known per se and need be described in details, except to note that it is aimed at reducing the amount of data to be processed. An image is the combination of two unknown quantities, the object and the aberrations; the aberrations are perturbed with a known difference in phase between two simultaneously collected images, for example by recording one of the images slightly out of focus [6-10].

Assuming an ill conditioned main system, the above target BMSD can be defined and decomposed by digital summation of N shifted and weighted reproductions of the auxiliary system image. Finally, the main system image is added to that summation, a new image associated with the improved condition system is obtained. The governing equations (35)-(39) are applicable in this process, while the shift and weight are done digitally on a captured auxiliary system image.

According to some embodiments, a desired set of weight factors can be obtained for example by minimizing E in (39). Further, the weight factors Wi, in (35)-(39) may assume both negative and positive values, since the summation is performed computationally and not physically. Accordingly, a relatively good approximation of the BMSD can be obtained by a proper summation of the matrices, and a considerable improvement of matrix condition can be consequently achieved.

Reference is made to FIG. 12, showing an example of an imaging system 50 utilizing the above concept of "shifted images". Imaging system 9 includes a first imaging device 52 having an optical axis $OA_1$ and a Numerical Aperture $NA_1$ and a second imaging device 54 having optical axes $OA_2$ parallel to the optical axis $OA_1$ and a lower Numerical Aperture $NA_2$. It should be understood that imaging devices 52 and 54 may be associated with their own light detector or a common light detector. Also, imaging devices 52 and 54 irrespective of whether being parts of a common integrated system or not, need not be operative concurrently; what is needed for this aspect of the invention is the provision of two different image data pieces collected by such different imaging devices. Thus, as shown in the figure, imaging system 50 includes an image detector 56 and a control unit 6, configured and operable to register and to process image data provided by detector 56. The first imaging device 52 can include for example a high Numerical Aperture (NA) lens, which generates a high intensity, but relatively blurred image. The second imaging device 54 can include for example a low NA lens, which provides a relatively blur-free (sharp) image, with low intensity and relatively low SNR. Both imaging device "see" the same object and bore-sight to the same image plane, therefore the images produced by them are obtained from the same direction from the object. The images ($i_{min}$) and ($i_{aux}$) produced by the two imaging devices 52 and 54 are detected by detector 56 and registered by the control unit 6 independently from one another.

According to some embodiments, the weak parts of the first imaging device 52 are improved by adding to the image (i) a combination of N shifted images ($i_1$) obtained by the second imaging device 54. The images ($i_1$) are obtained computationally from the auxiliary image $i_{aux}$ by duplications and shifts. For a given BMSD of the first imaging device 52, a desired combination of the shifted images ($i_1$), $$i = \sum_{l=1}^{N} W_l \cdot i_l$$

is obtained. The sum ($i_{main}$+i) is then reconstructed—e.g. by multiplication by an inverted matrix $H_1^{-1}$—to generate an enhanced image of the object.

According to some examples of the invention, a desired set of weight factors Wi can be obtained in the way described below. An algebraic representation H of the first imaging device 52—e.g. a PSF matrix—is obtained and presented in a modal form—e.g. SVD. The weak parts of the modal matrix are identified and a BMSD matrix is generated accordingly, as is described above.

Reference is made to FIGS. 13A and 13B, which show an exemplary implementation of the above-described "computational" approach to the "shifted images" aspect of the invention. FIG. 13A compares images obtainable with the conventional technique and that of FIG. 12; and FIG. 13B shows graphs $H_1$, $H_2$ and $H_3$ comparing pixels grey level of three images: ideal picture of the object (object itself—graph $H_1$) and images of FIG. 13A (graphs $H_2$ and $H_3$). The lens aperture (being the effective aperture in this case) of the imaging device 52 has a diameter D of 0.4 mm, is distanced from an imaging detector a distance of Si=0.69 mm, and is characterized by relatively high aberrations, having the Siedel sums S1=0.0123, S2=0.0130, S3=0.0199, S4=2.922*10$^{-4}$ and S5=3.335*10$^{-5}$. The lens/effective aperture of the imaging device 54 has a diameter of 0.16 mm, and generates a PSF approximately confined to an eleven micron square pixel. The FOVs of the imaging devices 52 and 54 are the same and are in the form of a square 10×10 pixels with 0.113 mm length side.

FIG. 13A shows exemplary image reconstruction at an SNR of 55 db first device and 25 db for the second device. In the figure, 1310 is an ideal image of the object, 1312 is an image obtained from the first higher NA imaging device 52 and 1314 is the image 1312 after restoration (according to eq. (2)(2)), and 1316 is an image of the object obtained from the second imaging device 54. Taking into account the low intensity of image 1316 it is multiplied by the ratio of the area of the first lens 52 and the second lens 54, namely by (0.4/0.16)$^2$. The resulting image is quite dark but relatively sharp.

Image 1317 is a weighted sum of a multitude of duplicate images of image 1316, shifted with respect to one another by essentially all possible shifts allowed in a 10×10 pixels FOV. The region of interest in image 1317, marked by the rectangle in the center 1317A, is used for the improvement of the system matrix condition further in the process. Image 1318 is the direct sum of image 1312 of the first imaging device 52, and image 1317A. Image 1319 is the result of image 1318 after restoration according to eq. (2).

It should be appreciated that the images 1312 and 1314, obtained from the imaging device 52 before and after restoration, respectively, have both poor resemblance to the object 1310. In contrast, the restored image 1319 obtained by the complete "shifted images" technique shows relatively high resemblance to the object 1310.

FIG. 13B graphically compares between the conventional and invented techniques, i.e. between images 1314 and 1319. The grey level of each pixel in the object image 1310 (in asterisks) is compared between the restored image 1314 of the imaging device 52 (triangles) and the restored image 1319 of the combination of devices 52 and 54 (circles). The graph shows that the pixels grey level in the restored image 1319 follow closely the pixels grey level in the object image 1310. In contrast, the pixels grey level in image 1314 have a very large spread with no observable correlation to the pixels grey level of the object image 1310.

Reference is made to FIGS. 13C and 13D, showing simulation results for the above described technique. FIG. 13C exemplifies an object ensemble used in the simulations; and FIG. 13D compares the restoration average MSEIF ensemble results as a function of the main system SNR for the "study case" restoration "as is" (i.e. imaging device having the main lens system only, with no auxiliary lens) and the above-described "trajectories" or "shifted lenses" technique utilizing a simple auxiliary lens. Here, graph G1 corresponds to the image restoration by regularization for the "trajectories" based system with simple auxiliary lens, graph G2 corresponds to the "study case" lens restoration by matrix inversion, and graph G3 corresponds to the "study case" lens restoration by regularization.

In the above described "shifted lenses" or "trajectories" examples, the auxiliary lens system was assumed to be of a so-called "perfect" or "pixel confined" configuration that does not induce an image blur. It was also emphasized that for realistic demonstration, the auxiliary system formed by a low NA simple lens which is almost pixel confined is to be considered. It should also be understood that the principles of the "trajectories" or "transformation" technique may be used with a linear system other than optical, for example a mechanical system vibration measurement. In this connection, reference is made to FIG. 13E showing a system formed by main system 10 characterized by the main system matrix H, and auxiliary system 20 characterized by the auxiliary system matrix O. Assuming both systems capture finite series of n samples in time from n locations of the same vibrating system, if H matrix system is ill conditioned, a target matrix composed from its eigen matrixes equivalent to the above BMSD can be calculated, then the sample data of the auxiliary matrix system O can be shifted and weighted according to the Trajectories based decomposition transformation matrixes $L_1, L_2, \ldots, L_n$. Finally, by summing the H matrix data with the processed auxiliary data, an improved conditioned parallel system is obtained.

Turning back to the optical system design, the auxiliary system itself may have a blurred response. Moreover, the same lens system may function as the "main system" and as the auxiliary system", in which case the "main" and "auxiliary" functions are constituted by successive image acquisition performed by the same lens system.

The following is an example of how to extend the "trajectories" or "transformation" model to a more realistic auxiliary lens with a blurred response (which will be at times referred to herein below as Blurred Trajectories or blurred transformations).

Extending the Trajectories or Transformations model to the general case of a blurred auxiliary lens, the auxiliary lens image is not pixel confined, hence relating it to the perfect object, it is first blurred and then weighted and shifted. In this case, the O matrix is decomposed (eq. (38) above) by "blurred transformation" calculated by simple matrix multiplication.

$$\hat{O}1_l(i,j;\Delta m,\Delta n)=O_l(i,j;\Delta m,\Delta n) \cdot H_{aux}(i,j) \tag{42}$$

Following the "blurred transformation" approach, the normalization factor Nis modified:

$$\hat{N}_l = \sum_{i=1}^{L}\sum_{j=1}^{L} O_l(i, j; \Delta m, \Delta n) \cdot H_{aux}(i, j) \tag{43}$$

Finally, the weighting factor for eq. (37) is:

$$\hat{W}_l = \frac{1}{\hat{N}_1}\sum_{i=1}^{L}\sum_{j=1}^{L} BMSD(i, j) \circ \hat{O}1_l(i, j; \Delta m, \Delta n) \tag{44}$$

The overall decomposition is:

$$BMSD \approx O = \Sigma_{i=1}^{M} \hat{W}_l \cdot \hat{O}1_l(i,j;\Delta m,\Delta n) \tag{45}$$

FIGS. 15A and 15B show the "transformation" matrices for the 6×6 PSF matrix for 3×2 FOV. FIG. 15A presents the pixel confined case (assuming pixel confined auxiliary lens), and FIG. 15B presents the "blurred transformation" with a blurred auxiliary lens assuming a 2×2 kernel (presented in the bottom right). Broadening the ideal "transformation" (FIG. 15A) to the "blurred transformation" (FIG. 15B) depends on the shape of the blurred auxiliary system kernel. This gives a degree of freedom to choose the blurred auxiliary system which can best decompose the target BMSD.

For example, the main system matrix H may be as follows:

$$H = \begin{bmatrix} 1.00 & 2.10 & 3.00 & 4.00 & 5.00 & 6.000 \\ 1.00 & 2.10 & 3.30 & 4.40 & 5.10 & 6.100 \\ 1.05 & 2.30 & 3.20 & 4.10 & 5.40 & 6.200 \\ 1.05 & 2.11 & 3.10 & 4.12 & 5.14 & 6.110 \\ 1.11 & 2.22 & 3.30 & 4.14 & 5.21 & 6.111 \\ 1.21 & 2.21 & 3.41 & 4.12 & 5.17 & 6.100 \end{bmatrix} \tag{45}$$

The matrix is ill conditioned with a condition number of κ=18625.

Using the above described "blurred transformation" technique, the system's matrix has 6 eigen matrices. For example, the last two eigen matrices can be arbitrarily determined as the target BMSD. Under the assumption of pixel confinement, a set of 15 "transformations" is obtained presented in FIG. 15A. The resulted parallel optics system was with an improved condition number of κ=72.6. For the same study case (the main system matrix H of (45)), following equations (42)-(44) above, and assuming a blurred auxiliary system, the resulted "blurred transformation" is as in FIG. 15B and the parallel optics condition number is κ=362. Although in the second case, there is some overlap between the "blurred transformations", the set of the projections still enables to decompose the target BMSD sufficiently.

The following are simulation results for the "blurred transformation" using two different optical systems: a space variant imaging system and a highly defocused imaging system. The performance of both systems was tested in image restoration over an ensemble of 8 objects (see FIG. 13C) under various SNR levels. The blurred images are subject to white Gaussian additive noise.

The restoration performance is determined by the Mean Square Error Improvement Factor (MSEIF)—equation (32) also presented above:

$$MSEIF = 20 \cdot \log_e \left( \frac{\|I_{L \times 1}^{image} - I_{L \times 1}^{object}\|_2}{\|I_{L \times 1}^{res} - I_{L \times 1}^{object}\|_2} \right) \quad (45)$$

In this function, the restoration error and the blur error are both relative to the ideal object ($I_{object}$). When MSEIF<0 db, the restored image ($I_{res}$) is worse than the blurred optical image ($I^{img}$), so there is no use in performing restoration. For each SNR, a set of 2400 measurements of the 8 objects was performed, and then the MSEIF was calculated for each measurement and the average value over the ensemble. The results were presented as a function of the main system SNR.

Since the object range is limited to a dynamic range of 256 gray, it was assumed that restoration gray levels below 0 and above 255 are out of the dynamic range, and hence they were rounded to 0 and 255 respectively. For post processing, Following equation (35) regularization was used.

$$\hat{I}_{L \times 1}^{res} = (H1^t \cdot H1 + \alpha \cdot I)^{-1} \cdot H1 \cdot I_{L \times 1}^{image} \quad (46)$$

For demonstration of the "blurred transformation" capabilities, it was assumed that the auxiliary system used is blurred, and yields such bad images that if taken as restoration results the resulted MSEIF will be negative. Equation (47) presents the auxiliary system PSF:

$$PSF = \frac{1}{11} \cdot \begin{bmatrix} 1 & 1 & 1 \\ 1 & 3 & 1 \\ 1 & 1 & 1 \end{bmatrix} \quad (47)$$

Considering the space variant ill conditioned imaging system, the similar simulation conditions were used, while removing the assumption of a pixel confined auxiliary lens. The main system is generally similar to that described above with reference to FIG. 3B, being a highly blurred space variant imaging system with a condition number of κ=87640. The main optical system is a 0.4 mm diameter lens. The image distance is 0.69 mm and the field of view is ±4.673 deg. The system suffers from strong Seidel aberrations: S1=0.0123, S2=0.013, S3=0.0199, S4=2.92e-4, S5=3.335e-5. Image sizes 10×10, n=1. The FOV is asymmetric for −0.6 pixel in x direction and +1.4 pixel in y direction.

The auxiliary lens is a 0.16 mm diameter lens with a space invariant PSF as in eq. (47). The auxiliary system works with a lower NA than the main system. This effects the signal level and is reflected in a SNR level of 16 db lower than that of the main system. In PSF calculation, a diffraction model was used, implemented using a 512×512 FFT operator matrix. Regarding the NA condition, it should be noted that the invention is not limited to any specific requirement for the NA of the auxiliary system at all and relative to that of the main system.

Since the "transformation" decomposition is of a diagonal form, a search was performed for an eigen matrices combination which yields a BMSD with a "Toeplitz" like shape. The search is done automatically, and in each step an additional eigen matrix was added and the condition number of the resulted parallel optics was calculated. The inventor have found few local minima and chose the solution with a condition number of κ=1212. Since the ability to decompose the target BMSD with high fidelity depends on both the choice of target BMSD and the auxiliary system PSF profile, this is generally not an optimal solution of the system but a local minima.

FIGS. 16A and 16B show restoration average MSEIF ensemble results, presenting two sets of measurements of the average MSEIF in four systems. Graphs A1 corresponds to the system having the "main lens" without additional optics; graphs A2 corresponds to the quadratic "Rim-ring" parallel optics design described above, graphs A3 corresponds to the parallel optics using the above described "Blurred Trajectories", all being restored by the regularization method described by eq. (46) above. Graphs A4 is a reference for the MSEIF value of the blurred auxiliary lens image which was used with the "Blurred Trajectories" method as if it was a restoration outcome. The negative MSEIF values signifies that it cannot serve as a restoration result as is. As expected, the results follow the matrix condition. For the "blurred Trajectories" (graph A3) with condition number of κ=1212, the improvement in restoration quality (MSEIF value) is the best, following is the quadratic "Rim-ring" (graph A2) with a condition number of κ=2290.6 in the results shown in FIG. 16A including the assumption that the aberration coefficients for both the systems with and without the rim are equal. And a condition number of κ=3187 in the results shown in FIG. 16B, assuming an accurate aberration model including growth of the aberrations coefficients due to the extension of system diameter associated with the rim. Last is the graph A1 case without additional optics with a condition number of κ=87640. The regularization factor α increases as the SNR decreases (eq. (46)). Due to the truncating nature of regularization, in this method as the SNR decreases the truncating is deeper. Since the auxiliary system is composed of the system eigen matrices, the outcome of this truncating is that the auxiliary lens contribution is weaker until results asymptotically converge with the original system solution. The "Blurred Trajectories" method provides an important result where by mixing two blurred images an improved restoration is gained which for a wide range of SNR is better than the restoration results achieved by regularization only.

Reference is made to FIGS. 17A and 17B exemplifying typical images and restorations by regularization (eq. (46)) of the above systems, all in main SNR=45 [db], showing: the study case image (SC-Img.) without parallel optics; auxiliary lens image (Aux-Img), the object (Obj.), the study case restoration by regularization (SC-Res.), the quadratic Rim-ring restoration (RR-Res.), and the Blur Trajectories restoration (Traj-Res.) in both figures. The mean improvements in the MSEIF is 4.4 [db]. The visual results follow the mean MSEIF results. In general, the restoration performance with "blurred Trajectories" (Traj-Res.) is equal or better than those of the study case restoration without parallel optics (SC-Res), and especially better for objects 3,4,7 and 8. Comparing the restoration appearance of the "Blur-Trajectories" with that of the "Rim-ring" (RR-Res), the results are generally in the same level.

The following is an example of a deep defocused imaging system case. In this case, a standard 0.4 mm diameter double convex lens is used. It is assumed that a 0.69 mm focal distance monochrome imaging (λ=0.5875 μm) is performed. The lens material is SCHOTT K10. The system's FOV, pixel size and image distance are the same as in the above described example (FOV is ±4.67 deg, pixel size is 11 µm). The lens is subject to nominal Seidel aberrations and to a 176 µm defocus. This is shown schematically in FIG. 18. The algebraic representation of this system (main system) is a 100×100 almost space invariant matrix with a condition number of κ=6412.5. This matrix is the "main" system. As the auxiliary lens, the same 0.16 mm diameter blurred system with the same PSF (eq. (47)) was used.

First, the target BMSD was graphically determined. FIG. 19 shows the "main" system singular values graph and the chosen (target) BMSD matrix in this case. It is seen from the singular values graph that from the $8^{th}$ singular value, the graph is monotonic and decreasing, so the decision to choose the $30^{th}$ singular value and not a higher value as the limit for the BMSD is not influenced by the matrix condition reduction alone but from the BMSD shape. The resulted BMSD is a "Toeplitz" like matrix which is close in shape to the "Trajectories" "diagonal" shape so it can be decomposed by the latter adequately. In this case, the theoretical condition number is 65.2 and the resulted condition number using the "blurred Trajectories" is κ=238.7.

FIG. 20 presents a comparison between the mean MSEIF results of regularization (eq. (46)) for three systems: the "Blurred Trajectories" (Traj)—graph C1, the "Rim-ring" with quadratic phase coefficient (graph C2), and the "study case" (SC) without additional optical design (graph C3), graph C4 being a reference value As in the previous study case, for each SNR value (main system SNR), the comparison includes a set of 2400 measurements of 8 different objects (see FIG. 13C). The restoration SNR is the "main SNR", and as in the first study case the auxiliary system SNR is 16 [db] lower. The "Rim-ring" solution is designed in a similar way as in the first study case, but has 100% transmission for both "lens" and "Rim-ring" and a quadratic phase coefficient of 0.0022 mm. The results show, as expected, a higher MSEIF for a system with a better condition. For a condition number of κ=96.8, the quadratic "Rim-ring" is the best, followed closely by the "blurred Trajectories" where κ=238.7. The last is the study case (κ=6412.5). As explained above, as the SNR decreases the regularization truncation cuts more of the auxiliary lens influence, and so the two "parallel optics" solutions (quadratic Rim-ring and blurred Trajectories) asymptotically tend to the main system solution.

FIG. 21 exemplifies typical "object", "main" system images, "auxiliary" system image, "Blurred Trajectories" restoration, "study case" restoration without additional optical design (as is), and quadratic "Rim-ring" restoration, all in SNR=45 [db]. It is seen that the quadratic "Rim-ring" restoration (RR-Res.) and the "blurred Trajectories" restoration (Traj-Res.) present similar restoration levels. For objects, such as 3,4,6,7,8, which seem to contain high spatial frequencies, the latter visually presents a significantly better restoration than the study case restoration by regularization alone (SC-Res.).

Turning back to eq. (47), the size of the three pixel blur in the auxiliary system is 33 µm. This could be a diameter of a diffracted limited, airy disk:

$$\frac{33 \text{ [µm]}}{2 \cdot 0.69 \text{ [mm]}} = 0.61 \cdot \frac{0.5875 \text{ [µm]}}{0.5 D_{app} \text{ [mm]}} \Rightarrow D_{app} \square 0.03 \text{ [mm]} \quad (48)$$

The result in (48) shows that the "blurred Trajectories" might be achieved by a micro lenses array (example of FIG. 11B above) which includes a field stop, where each "Trajectory" shift is realized by a bending prism, and the weight factor (44) by local transmission.

Also, as indicated above, since the "blurred Trajectories" technique uses a mixture of two highly blurred images to create a relatively sharp image, an optical design may be selected which uses the "main" system images (generally at least two image) as the main and the auxiliary images, i.e. resolves the system by a so-called "double exposure".

The pixel confined "Trajectories" (or "transformation") model can be extended to the "blurred Trajectories" model. The simulations have shown that the "blurred Trajectories" can improve system condition and image restoration, by Tikhonov regularization. The invented technique provides significant improvement in the system matrix condition (from κ=87640 down to κ=1211 in the first study case and from κ=6412.5 down to κ=238.7 in the second study case). Since the "blurred Trajectories" filtering is done by software and not by hardware in general, it is much more flexible than the traditional optical filtering approach. The concept of combining two blurred images enables the "Blurred trajectories" method to produce a system where the "main" and "auxiliary" images are produced by a single aperture system.

Thus, the "Image fusion" technique of the present invention provides for improving the matrix condition of the imaging system. For example, the "Rim-ring" or the "ping-pong" method can be used to work on a different auxiliary system (designated as O). All these methods obey the Parallel optics rule:

$$I^{image} = H \cdot I^{object} + O \cdot I^{object} \quad (49)$$

which is actually fusion of to systems the goal of which is to improve the system matrix condition, the main image is:

$$I^{image\_main} = H \cdot I^{object} \quad (50)$$

and the auxiliary image is:

$$I^{image\_Aux} = O \cdot I^{object} \quad (51)$$

The fused image is:

$$I^{image} = I^{image\_main} + I^{image\_Aux} \quad (52)$$

where (38) is a fused image virtually captured by H1 of a system which has improved matrix condition.

$$H1 = H + O \quad (53)$$

H being the main system and O being the auxiliary system.

Turning back to FIG. 1, there was illustrated an example of using the Rim-ring design of the auxiliary optical system for improving the image quality of the imaging system. The following is another example of the Rim-ring approach.

In this example, the main lens system is similar to the above-described one (10 in FIG. 1), namely is an ill conditioned space variant system. The SVD technique is used for defining the system BMSD. Such system BMSD composed from the last 50 eigen matrixes is illustrated in FIG. 22.

Each row is converted into 2D image, PSF(x,y,i). The rim-ring filter is single, assuming a phase effect induced thereby is more dominate than that of the main lens aberrations in the rim-ring zone, and it together with the main lens creates a point spread function which is common to all field points and approximately centered around the paraxial coordinate ("filter's PSF"). The filter's PSF design is preferably such as to compromise between the different PSF(x,y,i) shapes. For example, such a filter may be constructed by weighted superposition of PSF(x,y,i), one possible implementation being an average filter.

Then, in order to calculate the average filter, each PSF (x,y,i) is shifted such that its paraxial coordinate ($x_{pr}, y_{pr}$) is transferred to the center of the field (x=0,y=0). This is illustrated in FIG. 23. An average value of the ensemble is applied (54):

$$PSF_{target}(x, y) = \frac{1}{K}\sum_{i=1}^{K} w_i \cdot psf(x - x_{paraxial}, y - y_{paraxial}, i) \quad (54)$$

Negative values, which are not a physical response for incoherent point spread function, are truncated, and a target PSF for the auxiliary system is define as shown in FIG. 24. The filter producing that target PSF can be calculated according to Gershberg and Saxton method for Rim-ring or for full aperture. This is illustrated in FIG. 25 showing the phase profile for the rim ring implementation condition number dropped from nearly 87000 to about 4900, in some cases the condition number drops to about 3977. Then, the new mask can be implemented in the "Rim-ring" or in a separate auxiliary system according to the above described parallel optics implementation.

This method can serve for calculating a separate auxiliary system O such that its implementation will be suitable for use in imaging device which includes two separate optical systems such as in the above-described examples of the Trajectories method of FIG. 12. In that case the mask is mounted on the auxiliary lens.

Reference is made to FIGS. 26A to 26D exemplifying MSEIF profiles and performance of the main lens systems equipped and not equipped with an average Rim-ring filter.

FIGS. 26A and 26C exemplify two sets of MSEIF equation (45) profiles for the imaging device where the main lens system is equipped (graphs G1) and is not equipped (graphs G2) with an Average Rim-ring filter. FIG. 26A utilizes similar aberration coefficients of the system with or without the rim and suffer from different decanter, while FIG. 26C utilizes a different aberration model including the change in aberration coefficients due to the rim. The figures shows 20 db difference in zero crossing. The restoration was done by simple matrix inversing, ensemble size N=1000 in each SNR level. FIGS. 26B and 26D show the performance (image restoration) for lenses with and without Average PP Rim-ring filter restoration example in SNR=60 db and in SNR=65 db for FIGS. 26B and 26D respectively.

Those skilled in the art will readily appreciate that various modifications and changes can be applied to the embodiments of the invention is hereinbefore described without departing from its scope defined in and by the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An imaging system comprising:
 a first lens system having a first numerical aperture, and a second lens system having a second numerical aperture being smaller than the first numerical aperture, both said lens systems being directed for imaging of a common object plane;
 a first light detector for detecting light collected by the first lens system and generating a first image data indicative of the common object plane;
 a second light detector for detecting light collected by the second lens system and generating a second image data indicative of the common object plane;
 a control unit operatively coupled to the first and second light detectors, the control unit being configured to receive the first generated image data and the second generated image data that are indicative of the common object plane, process the first and second image data to produce a combined image data of the common object plane, generate a reconstructed image data based on the combined image data, and output the reconstructed image data that is different from the first image data and the second image data.

2. The system of claim 1, wherein the reconstructed image data provides an improvement in signal-to-noise ratio.

3. The imaging system of claim 1, wherein the reconstructed image data provides an improvement in resolution.

4. The system of claim 1, wherein the reconstructed image data provides an improvement in distortion.

5. The system of claim 1, wherein the reconstructed image data provides an improvement in blur.

6. The system of claim 1, wherein the reconstructed image data that is different from the first image data and the second image data provides an improvement in image quality of the common object plane.

7. The system of claim 6, wherein the image quality improvement comprises a reduction in de-focus effects at the image of the common object plane.

8. The system of claim 6, wherein the image quality improvement further comprises at least one of: an improvement in signal-to-noise ratio, an improvement in resolution, an improvement in distortion, and an improvement in blur.

9. The system of claim 1, wherein the first lens system and the second lens system are configured with parallel optical axes that are spaced apart from each other.

10. The system of claim 6, implemented in a cellular phone, a handheld pad-device such as ipad, or a handheld computer, to improve the quality of generated images.

11. The system of claim 6, being implemented in a camera to improve the quality of the generated image.

12. A system comprising an imaging system and a processor utility, the imaging system comprising:
 a first lens system having a first numerical aperture, and a second lens system having a second numerical aperture being smaller than the first numerical aperture, both said lens systems being directed for imaging of a common object plane;
 one or more image detection units for detecting light collected by the first and second lens systems and generating corresponding a first image data and a second image data indicative of the object plane from a common direction; and
 the processor utility being configured to:
 receive the first image data and the second image data that are generated with respect to the common object plane; and
 process the first and second image data to generate a reconstructed image of the common object plane;
 wherein the reconstructed image of the common object plane comprises an improvement in image quality compared to images of the common object plane that are generated by either one of the first and second image data alone.

13. The system of claim 12, wherein the improvement in image quality comprises an improvement in signal-to-noise ratio.

14. The imaging system of claim 12, wherein the improvement in image quality comprises an improvement in resolution.

15. The system of claim 12, wherein the improvement in image quality comprises an improvement in distortion.

16. The system of claim 12, wherein the improvement in image quality comprises an improvement in blur.

17. The system of claim 12, wherein the processing of the first and second image data comprises generating a combined image data of the common object plane.

18. The system of claim 12, wherein the first lens system and the second lens system are configured with parallel optical axes that are spaced apart from each other.

19. The system of claim 12, wherein the image quality improvement comprises a reduction in de-focus effects at the image of the common object plane.

20. The system of claim 18, wherein the image quality improvement further comprises at least one of: an improvement in signal-to-noise ratio, an improvement in resolution, an improvement in distortion, and an improvement in blur.

21. The system of claim 12, being implemented in a cellular phone, a handheld pad-device such as ipad, or a handheld computer, to improve the quality of generated images.

22. The system of claim 12, being implemented in a camera to improve the quality of the generated image.

* * * * *